US008581771B2

(12) United States Patent
Bradley

(10) Patent No.: US 8,581,771 B2
(45) Date of Patent: Nov. 12, 2013

(54) SCENE ILLUMINATOR

(75) Inventor: Timothy Bradley, Loogootee, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 472 days.

(21) Appl. No.: 12/778,892

(22) Filed: May 12, 2010

(65) Prior Publication Data

US 2012/0098693 A1 Apr. 26, 2012

Related U.S. Application Data

(63) Continuation-in-part of application No. 12/541,772, filed on Aug. 14, 2009, now Pat. No. 8,305,252, and a continuation-in-part of application No. 12/511,056, filed on Jul. 28, 2009, now Pat. No. 8,436,276.

(51) Int. Cl.
| | | |
|---|---|---|
| H04K 3/00 | (2006.01) | |
| G01S 7/38 | (2006.01) | |
| G01S 7/495 | (2006.01) | |
| G01S 7/00 | (2006.01) | |
| F41G 7/22 | (2006.01) | |

(52) U.S. Cl.
USPC .............. 342/14; 342/13; 342/52; 342/53; 342/54; 455/1; 244/3.1; 244/3.15; 244/3.16; 398/39; 372/109

(58) Field of Classification Search
USPC .................. 455/1; 398/39, 140, 168–172; 342/13–20, 29–51; 244/3.1–3.19; 726/2, 16–21, 26–30; 89/1.11; 372/109
See application file for complete search history.

(56) References Cited

U.S. PATENT DOCUMENTS

| | | | | |
|---|---|---|---|---|
| 3,392,259 | A | | 7/1968 | Meier |
| 3,622,743 | A | | 11/1971 | Muncheryan |
| 3,989,942 | A | * | 11/1976 | Waddoups .................... 398/170 |
| 4,134,008 | A | * | 1/1979 | de Corlieu et al. ........... 398/170 |
| 4,177,580 | A | | 12/1979 | Marshall et al. |
| 4,249,265 | A | * | 2/1981 | Coester ......................... 398/170 |
| 4,439,767 | A | * | 3/1984 | Hefley et al. ..................... 342/14 |
| 4,566,009 | A | * | 1/1986 | Hanni et al. ..................... 342/45 |
| 4,575,786 | A | | 3/1986 | Roberts |
| 4,580,557 | A | | 4/1986 | Hertzmann |
| 4,763,361 | A | * | 8/1988 | Honeycutt et al. ............ 398/170 |
| 4,838,167 | A | | 6/1989 | Prahauser et al. |
| 5,003,600 | A | * | 3/1991 | Deason et al. ................... 342/42 |
| 5,142,288 | A | * | 8/1992 | Cleveland ........................ 342/45 |
| 5,198,607 | A | | 3/1993 | Livingston et al. |

(Continued)

FOREIGN PATENT DOCUMENTS

| | | |
|---|---|---|
| WO | WO 99/07439 | 2/1999 |
| WO | WO 2006/031351 | 3/2006 |

OTHER PUBLICATIONS

Galvanauskas et al., "KW-Power Fiber Lasers with Single Transverse Mode Output," Sep. 22, 2005, 5 pgs., downloaded from http://www.nufern.com/whitepaper_detail.php/30.

(Continued)

*Primary Examiner* — Bernarr Gregory
(74) *Attorney, Agent, or Firm* — Christopher A. Monsey

(57) ABSTRACT

A system is disclosed to identify authorized EO devices and unauthorized EO devices within a scene. The system hampers the operation of the unauthorized EO devices detected within the scene.

17 Claims, 40 Drawing Sheets

(56) References Cited

U.S. PATENT DOCUMENTS

| | | | |
|---|---|---|---|
| 5,239,309 A * | 8/1993 | Tang et al. | 342/13 |
| 5,272,716 A | 12/1993 | Soltz et al. | |
| 5,274,379 A * | 12/1993 | Carbonneau et al. | 342/45 |
| 5,319,434 A | 6/1994 | Croteau et al. | |
| 5,339,328 A | 8/1994 | Miura | |
| 5,396,243 A * | 3/1995 | Jalink et al. | 342/45 |
| 5,396,506 A | 3/1995 | Ball | |
| 5,401,171 A | 3/1995 | Paghidiwala | |
| 5,459,470 A * | 10/1995 | Wootton et al. | 342/45 |
| 5,500,525 A * | 3/1996 | Saban | 342/45 |
| 5,501,680 A | 3/1996 | Kurtz et al. | |
| 5,539,565 A * | 7/1996 | Waddoups et al. | 398/170 |
| 5,549,477 A | 8/1996 | Tran et al. | |
| 5,574,458 A | 11/1996 | Tran | |
| 5,600,434 A | 2/1997 | Warm et al. | |
| 5,635,905 A | 6/1997 | Blackburn et al. | |
| 5,662,291 A * | 9/1997 | Sepp et al. | 244/3.13 |
| 5,686,722 A * | 11/1997 | Dubois et al. | 342/45 |
| 5,694,408 A | 12/1997 | Bott et al. | |
| 5,748,138 A * | 5/1998 | Telle et al. | 342/45 |
| 5,780,807 A | 7/1998 | Saunders | |
| 5,793,476 A | 8/1998 | Laakmann et al. | |
| 5,862,278 A | 1/1999 | Brauch et al. | |
| 6,167,075 A | 12/2000 | Craig et al. | |
| 6,187,213 B1 | 2/2001 | Smith et al. | |
| 6,269,617 B1 | 8/2001 | Blanchard | |
| 6,359,710 B1 | 3/2002 | Takken et al. | |
| 6,429,446 B1 | 8/2002 | Labaugh | |
| 6,587,486 B1 | 7/2003 | Sepp et al. | |
| 6,593,540 B1 | 7/2003 | Baker et al. | |
| 6,665,079 B1 | 12/2003 | Tocci et al. | |
| 6,670,222 B1 | 12/2003 | Brodsky | |
| 6,700,094 B1 | 3/2004 | Kuntze | |
| 6,703,582 B2 | 3/2004 | Smart et al. | |
| 6,773,119 B2 | 8/2004 | Kimura et al. | |
| 6,801,550 B1 | 10/2004 | Snell | |
| 6,903,674 B2 | 6/2005 | Hoesel et al. | |
| 6,933,877 B1 | 8/2005 | Halladay et al. | |
| 6,969,845 B2 | 11/2005 | von Rosenberg, Jr. | |
| 6,977,598 B2 | 12/2005 | Longbottom | |
| 7,017,467 B1 | 3/2006 | Monroe | |
| 7,053,812 B2 | 5/2006 | Trainor | |
| 7,154,591 B2 | 12/2006 | Muenter et al. | |
| 7,308,207 B2 * | 12/2007 | Chen | 398/170 |
| 7,397,014 B2 | 7/2008 | Hart et al. | |
| 7,425,916 B2 | 9/2008 | Stevens, Jr. | |
| 7,583,715 B2 | 9/2009 | Hill et al. | |
| 8,202,268 B1 | 6/2012 | Wells et al. | |
| 2005/0104731 A1 | 5/2005 | Park | |
| 2005/0200705 A1 | 9/2005 | Nieto | |
| 2006/0000988 A1 | 1/2006 | Stuart et al. | |
| 2006/0159440 A1 | 7/2006 | Purkayastha et al. | |
| 2006/0218410 A1 | 9/2006 | Robert et al. | |
| 2007/0034615 A1 | 2/2007 | Kleine | |
| 2007/0169616 A1 | 7/2007 | Vickroy | |
| 2008/0144673 A1 | 6/2008 | Gapontsev | |
| 2009/0091738 A1 | 4/2009 | Morcom | |
| 2009/0092157 A1 | 4/2009 | Gapontsev | |
| 2009/0224958 A1 | 9/2009 | Aphek et al. | |
| 2010/0076475 A1 | 3/2010 | Yates et al. | |
| 2010/0176097 A1 | 7/2010 | Zhu | |

OTHER PUBLICATIONS

Peavey et al., "Comparison of Cortical Bone Ablations by Using Infrared Laser Wavelengths 2.9 to 9.2 µm," Lasers in Surgery and Medicine, vol. 26, pp. 421-434, 1999.

Valentine, "COTS laser technology targets emerging battlefield threats," RF Design, Nov. 29, 2007, 2 pgs., downloaded on Jun. 27, 2009 from www.printthis.clickabiliyt.com/pt/cpt?action=cpt &title=COTTS+Laser+Technology+.

Waarts et al., "Fiber Lasers at JDS Uniphase," Fiber Lasers: Technology, Systems, and Applications, Proc. of Society of Photo-Opitcal Instrumentation Engineers, 2004, vol. 5335, 12 pgs.

Brown, J.M., "Digital Model of a Generic Infrared Tracker," Thesis in partial fulfillment of requirements for Master of Science in Electrical Engineering, May 1992, cover and pp. i-vii, 1-26, and 66-71, Indiana.

Dornheim, M.A., "Cost of Protection," Aviation Week, 2008, 2 pgs., downloaded from website http://aviationweek.com/aw/generic/story_generic.jsp?channel=awst&id=news/11145p3.xml.

Globalsecurity.org, "Large Aircraft Infrared Countermeasures (LAIRCM),"3 pgs., downloaded from http://ww.globalsecurity.org/military/systems/aircraft/systems/laircm.htm Dec. 9, 2008.

Matthews, W., "New Angle on Missile Defense; U.S. Overcomes Cost Obstacles With UAV-based Infrared Sensor," Defense News, Sep. 29, 2008, 3 pgs., downloaded Dec. 5, 2008 from http://www.defensenews.com/story.php?i=3746183.

Osborn, K., "Army looks to field laser jammer by 2010," Army Times, May 12, 2007, 2 pgs., downloaded from http://www.armtimes.com/new/2007/05/defense_bae_jammer_070511a/ Dec. 5, 2008.

Raytheon Company, "Scorpion Aircraft Protection System; Lightweight, Cost-Effective Missile Protection for Tactical Aircraft," 2006, 2 pgs.

"New Technology Aimed at Stopping Movie Piracy", downloaded from www.getthebigpicture.net, Sep. 22, 2009, 2 pgs.

* cited by examiner

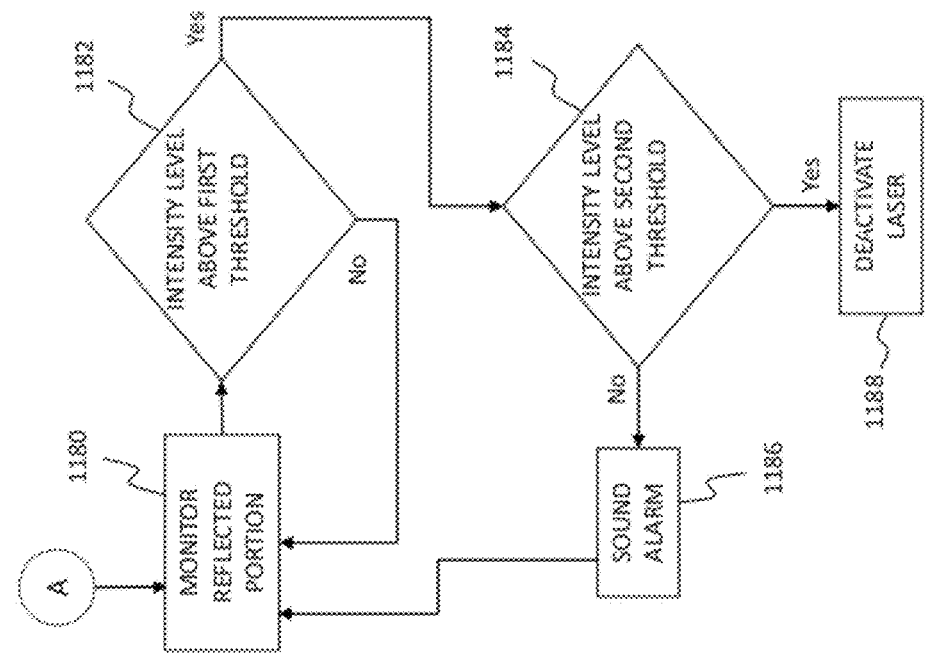
FIG. 27
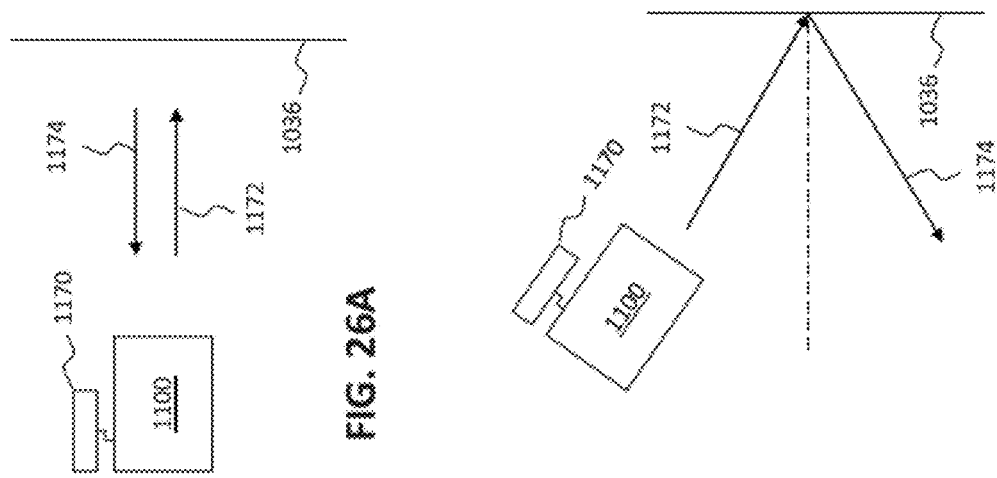
FIG. 26A
FIG. 26B

SCENE ILLUMINATOR

RELATED APPLICATIONS

This application is a continuation-in-part of U.S. patent application Ser. No. 12/541,772, filed Aug. 14, 2009, now U.S. Pat. No. 8,305,252, and is a continuation-in-part of U.S. patent application Ser. No. 12/511,056, filed Jul. 28, 2009, now U.S. Pat. No. 8,436,276 the disclosures of which are expressly incorporated by reference herein.

U.S. patent application Ser. No. 12/778,870, filed May 12, 2010, titled MODULATION DEVICE FOR A MOBILE TRACKING DEVICE, now U.S. Pat. No. 8,367,991, and U.S. patent application Ser. No. 12/778,643, filed May 12, 2010, titled HIGH POWER LASER SYSTEM, now U.S. Pat. No. 8,420,977,are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND OF THE INVENTION

The present invention relates generally to devices for identifying objects within a scene and in particular identifying electro-optic devices within a scene.

In today's world more devices include electro-optic devices. These electro-optic devices are often used to image a scene or to identify objects within a scene. Exemplary electro-optic devices include still image cameras, video cameras, non-imaging tracking devices, and imaging tracking devices. These devices often times are used to image scenes which result in the invasion of privacy of individuals and companies and potential theft of information.

One area wherein theft of information through electro-optic devices is prevalent is in the movie industry. Individuals may attempt to record a movie being shown in a theater for later viewing or resale. Some movie theaters now include technology to disrupt these practices. For instance, infrared light projectors are directed towards the audience to disrupt the recording quality of unauthorized recordings.

However, unlike movie theaters wherein no recording devices should be recording a movie, in many situations it is desired to permit recording of some, but not all devices. Examples include movie sets, research facilities, military installations, airports, sporting events being taped for television, private residences, and more. By way of example, on a movie set, the production company wants to be able to record a scene, but would likely want to prevent unauthorized recordings by a third party. By way of another example, at a home, a parent may want to take pictures or video of a child's birthday party, but would likely want to prevent unauthorized pictures or video, such as by the paparazzi. By way of yet another example, in police or military actions, it may be desired to disable electro-optic devices within a region that are not associated with the police or military.

In all of these situations, the electro-optic devices within a region are split into at least two groups, authorized electro-optic devices and non-authorized electro-optic devices. A need exists for a system that is able to distinguish between authorized electro-optic devices and non-authorized electro-optic devices and to take action relative to the non-authorized electro-optic devices.

SUMMARY OF THE INVENTION

In an exemplary embodiment of the present disclosure, a method of hampering unauthorized electro-optic (EO) devices is provided. The method comprising the steps of: interrogating an area with optical energy from at least one optical source; receiving a reflection from a first electro-optic device; storing optically detectable characteristics for a plurality of authorized electro-optic devices; comparing an optically detectable characteristic of the received reflection of the first electro-optic device to the stored optically detectable characteristics of authorized devices to determine if the first electro-optic device is an authorized device; and if the first electro-optic device is an unauthorized device, hampering the operation of the first electro-optic device.

In another exemplary embodiment of the present disclosure, an apparatus for interacting with an EO device in an environment is provided. The apparatus comprising at least one optical source emitting optical energy into the environment towards the EO device; at least one detector detecting the optical energy retro-reflected from the EO device; and a controller operatively coupled to the at least one optical source and the at least one detector. The controller analyzing the detected optical energy to determine whether the EO device is an authorized EO device or an unauthorized device.

In yet another exemplary embodiment of the present disclosure, an apparatus for interacting with an EO device is provided. The apparatus comprising: a body; at least one propulsion device supported by the body; a privacy device which monitors the environment surrounding the body for an unauthorized EO device; a controller operatively connected to the privacy device, the controller determining a presence of the unauthorized EO device in the environment surrounding the body based on information collected by the privacy device and a current location of the unauthorized EO device; and a modulation system which receives the current location of the unauthorized EO device from the controller, orients a tracking system of the modulation system based on the current location of the unauthorized EO device, detects the unauthorized EO device, updates the location of the unauthorized EO device, and directs a continuous beam of optical energy at the unauthorized EO device.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 26A illustrates a first positioning of the laser directing device relative to the barrier;

FIG. 26B illustrates a second positioning of the laser directing device relative to the barrier;

FIG. 27 illustrates a processing sequence of a controller of the portable cutting device;

Figure 1:
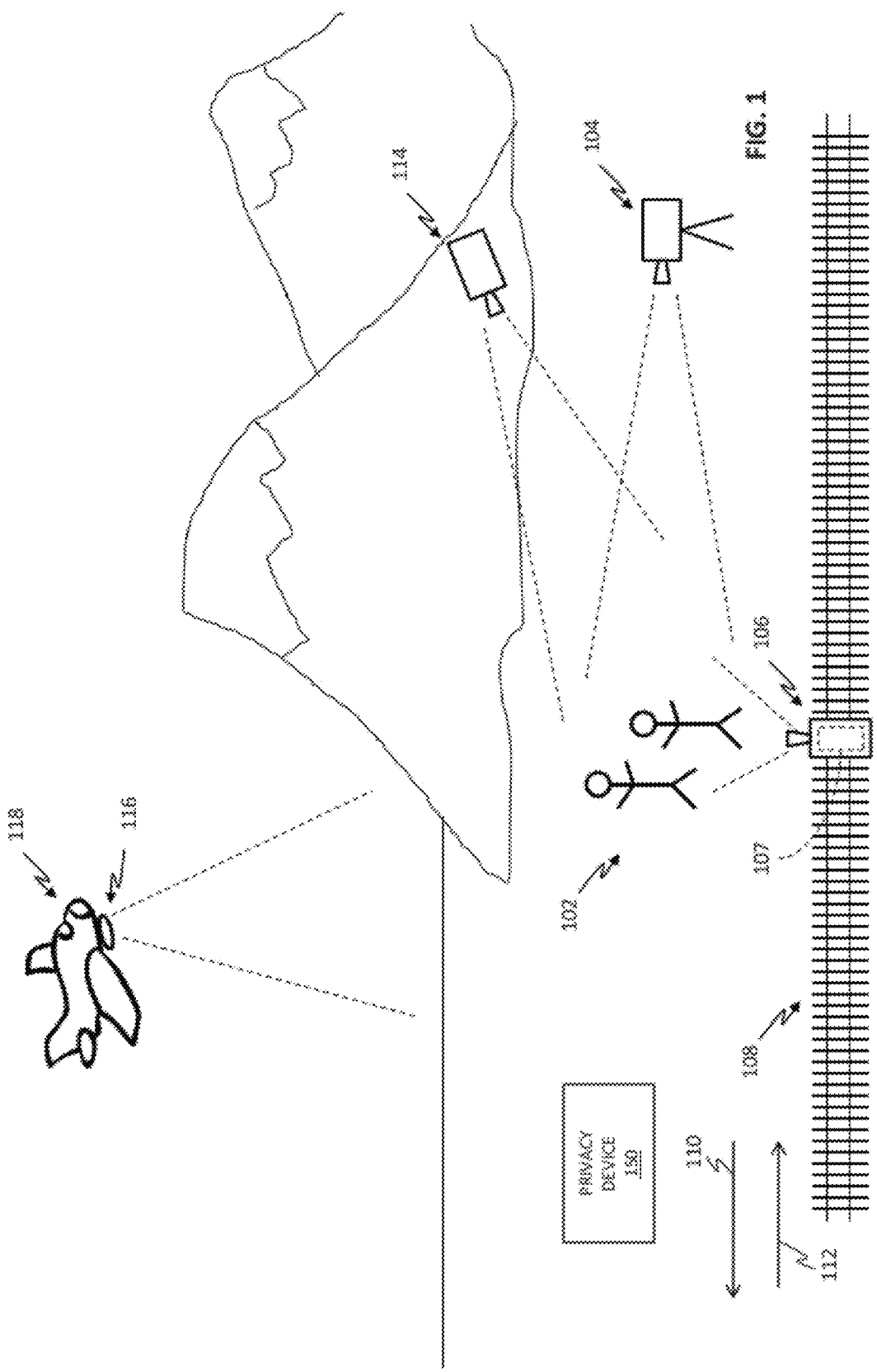
FIG. 1 is a representative view of a scene having a plurality of EO devices positioned therein.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring to FIG. 1, a movie set 100 is shown. The set 100 includes a plurality of actors 102 which are being filmed by a first camera 104 and a second camera 106. First camera 104 is a stationary camera. Second camera 106 is a movable camera which is mounted to a platform 107 which moves the second camera 106 on a track 108 in directions 110 and 112. Both of first camera 104 and second camera 106 are owned by the movie company and intended to be filming the scene, in this case actors 102. Cameras 104 and 106 are referred to as authorized cameras because the entity producing the movie desires that these electro-optic devices ("EO devices") be able to record images regarding the scene. Exemplary EO devices include still image cameras, video cameras, non-imaging mobile tracking devices, imaging mobile tracking devices, binoculars, scopes, retro-reflective identification markers which can be attached to clothing or other articles, optical detection systems, and optical imaging systems. Exemplary EO devices may operate in one or more of the infrared band, the visible band, and the ultraviolet band.

In addition to authorized cameras 104 and 106, two unauthorized cameras 114 and 116 are shown. Camera 114 may be a still camera used by a paparazzi to obtain unauthorized photographs of one or more of the actors 102. Camera 116 is attached to a movable platform, illustratively an airplane 118.

Also, represented in FIG. 1 is a privacy device 150 which scans the scene to detect EO devices and to hamper the operation of unauthorized EO devices. Exemplary methods of hampering the operation of an unauthorized EO device including blinding the device, jamming the operation of the device, permanently disabling a portion of the device, and destroying the device. An EO device is blinded when its optical components are saturated.

Figure 2:
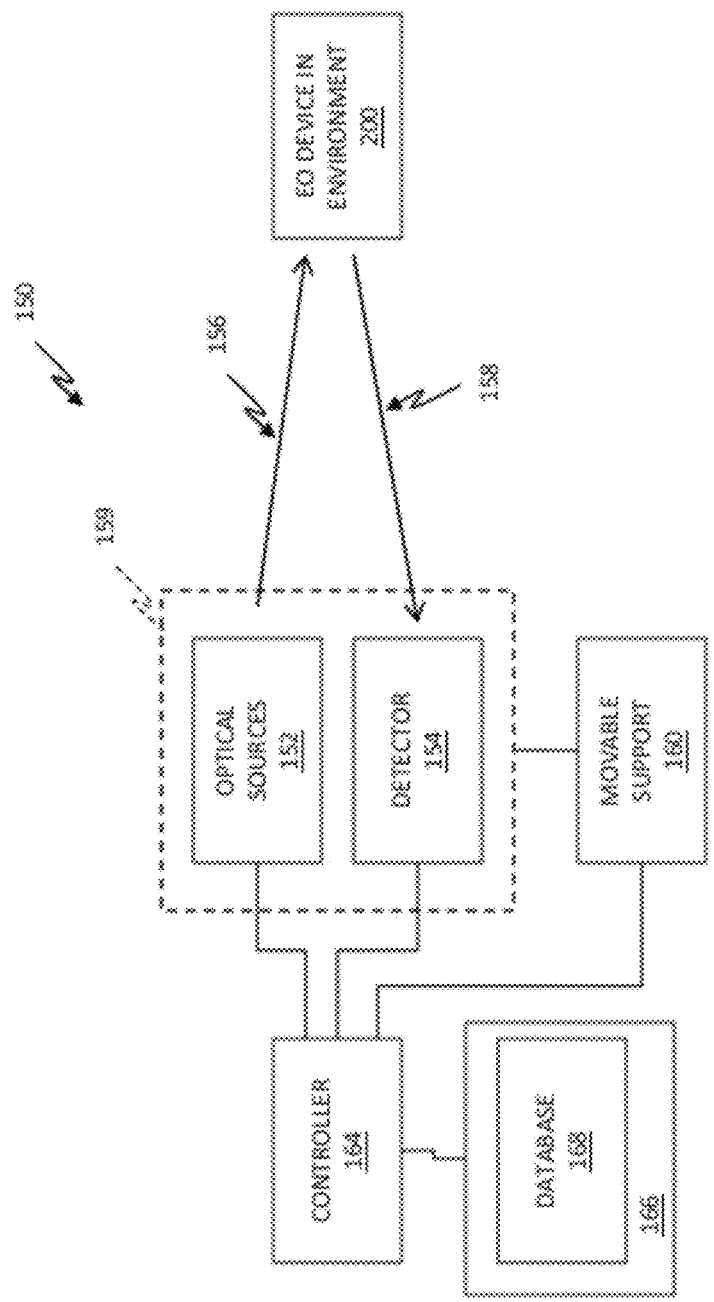
FIGS. 2-2C are representative views of a privacy device which monitors the scene of FIG. 1 to determine the presence of unauthorized EO devices and to hamper their operation.

Referring to FIG. 2, privacy device 150 includes one or more optical sources 152 and one or more detectors 154. In one embodiment, privacy device 150 includes a single optical source 152 and a single detector 154. In one embodiment, privacy device 150 includes multiple optical sources 152 and multiple detectors 154. In one example, each optical source generates optical energy within a respective band permitting privacy device 150 to detect EO devices in one or more of multiple bands.

Each optical source 152 sends out an optical beam 156. Reflected energy 158 from an EO device 200 in the environment is received by the respective detector 154. The detector 154 receives the reflected energy 158 from the EO device 200. Based on the received reflected energy 158, a controller 164 of privacy device 150 decides whether the EO device 200 is an authorized EO device or not. Exemplary optical sources 152 are disclosed herein and in U.S. patent application Ser. No. 12/541,772, filed Aug. 14, 2009, now U.S. Pat. No. 8,305,252; U.S. patent application Ser. No. 12/511,056, filed Jul. 28, 2009; now U.S. Pat. No. 8,436,276, U.S. patent application Ser. No. 12/778,643, titled HIGH POWER LASER SYSTEM, filed May 12, 2010, now U.S. Pat. No. 8,420,977; and U.S. patent application Ser. No. 12/778,870, titled MODULATION DEVICE FOR A MOBILE TRACKING DEVICE, filed May 12, 2010, now U.S. Pat. No. 8,367,991, the disclosures of which are expressly incorporated by reference herein. In one embodiment, an exemplary optical source generates optical energy having a wavelength of at least about 1.5 microns.

In one embodiment, the optical sources 152 and detectors 154 are positioned within a housing 159 which is supported by a moveable support 160. Controller 164 orients the direction that optical beam 156 is sent by adjusting the position of housing 159 through moveable support 160. In one embodiment, moveable support 160 is a turret. Exemplary moveable supports, such as positioning systems, are disclosed herein and in U.S. patent application Ser. No. 12/541,772, filed Aug. 14, 2009, now U.S. Pat No. 8,305,252, the disclosure of which is expressly incorporated by reference herein. In one embodiment, housing 159 is a handheld device and an operator moves housing 159 about to sweep an area with optical beam 156. Exemplary handheld devices are disclosed in U.S. patent application Ser. No. 12/511,056, filed Jul. 28, 2009, now U.S. Pat. No. 8,436,276, the disclosure of which is expressly incorporated by reference herein.

Privacy device 150 further includes a controller 164 which analyzes the received reflected energy to determine whether the EO device 200 is an authorized device or an unauthorized device. In one embodiment, controller 164 has access to a memory 166 which includes a database 168 that includes optically detectable characteristics of authorized EO devices. Exemplary optically detectable characteristics include number of optical components in reflected energy, modulation of reflected energy, layout of detection components, and other suitable characteristics.

Related to the number of optical components, the number of retro reflections and their spacing may be indicative of the number of optical components in the imaging or detection system of the EO device 200. In one example, the optical beam 156 is pulsed or chopped to better detect the spacing between retro reflections.

Related to the modulation of the reflected energy 158, some EO devices 200 include chopper devices, such as reticules, which disrupt the propagation of optical energy. These chopper devices produce distinctive modulation patterns in reflected energy 158 which may be detected through an analysis of the Fourier spectrum of reflected energy 158.

Related to the layout of detection components, many EO devices 200 include a multi-element detector. Exemplary multi-element detectors include CCD arrays and other types of detectors. The faces of these elements and the gaps therebetween provide a reflected image of multi-element detector. This reflected image may be characteristic of the type of EO device. The reflected image may be compared to known characteristics by comparing the Fourier spectrum of the reflected image with known EO devices.

Figure 2A:
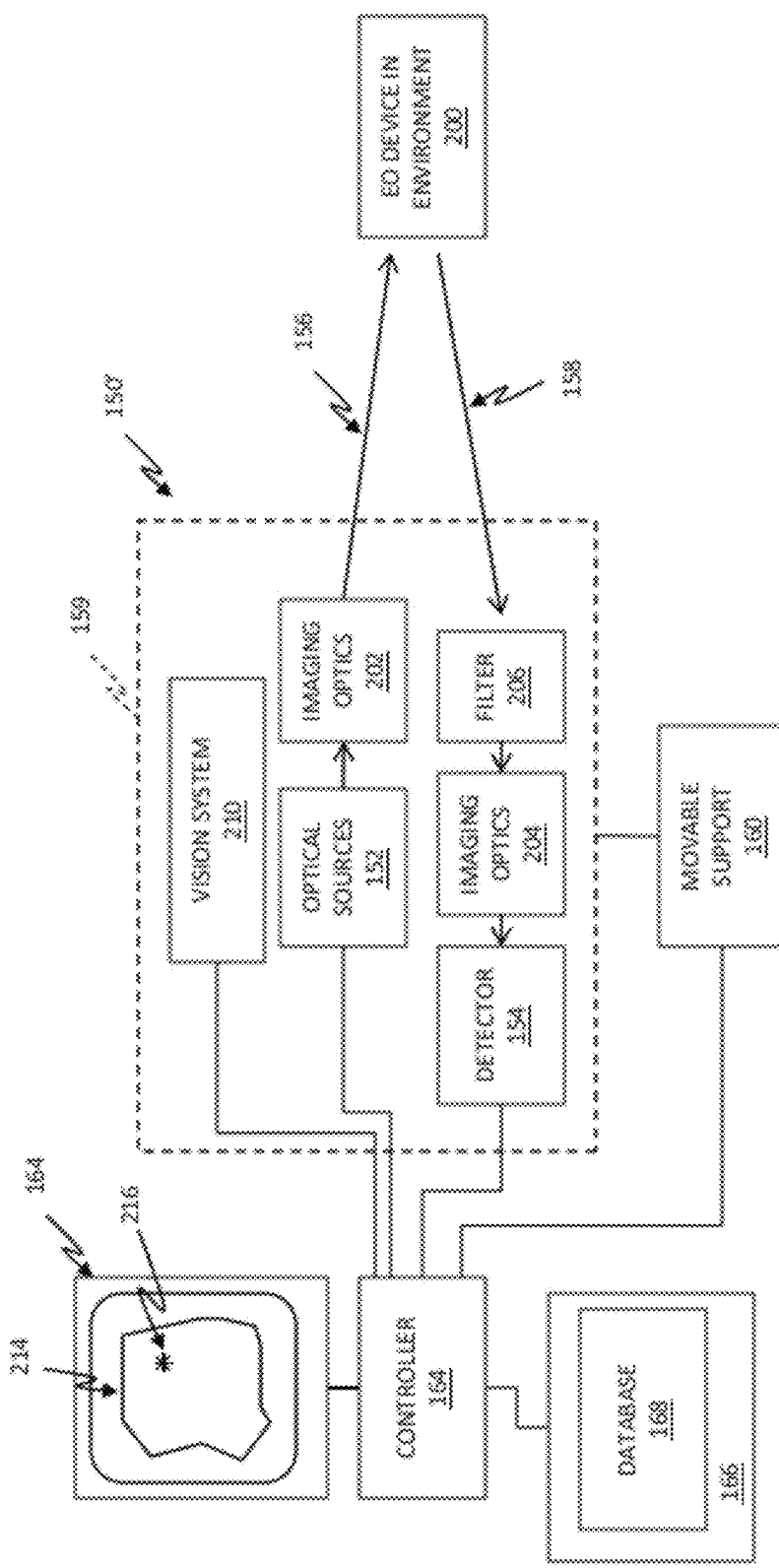

Referring to FIG. 2A, privacy device 150' in one embodiment includes imaging optics 202 which shape the optical energy propagated from optical sources 152 into the environment. In one embodiment, imaging optics 202 include a beam expander which produces a generally collimated beam of optical energy having an enlarged cross-sectional area. In one embodiment, imaging optics 202 also excludes focusing optics to focus the optical energy produced by optical sources 152 onto imaging optics 202 or an associated asset. By focusing the optical energy the operation of EO device 200 may be hampered. In one embodiment, the power level of one or more of optical sources 152 is also raised to hamper the operation of EO device 200.

In one example, EO device 200 is an infrared tracking device having a seeker head traveling in a first direction towards privacy device 150. The increased power level of the optical source 152 is directed into a seeker head of the infrared tracking device to generate at least one localized source within the mobile tracking device and within a field of view of the infrared tracking device. This indicates a second direction of travel for the infrared tracking device. In one example, as the direction of travel of the infrared tracking device is changed, the orientation of the privacy device is also changed to continue to direct optical energy into the seeker head of the infrared tracking device. This again results in the generation of at least one localized source within the infrared tracking device and within the field of view of the infrared tracking device which indicates a third direction of travel for the infrared tracking device.

In addition, privacy device 150' may include imaging optics 204 which image the received reflected energy 158 on detectors 154. Privacy device 150' may include one or more filters 206 which are configured to pass the optical energy of optical sources 152 while at least partially blocking optical energy at other wavelengths. This reduces the amount of energy that reaches detectors 154 from diffuse reflections as opposed to retro-reflections.

Privacy device 150' may also include a vision system 210 which provides an image of the environment to controller 164. In one embodiment, controller 164 displays the image 214 of the environment on a display 212. In one embodiment, controller 164 further displays an icon 216 on image 214 to indicate the location of EO device 200.

In one embodiment, the stored optically detectable characteristics for authorized EO devices are one or more identification markers in a Fourier transform of reflected energy. When reflected optical energy is received by detectors 154, controller 164 performs a fast Fourier transform of the received information and compares one or more portions of the fast Fourier transform to the characteristics stored in database 168. Based on the correlation between the fast Fourier transform of the received reflected optical energy and one or more of the stored characteristics, the detected EO device may be classified as either an authorized EO device (match) or an unauthorized EO device (no match).

Figure 3:
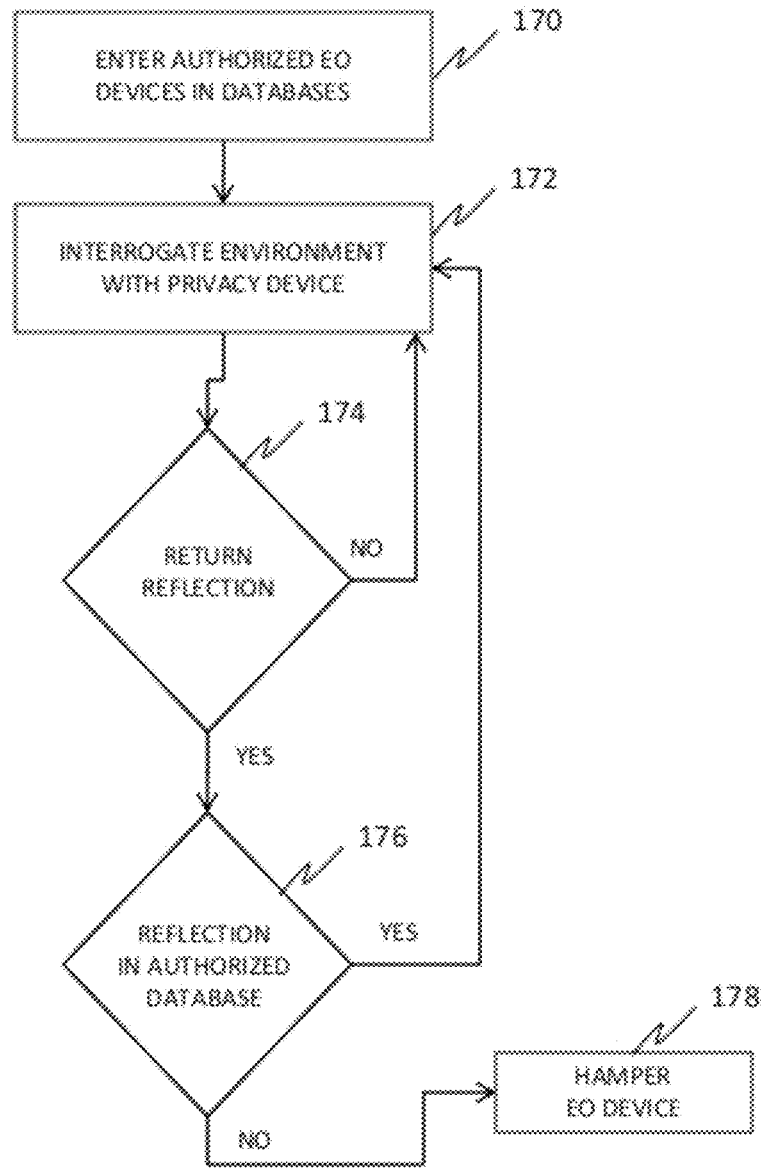
FIG. 3 is a representative view of an exemplary processing sequence of the privacy device of FIG. 2.

Referring to FIG. 3, an exemplary processing sequence of controller 164 is illustrated. Optically detectable characteristics of authorized EO devices are stored in a database 168 accessible by controller 164, as represented by block 170. These values may be downloaded through a wired or wireless connection to a remote computer (not shown). Controller 164 interrogates the environment with optical sources 152 to detect the presence of an EO device 200, as represented by block 172. If an EO device 200 is present, one of detectors 154 receives a return reflection from the optics of the EO device, as represented by block 174. This return reflection from the EO device 200 is compared to the optically detectable characteristics stored in database 168, as represented by block 176.

Figure 2B:
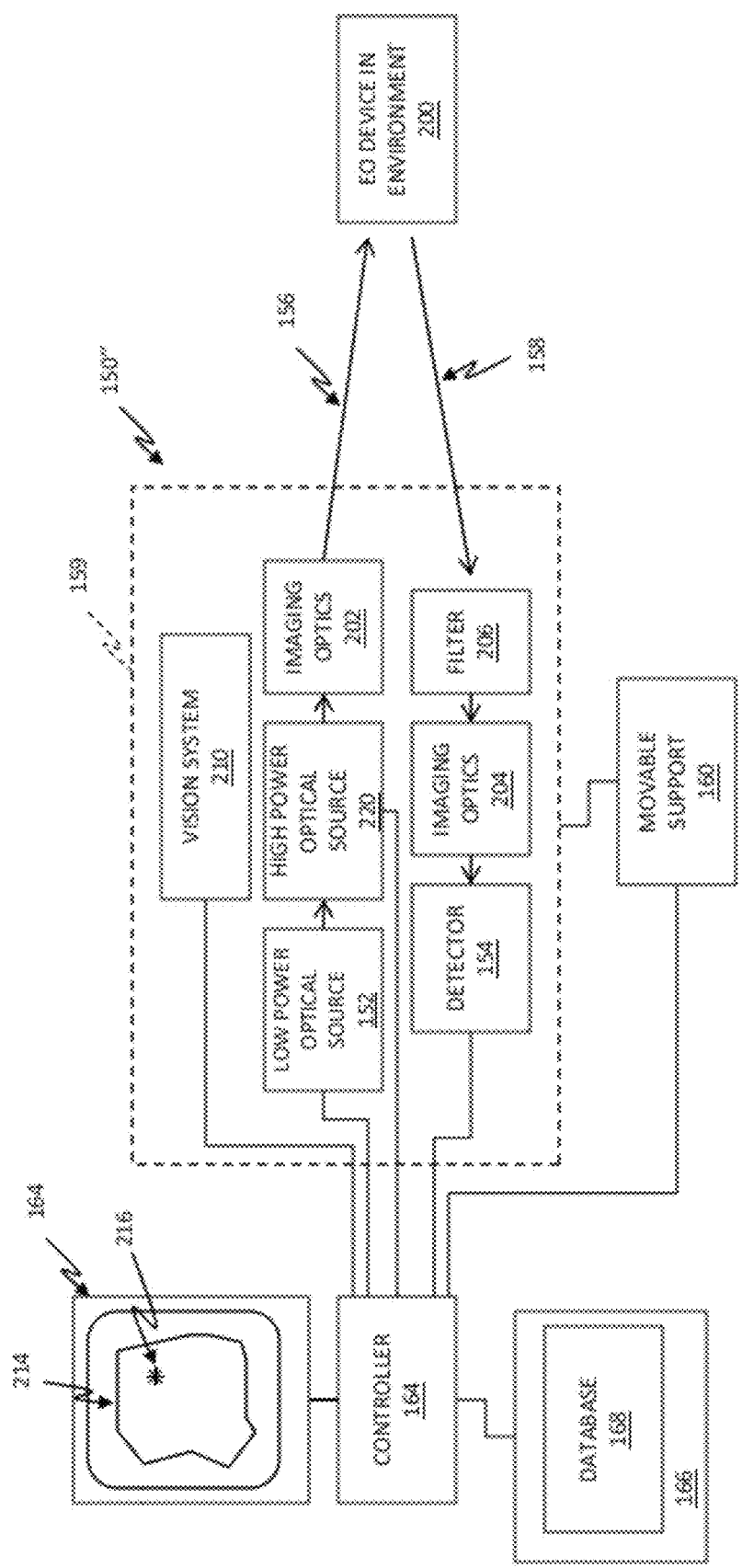

If the EO device 200 is an unauthorized device, then controller 164 raises the power level of at least one of optical sources 152 to hamper the operation of EO device 200 by one or more of altering the direction of the EO device (in the case that the EO device 200 is an IR tracking device), blinding the EO device, or destroying the EO device, as represented by block 178. Referring to FIG. 2B, in one embodiment controller 164 uses another optical source 220 to hamper the operation of EO device 200. Exemplary systems for hampering the operation of EO devices are disclosed herein and in U.S. patent application Ser. No. 12/541,772, filed Aug. 14, 2009, now U.S. Pat. No. 8,305,252; U.S. patent application Ser. No. 12/511,056, filed Jul. 28,2009; now U.S. Pat. No. 8,436,276; and U.S. patent application Ser. No. 12/778,643, titled HIGH POWER LASER SYSTEM, filed May 12, 2010, now U.S. Pat. No. 8,420,977, the disclosures of which are expressly incorporated by reference herein. In one embodiment, privacy device 150 serves as the warning/cuing system or vision system for the various systems disclosed herein and in U.S. patent application Ser. No. 12/541,772, filed Aug. 14, 2009, now U.S. Pat. No. 8,305,252; U.S. patent application Ser. No. 12/778,643, titled HIGH POWER LASER SYSTEM, filed May 12, 2010, now U.S. Pat. No. 8,420,977; and U.S. patent application Ser. No. 12/778,870, titled MODULATION DEVICE FOR A MOBILE TRACKING DEVICE, filed May 12, 2010, now U.S. Pat. No. 8,367,991, the disclosures of which are expressly incorporated by reference herein.

The optical sources 152 may also be used to illuminate a region so that a two-dimensional bar code or other identification carried by an article may be imaged by detector 154 and compared to a database of authorized articles.

Figure 2C:
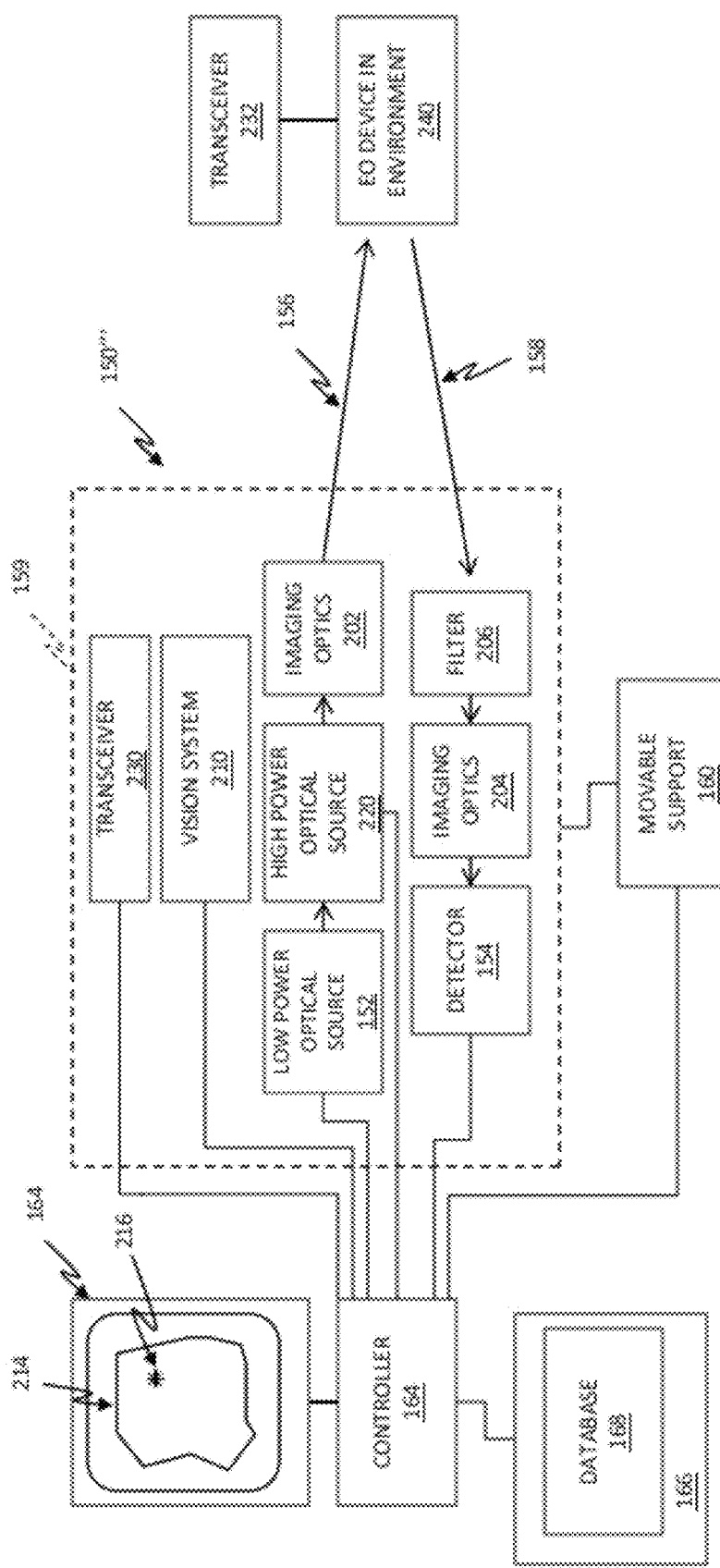

Referring to FIG. 2C, in one embodiment, privacy device 150 includes a transceiver 230 which sends out an encrypted message which is received by a transceiver 232 of an authorized EO device 240. In one embodiment, the encrypted message is a public key which is readable by a controller of the authorized EO device 240. The authorized EO device 240 responds with a second encrypted message that is received by transceiver 230 of privacy device 150. In one embodiment, the second encrypted message is a private key which is sent in response to the public key and which is readable by controller 164 of privacy device 150. In one embodiment, transceiver 230 and transceiver 232 each include spatial light modulators which generate the respective signals and detectors which detect the respective signals.

In one embodiment, privacy device 150 once an unauthorized EO device 200 is detected, broadcasts an encrypted message with transceiver 230 to warn all authorized EO devices 240 that privacy device 150 is about to hamper the operation of an unauthorized EO device 200. Authorized EO devices 240 receives the message with transceiver 232 and take action to protect their respective electro-optic components. Exemplary actions include closing a shutter, altering an orientation of the authorized EO device 240, and other suitable actions to limit the amount of optical energy which is received by the respective optical system.

Figure 4:
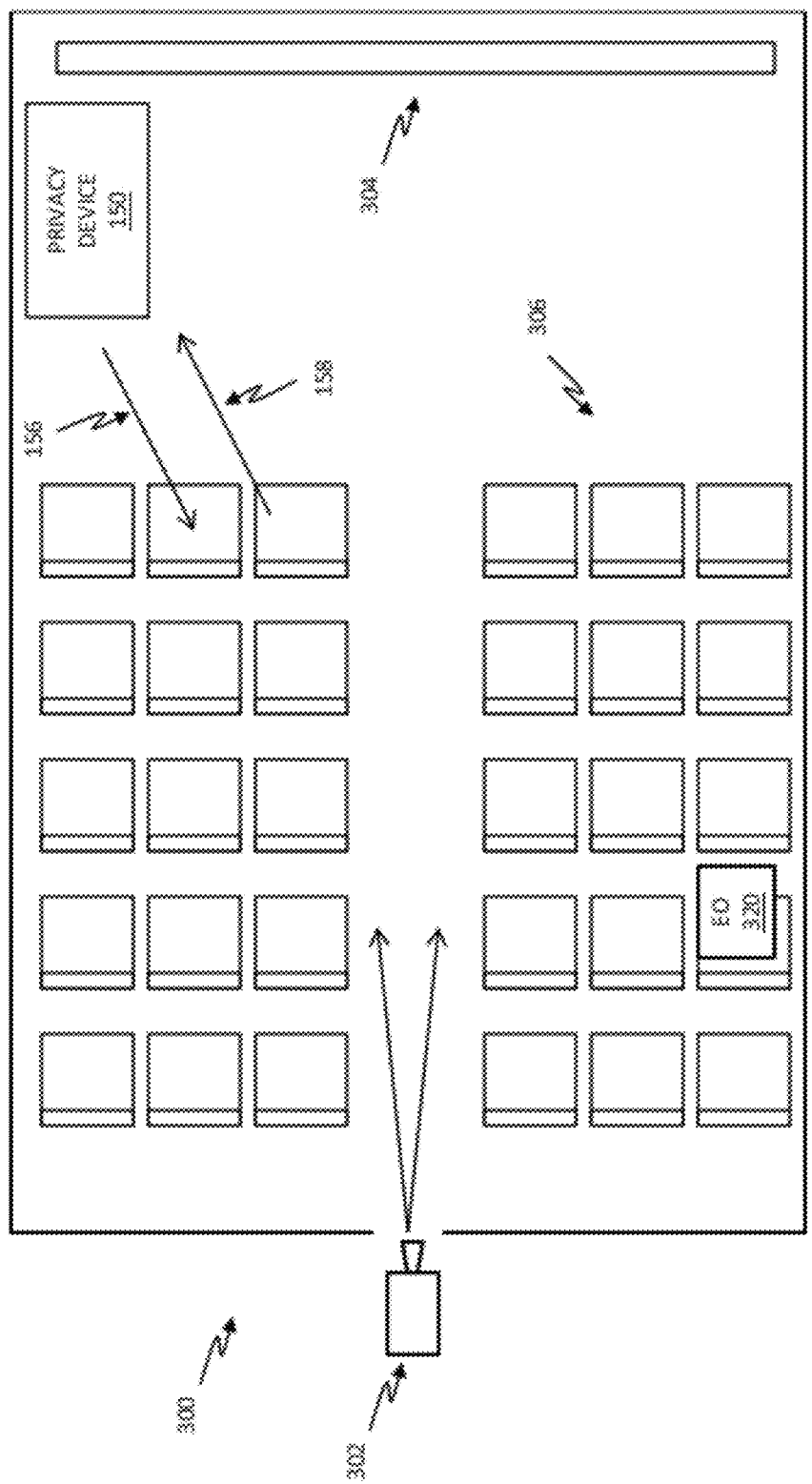
FIG. 4 is a representative view of a movie theater scene having a plurality of EO devices positioned therein.

Referring to FIG. 4, an exemplary environment for privacy device 150 is shown. In FIG. 4, a movie theater 300 is represented. Movie theater 300 includes a camera 302 which projects the movie on a screen 304 for viewing by an audience seated in seats 306. Privacy device 150 scans the movie theater 300 for EO devices. Privacy device 150 receives a retro-reflection from camera 302 and recognizes it as an authorized EO device. Another EO device 320, such as a portable video camera, also provides a retro-reflection. Privacy device 150 does not recognize EO device 320 as an authorized EO device. In one embodiment, privacy device 150 hampers the operation of EO device 320. In one embodiment, privacy device 150 provides location information concerning EO device 320 to theater personnel who remove the user of the EO device 320 from the theater.

The privacy device may be incorporated into or used in conjunction with modulation devices which may be implemented to protect aircraft, such as commercial airlines and military aircraft or other types of assets. Exemplary assets include moveable assets, such as aircraft, ships, buses, or trucks, or land based assets, such as an airport, factory, building, or facility. Exemplary modulation devices include countermeasure devices.

Figure 5:
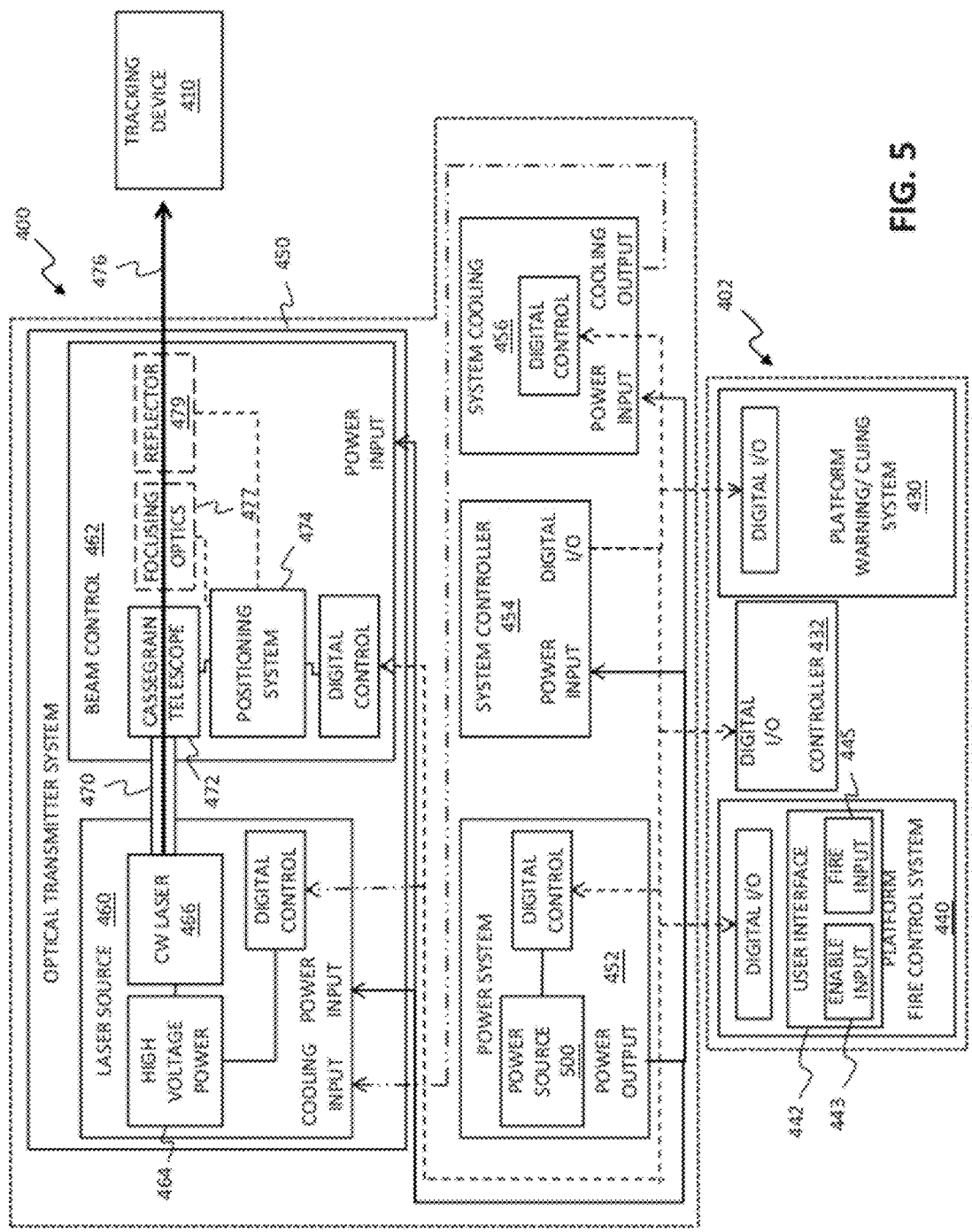
FIG. 5 illustrates a representative view of a modulation device and associated asset.

Referring to FIG. 5, a modulation device 400 is shown. Modulation device 400 is coupled to an asset 402. For purposes of discussion, asset 402 is considered to be an airplane, such as the airplane designated 402 in FIG. 6. However, the present disclosure is contemplated for use with a multitude of different assets. Airplane 402 includes a body or fuselage 404, a pair of main wings 405, tail wings 406, and a plurality of propulsion devices 408. Exemplary propulsion devices include jet engines, internal combustion engines with associated propellers, and any other suitable engine arrangement.

Figure 7:
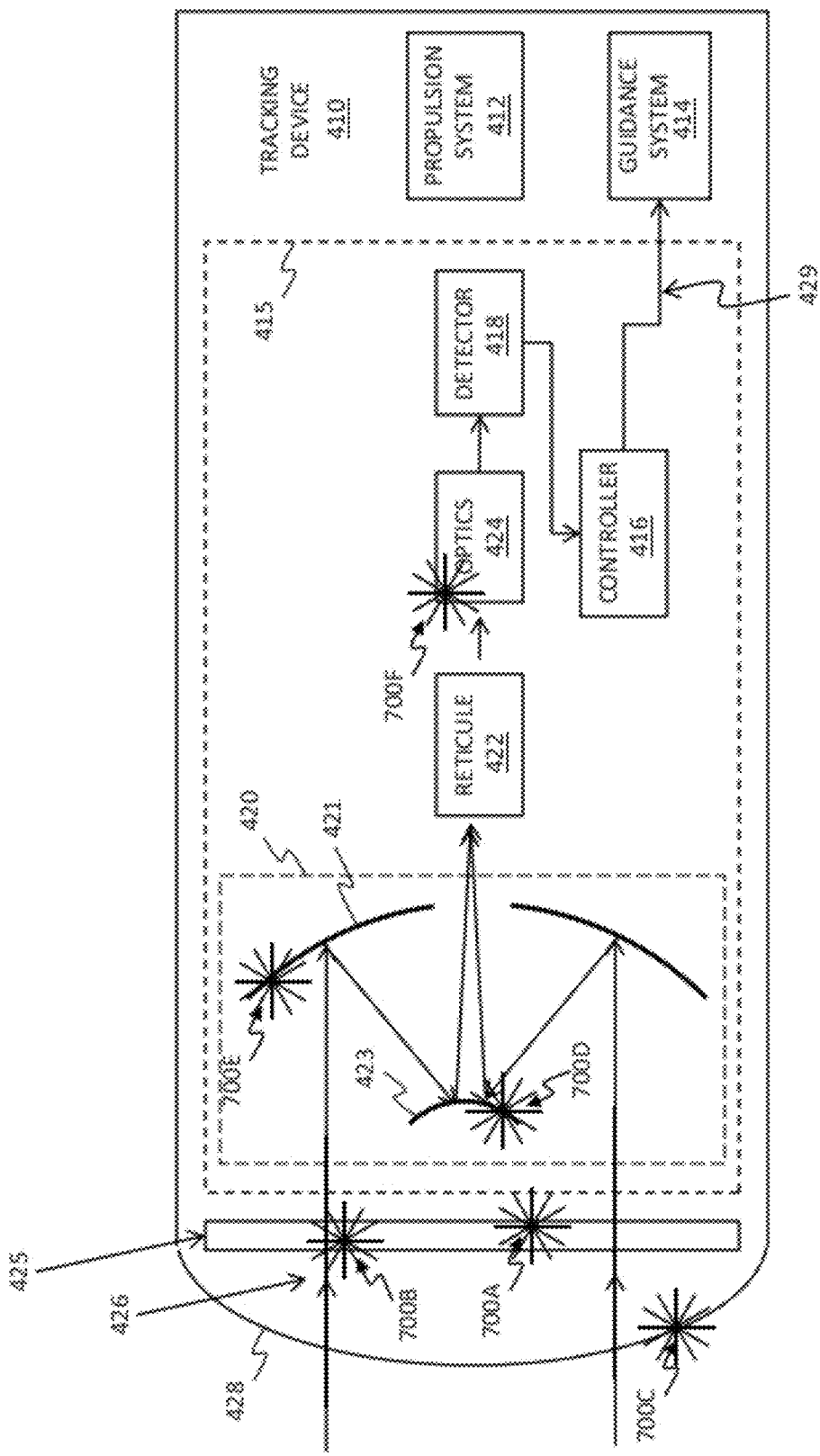
FIG. 7 illustrates an exemplary mobile tracking device.

Referring to FIG. 7, components of a mobile tracking device 410 are shown. Mobile tracking device 410 includes a propulsion system 412 which provides power to propel mobile tracking device 410. Exemplary propulsion systems include solid fuel rockets, engines, and any other suitable devices for providing power to mobile tracking device 410. Mobile tracking device 410 also includes a guidance system 414 which controls the direction of travel of mobile tracking device 410. Exemplary guidance system components include wings for an airborne mobile tracking device 410, a rudder for a marine mobile tracking device 410, and ground engaging members for a land based mobile tracking device 410. The guidance system 414 steers mobile tracking device 410 to change a direction of travel of mobile tracking device 410. Exemplary airborne tracking devices include rockets, airplanes, and other flying devices. Exemplary marine tracking devices include boats (see FIG. 15), submersible devices, and other marine devices. Exemplary land based tracking devices include wheeled devices, tracked devices, and other suitable land based devices.

Mobile tracking device 410 includes a controller 416 which controls the operation of propulsion system 412 and guidance system 414. Mobile tracking device 410 also includes a gimbaled seeker head 415 which is able to move independent of the remainder of mobile tracking device 410. Seeker head 415 supports controller 416, a detector 418, telescope 420, a reticule 422, and optics 424.

In operation, electromagnetic radiation 426 from the environment enters an optical window 428 of mobile tracking device 410. Optical window 428 may be a dome. Optical window 428 may be selected to only pass electromagnetic radiation 426 within a certain wavelength band. For instance, in the case of an infrared mobile tracking device 410, optical window 428 may only pass electromagnetic radiation 426 within the infrared spectrum or a portion of the infrared spectrum. In other embodiments, a separate filter 425 is included somewhere within the optical setup of mobile tracking device 410 to limit the range of wavelengths of electromagnetic radiation 426 passed on to detector 418. Filter 425 is shown between optical window 428 and telescope 420.

However, filter 425 may be positioned anywhere between optical window 428 and detector 418.

The electromagnetic radiation 426 is received by telescope 420. Telescope 420 includes a primary mirror 421 which focuses the electromagnetic radiation 426 towards a secondary mirror 423. Secondary mirror 423 in turn focuses the electromagnetic radiation 426 towards reticule 422. Reticule 422 spins to provide a modulated signal of the electromagnetic radiation. Optics 424 receives and focus the modulated signal of the electromagnetic radiation 426 passing through reticule 422 onto detector 418 which is a non-imaging detector.

Controller 416 receives input from detector 418 which is used by controller 416 to determine the location the brightest object in the environment, typically asset 402. The modulated signal allows controller 416 to discriminate between background electromagnetic radiation and the radiation of asset 402, as well as, determine the location of asset 402 relative to a direction of travel of mobile tracking device 410. Based on this input from detector 418, controller 416 determines a desired direction of travel for mobile tracking device 410 which corresponds to tracking device 410 heading towards asset 402. Seeker head 415 is adjusted to center the brightest object in the environment so that seeker head 415 is pointed directly at the brightest object. Controller 416 provides this adjustment of seeker head 415 (from its intended orientation in line with the direction of travel of mobile tracking device 410) to guidance system 414 as error signal 429. Guidance system 414 uses this error signal 429 to alter the direction of travel of mobile tracking device 410. Over time, if mobile tracking device 410 is tracking asset 402 mobile tracking device 410 will be pointed at asset 402 and seeker head 415 generally produces a small error signal which is indicative of mobile tracking device 410 being aligned to intercept asset 402.

In the embodiment illustrated in FIG. 7, mobile tracking device 410 includes a spinning reticule 422. In another embodiment, mobile tracking device 410 does not include reticule 422 but rather secondary mirror 423 is tilted and telescope 420 is spun to produce a signal for controller 416. In one embodiment, detector 418 is an imaging detector and controller 416 processes the images from detector 418 to determine the location of asset 402.

Returning to FIG. 6, airplane 402 includes warning/cuing system 430 which detects when a mobile tracking device 410 has been launched and/or is tracking airplane 402. Warning/cuing system 430 includes sensor modules 431 which monitor the environment around airplane 402. Illustratively, four sensor modules 431A-D are shown. Depending on the asset 402 being protected, fewer or additional sensor modules 431 may be used. In one embodiment, sensor modules 431 include focal plane array sensors with wide field of views that continuously survey the environment for mobile tracking devices 410. In one embodiment, warning/cuing system 430 looks for a characteristic signal that indicates the launch of an airborne mobile tracking device 410. In the case of airborne mobile tracking device 410, the mobile tracking device 410 has a characteristic infrared and ultraviolet signature which warning/cuing system 430 recognizes as an airborne mobile tracking device 410.

Exemplary warning/cuing systems are disclosed in U.S. patent application Ser. No. 12/541,772, filed Aug. 14, 2009, the disclosure of which is expressly incorporated by reference herein. As explained herein, warning/cuing system 430 communicates with modulation device 400. Modulation device 400, in turn, provides optical energy from a continuous wave laser to redirect mobile tracking device 410 from tracking the path of asset 402 or to disable mobile tracking device 410. In one embodiment, warning/cuing system 430 is provided as part of modulation device 400 instead of as a separate component of airplane 402.

Airplane 402 further includes a fire control system 440. Fire control system 440 interprets information provided by warning/cuing system 430 and provides a user interface 442 through which the operator of asset 402 activates modulation device 400. In one embodiment, user interface 442 includes a user input 443 to enable modulation device 400 and a user input 445 to permit modulation device 400 to fire. In one embodiment, modulation device 400 is automatically activated when asset 402 is moving. Exemplary inputs include switches, buttons, and other suitable types of user inputs.

Returning to FIG. 5, modulation device 400 is represented. Modulation device 400 includes an optical transmitter system 450, a power system 452, a system controller 454, and a cooling system 456. Each of optical transmitter system 450, power system 452, and cooling system 456 are coupled to system controller 454. System controller 454 receives input from and provides instructions to each of optical transmitter system 450, power system 452, and cooling system 456 to control the operation of modulation device 400. As explained herein, in one embodiment, modulation device 400 is housed in a self-contained pod which may be coupled to asset 402.

Optical transmitter system 450 includes a laser source module 460 and a beam control module 462. Laser source module 460 includes a high voltage power supply 464 which receives power from power system 452. High voltage power supply 464 drives a continuous wave laser 466. In one embodiment, continuous wave laser 466 is a continuous wave fiber laser. In one embodiment, continuous wave laser 466 is a continuous wave Ytterbium single mode fiber laser. Details regarding an exemplary continuous wave laser 466 are provided in U.S. patent application Ser. No. 11/973,437, titled POWERFUL FIBER LASER SYSTEM, filed Oct. 9, 2007, now U.S. Pat. No. 7,593,435, assigned to IPG Photonics Corporation, the disclosure of which is expressly incorporated by reference herein. Details regarding an exemplary continuous wave laser 466 are provided in U.S. patent application Ser. No. 11/611,247, titled FIBER LASER WITH LARGE MODE AREA FIBER, filed Dec. 15, 2006, now abandoned, assigned to IPG Photonics Corporation, the disclosure of which is expressly incorporated by reference herein. In one embodiment, continuous wave laser 466 is a solid state laser. Other exemplary continuous wave lasers include a 2.0 micrometer (µm) Thulium Fiber Laser (1.96-2.2 (µm) Thulium laser) having an output power of about at least 1 kW and a 1.0 µm, 800 Watt Direct Diode. An exemplary Thulium fiber laser is disclosed in U.S. Pat. No. 6,801,550, the disclosure of which is expressly incorporated by reference herein.

Figure 8:
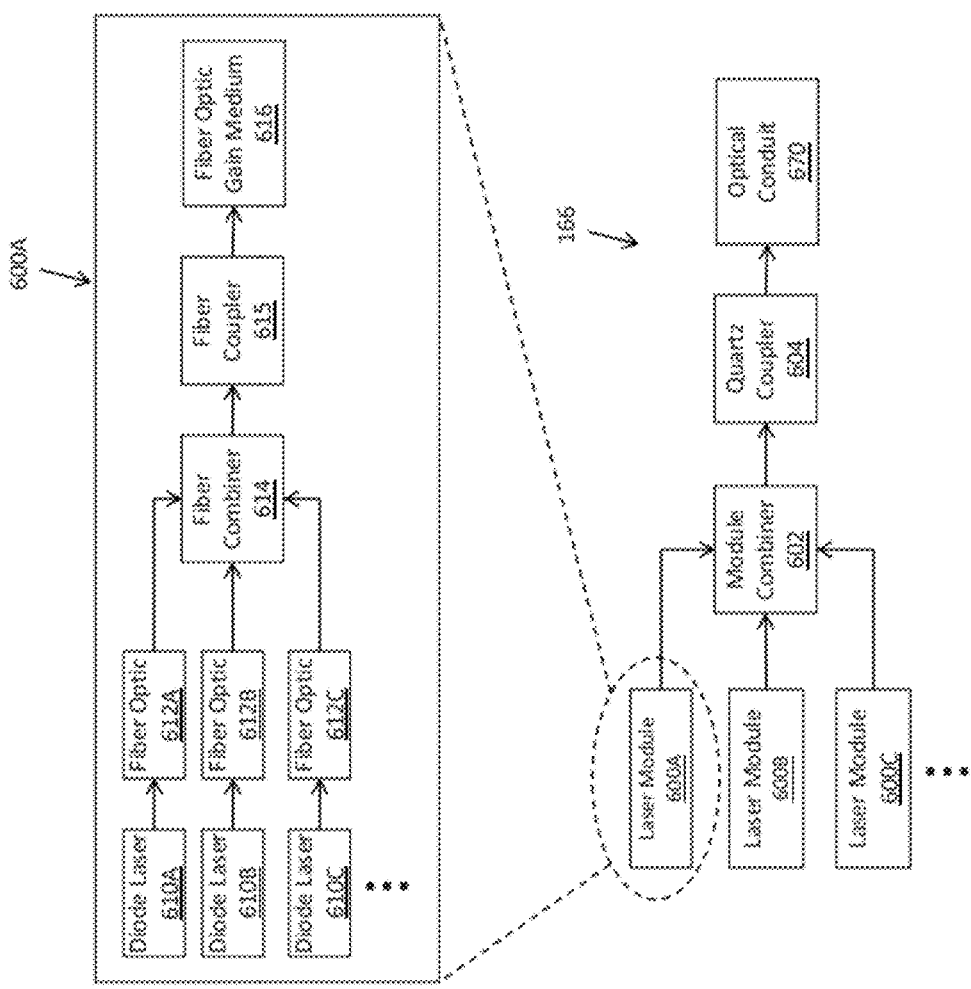
FIG. 8 illustrates an exemplary laser source.

Referring to FIG. 8, an exemplary configuration of continuous wave laser 466 is shown. Continuous wave laser 466 includes a plurality of individual modules 600 each of which provide a single mode 1.07 µm output beam. The output of each of modules 600 is combined together through a module combiner 602 which brings the energy together in a single beam. This combined beam is coupled to an optical conduit 470 through a quartz coupler 604. Although three laser modules 600 are illustrated, any number of laser modules 600 may be included.

The components of a given laser module 600 are also shown in FIG. 8. The laser module 600 includes a plurality of diode lasers 610 each of which are coupled into a respective Ytterbium fiber 612. The output of the Ytterbium fibers 612 are combined through a fiber combiner 614 which brings the energy together. This energy is fed through a coupler 615 into an Ytterbium fiber optic gain medium 616 which produces therefrom a single mode 1.07 μm output beam. Although three diode laser sets 610 are illustrated any number of diode laser sets 610 may be included.

In one embodiment, the power of continuous wave laser 466 is about 3 kilowatts (kW). In one embodiment, the power level of continuous wave laser 466 is about 5 kW. In one embodiment, the power level of continuous wave laser 466 is about 10 kW. In one embodiment, the power level of continuous wave laser 466 is about 20 kW. In one embodiment, the power level of continuous wave laser 466 is about 50 kW. In one embodiment, the power level of continuous wave laser 466 is between about 3 kW and 20 kW. In one embodiment, the power level of continuous wave laser 466 is at least 3 kW. In one embodiment, the power level of the continuous wave laser 466 is at least 3 kW for a duration of at least about 11 minutes.

Returning to FIG. 5, the optical energy produced by continuous wave laser 466 is communicated to beam control module 462 through optical conduit 470. An exemplary optical conduit 470 is a fiber optic cable.

Beam control module 462 includes a beam expander 472 and a positioning system 474. Beam expander 472 receives the optical energy from optical conduit 470 and provides a generally collimated beam 476 of optical energy which exits modulation device 400. An exemplary beam expander is a Cassegrain telescope. Optical energy from optical conduit 470 is provided at a focus of the Cassegrain telescope which then generally collimates this optical energy to produce the expanded beam of optical energy 476. In one embodiment, a path length of beam expander 472 may be automatically adjusted by system controller 454 to change output beam 476 from a generally collimated beam of optical energy to a focused beam of optical energy. In this case, beam expander 472 may serve both as a beam expander (collimator) and focusing optics. In one embodiment, beam control module 462 also includes separate focusing optics 477 which focus the output beam 476 at a given distance from modulation device 400.

Figure 9:
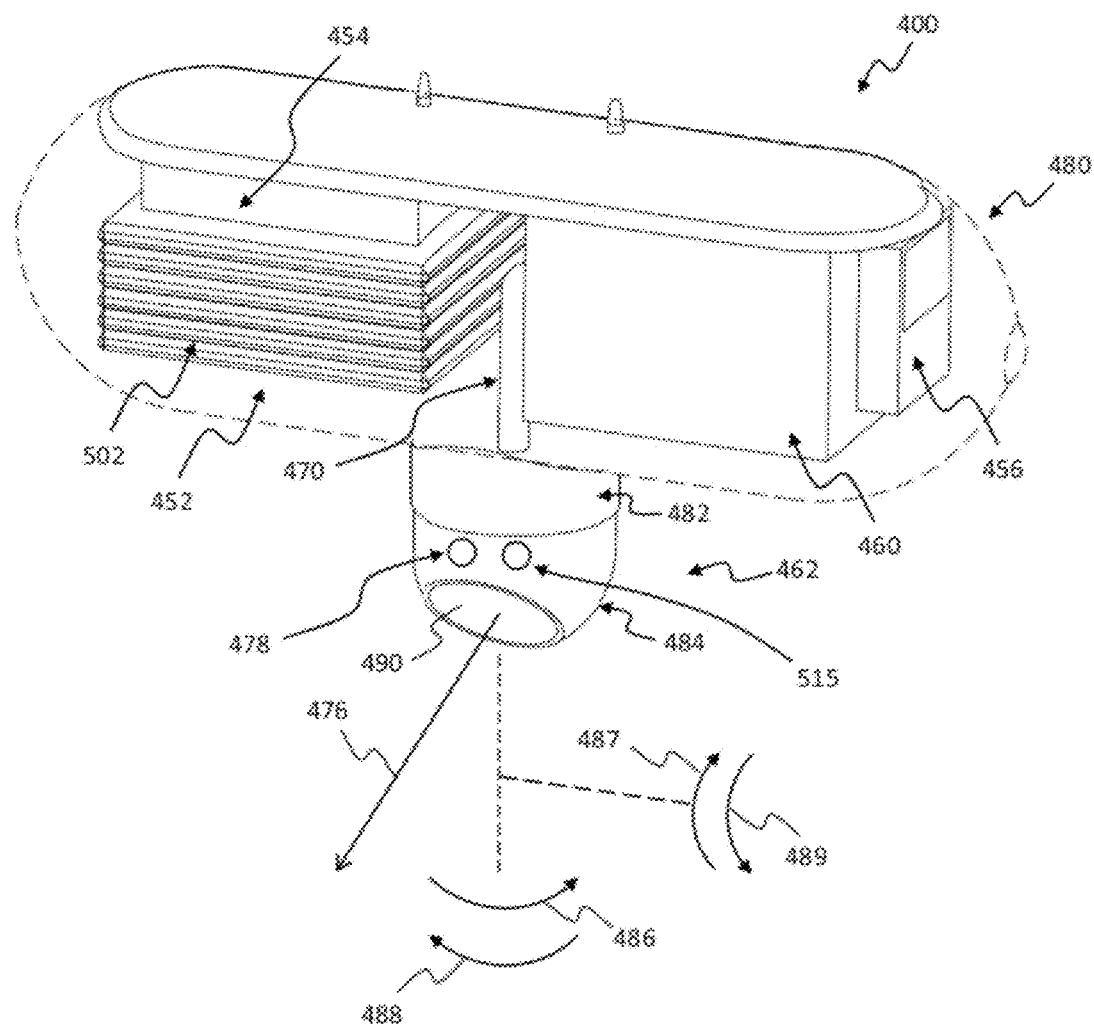
FIG. 9 illustrates a perspective view of a modulation device wherein portions of the housing are shown in phantom.

Positioning system 474 alters the direction in which collimated beam 476 is directed. Referring to FIG. 9, an exemplary configuration of modulation device 400 is shown. Modulation device 400 includes a housing 480 which houses system controller 454, power system 452, cooling system 456 and laser source module 460 of optical transmitter system 450. Provided on a lower side of housing 480 is positioning system 474. Positioning systems 474 includes a housing 482 coupled to housing 480 and a rotatable head 484 which is rotatable in directions 486 and 488. In one embodiment, the rotatable head 484 has a pointing accuracy of up to 25 microradians. Rotatable head 484 includes an optical window 490 through which output beam 476 is directed. Output beam 476 is generally a directed beam and is not radiated in all directions. In one embodiment, positioning system 474 also includes at least one reflector 479 which may be controlled to alter the direction output beam 476 in directions 487 and 489. The reflector 479 may be tilted to alter the elevation of collimated beam 476 by positioning system 474.

Figure 6:
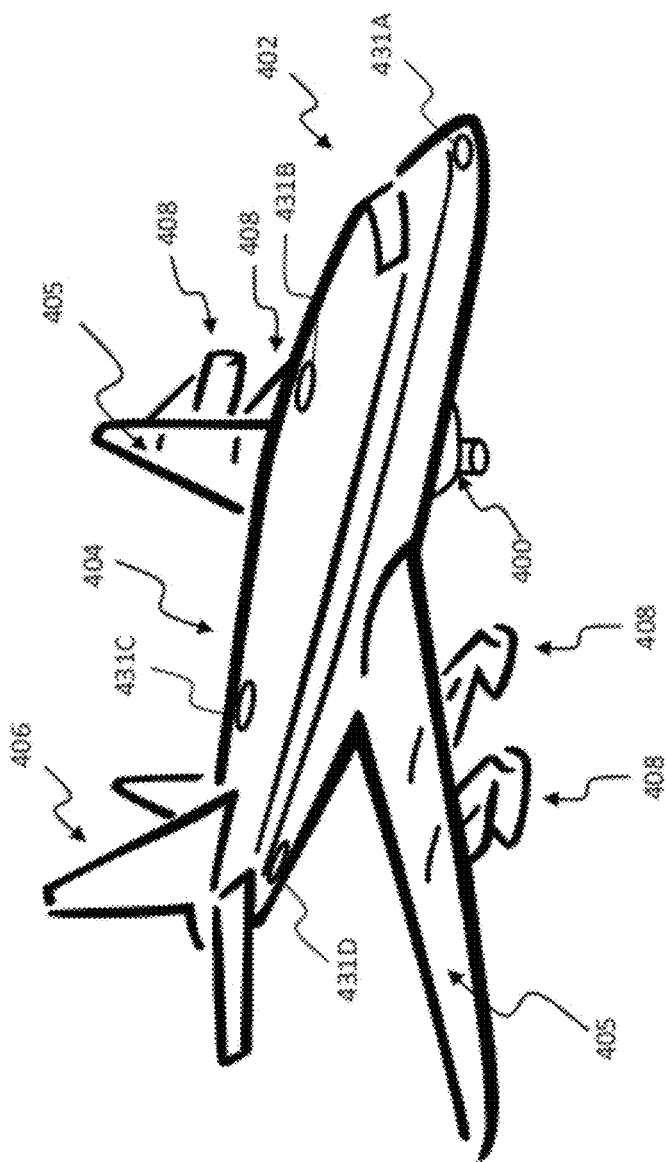
FIG. 6 is a view of a representative asset.

Housing 480, in the illustrated embodiment, is a pod which is detectably coupled to airplane 402 (see FIG. 6). Referring to FIG. 9, housing 480 includes a set of couplers 481 which cooperate with couplers 483 on asset to couple housing 480 to airplane 402. In one embodiment, housing 480 is coupled to airplane 402 by any suitable conventional mechanism which permits housing 480 to be later detached from airplane 402. Exemplary coupling systems are disclosed in U.S. patent application Ser. No. 12/541,772, filed Aug. 14, 2009, the disclosure of which is expressly incorporated by reference herein.

Returning to FIG. 5, power system 452 includes a power source 500. In one embodiment, power source 500 is a plurality of batteries. The batteries may be rechargable batteries. Exemplary rechargeable batteries include lithium-ion batteries and lithium polymer batteries. Exemplary lithium-ion batteries include commercially available cells, such as those available from A123 Systems located in Watertown, Mass. In one embodiment, a plurality of lithium-ion cells are assembled into a battery pack 502 (see FIG. 9). In one embodiment, these cells have a nominal amp-hour rating of 2.3 Ah and a nominal load voltage of 3.3 DCV/cell. Based thereon, battery pack 502 should be able to deliver 52.8 V at 2.3 amps for 1 hour. Under high load (10 C (10×5×2.3 or 115 Amps)) the voltage will "squat" to approximately 2.8 volts/cell. At this level the battery pack 502 could deliver 45 V at 115 amps (or 5 kW) for 6 min. Under severe load (20C (20×5*2.3) or 230 amps)) the voltage would squat to approximately 2.5 volts. At this level the battery pack 502 could deliver 40 V at 230 amps (or 9 kW) for about a half minute. In one embodiment, battery pack 502 provides 28 VDC power for modulation device 400.

The use of battery pack 502 allows high power to be provided to laser source module 460 without causing a large power spike requirement in the power system of asset 402. In essence, battery pack 502 acts as a capacitor for laser source module 460.

In one embodiment, continuous wave laser 466 is a three kilowatt Yterrbium single mode fiber laser such as ones commercially available from IPG Photonics located at IPG Photonics Corporation, 50 Old Webster Road Oxford, Mass. 01540 USA and power supply 452 provides about 28 VDC. In general, commercial laser sources from IPG Photonics include an AC-to-DC converter to convert power from an AC source to DC power for continuous wave laser 466. Since power supply 452 already provides DC power, when a commercial laser source is being used for continuous wave laser 466 the AC-to-DC converter is removed and replaced with a DC driving circuit 620 (see FIGS. 10 and 11) which corresponds high voltage power supply 464. DC driving circuit 620 provides power from power supply 452 to continuous wave laser 466 and regulates the power level provided.

Figure 10:
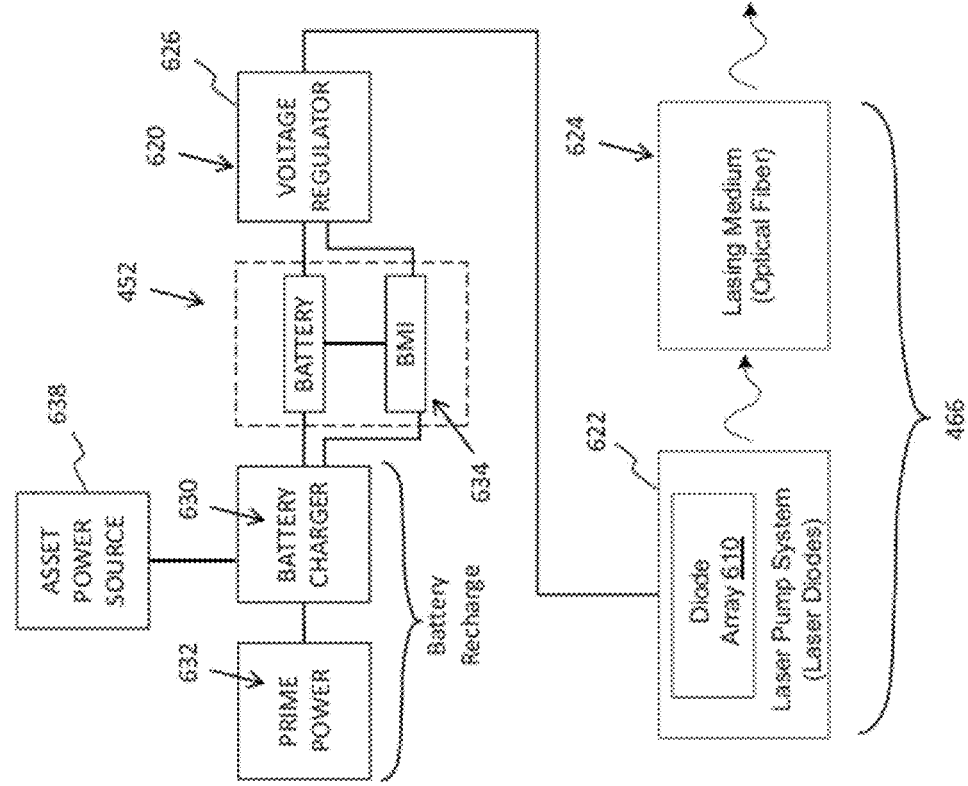
FIG. 10 illustrates a first arrangement of components of a power supply of the modulation device.
Figure 11:
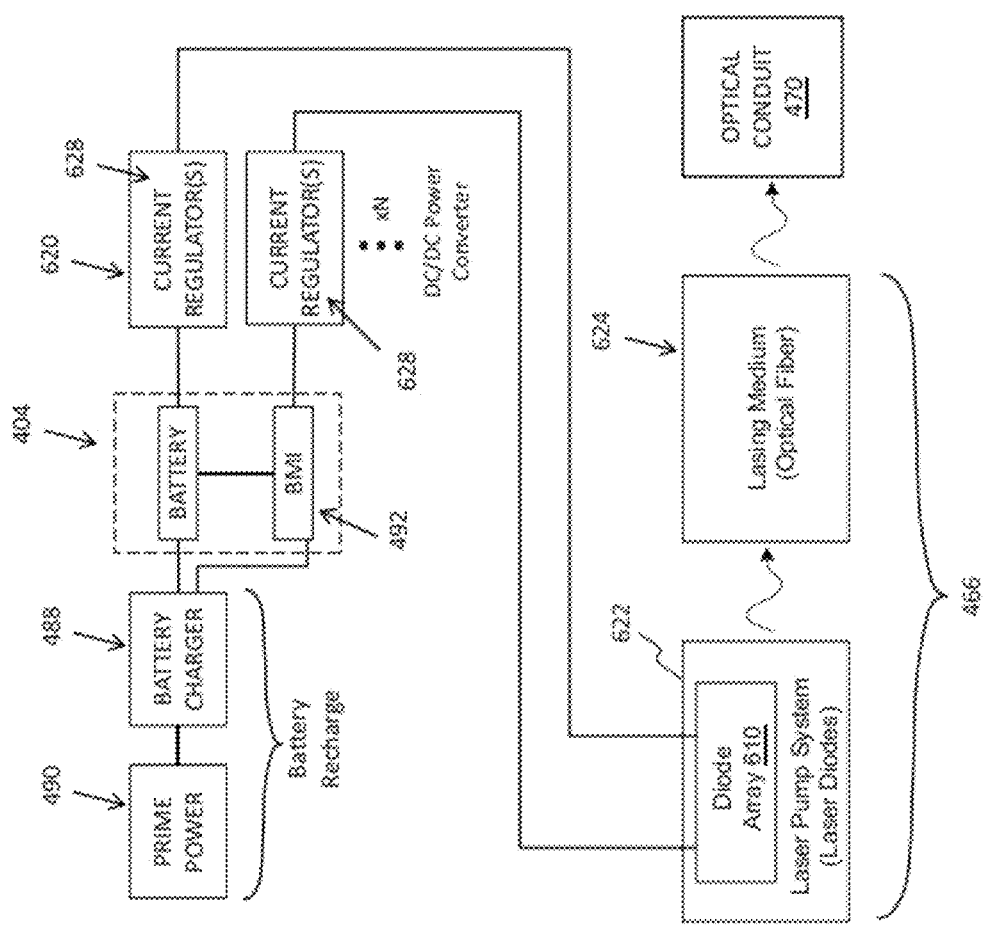
FIG. 11 illustrates a second arrangement of components of a power supply of the modulation device.

Referring to either FIG. 10 or FIG. 11, continuous wave laser 466 is represented. Continuous wave laser 466, as explained in connection with FIG. 8, includes a laser pump system 622 which includes a plurality of laser diodes 610. Laser diodes 610 provide the pump energy for the lasing medium 616 of continuous wave laser 466. The lasing medium 616 is provided as part of a fiber optical cable. The output of the lasing medium 616 is provided to optical conduit 470.

In FIG. 10, power supply 452 is coupled to laser diodes 483 through DC driving circuit 620 which includes a single voltage regulator 626 that powers laser diodes 610. In FIG. 11, power supply 452 is coupled to laser diodes 610 through DC driving circuit 620 which includes a plurality of current regulators 628. Each current regulator 628 provides the power to one of the modules 600 (see FIG. 8) to provide power to the diodes of that module 600.

Referring to either FIG. 10 or FIG. 11, power supply 452 may be charged with a battery charger 630 coupled to a prime power source 632. Battery charger 630 is contained within housing 480. Exemplary prime power sources include a standard AC wall outlet. Power supply 452 includes a battery management interface 634 which controls the recharging of the batteries with battery charger 630.

Figure 12:
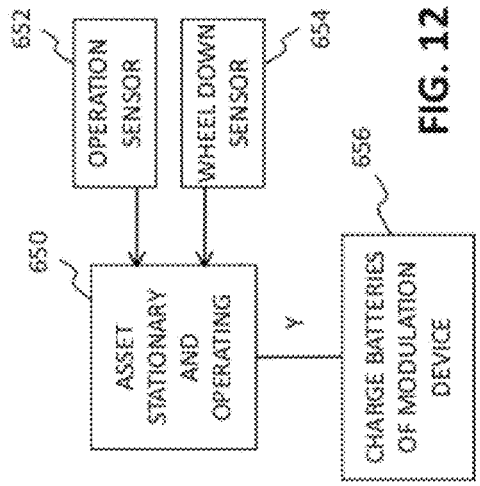
FIG. 12 illustrates a processing sequence for charging the battery source of the modulation device.

In one embodiment, power system 452 is recharged by a power source 638 of the asset 402. An exemplary power source 638 is a DC generator of asset 402. Referring to FIG. 12, a controller of asset 402 determines if asset 402 is operating and stationary (or otherwise operating at a low power level), as represented by block 650. The controller checks an operational sensor 652 to determine if asset 402 is operational. Exemplary operational sensors include engine sensors which indicate the operation of propulsion devices 408. The controller also checks in the case of an airplane 402, a wheel down sensor 654, which indicates when the landing gear of airplane 402 is lowered. If the controller determines that airplane 402 is stationary (wheels down) and operational, then the controller provides charging energy to battery charger 630, as represented by block 656. In one embodiment, airplane 402 does not need to be stationary, but rather only be operating at a low power level, such as flying at a moderate speed. In this case, the controller monitors a power load of airplane 402 and provides charging energy to battery charger 630 when the power load is below a threshold amount.

Cooling system 456 provides cooling to the other components of modulation device 400. In one embodiment, cooling system 456 provides cooling to laser source module 460. In one embodiment, cooling system 456 provides cooling to laser source module 460 and the optical components of beam control module 462. In one embodiment, cooling system 456 provides cooling fluid to power system 452, laser source module 460, and the optical components of beam control module 462. Cooling system 456 may be either air-cooled or liquid cooled. Exemplary cooling systems are provided from Thermo Tek, Inc. located at 1200 Lakeside Parkway, Suite 200 in Flower Mound, Tex.

As indicated in FIG. 5, the components of modulation device 400 are coupled to each other and to asset 402 through a digital communication system. In one embodiment, the digital communication system includes a common bus for the components within modulation device 400. Although a digital communication system is illustrated, any suitable connection is acceptable between the components, such as analog connections. In one embodiment, laser source module 460 is coupled to enable input 443 and fire input 445 through discrete connections outside of the digital communication system. Further, warning/cuing system 430 is coupled to system controller 454 through a separate communication connection. An exemplary communication connection is the MIL-STD-1553 Bus.

Figure 13:
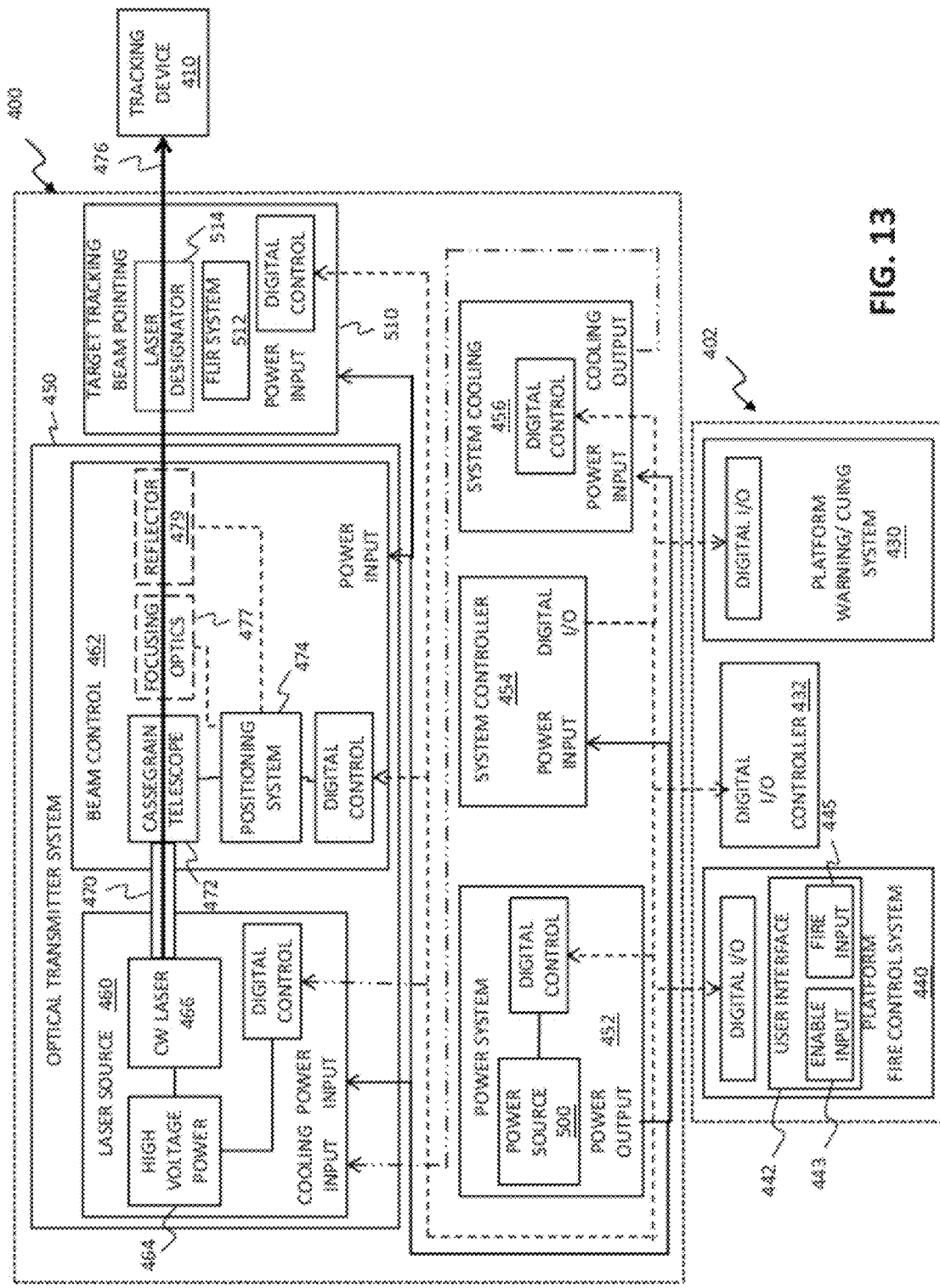
FIG. 13 illustrates a representative view of a modulation device and associated asset.

Referring to FIG. 13, in one embodiment, modulation device 400 also includes a target tracking and beam pointing system 510. Target tracking and beam pointing system 510 monitors the scene surrounding asset 402. In one embodiment, beam pointing system 510 includes a vision system, illustratively a FLIR system 512, which provides images of the scene surrounding asset 402. FLIR system 512, illustratively, has a separate optical window 478 through which the vision system monitors the location of mobile tracking device 410. In one embodiment, FLIR system 512 uses the same optical window 490 as output beam 476 and is bore sighted to output beam 476.

Figure 14A:
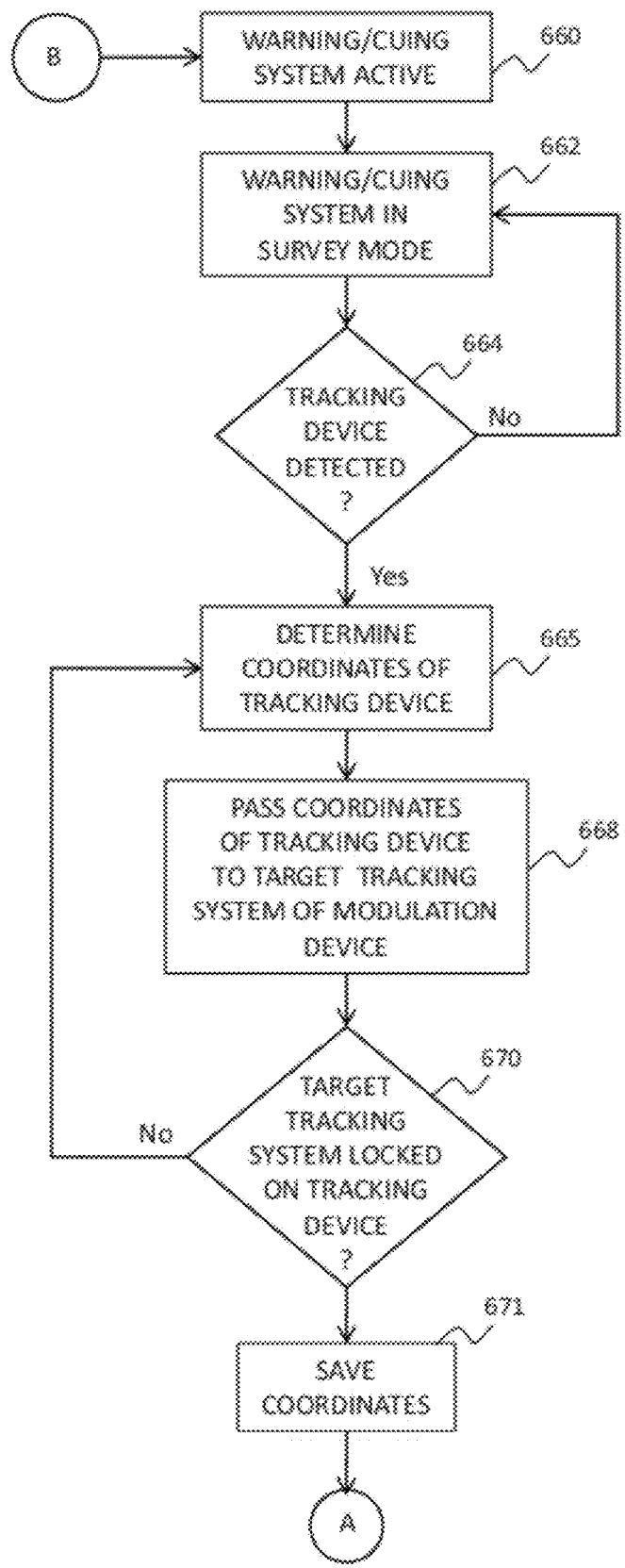
FIGS. 14A and 14B illustrate a processing sequence for engaging a mobile tracking device.
Figure 14B:
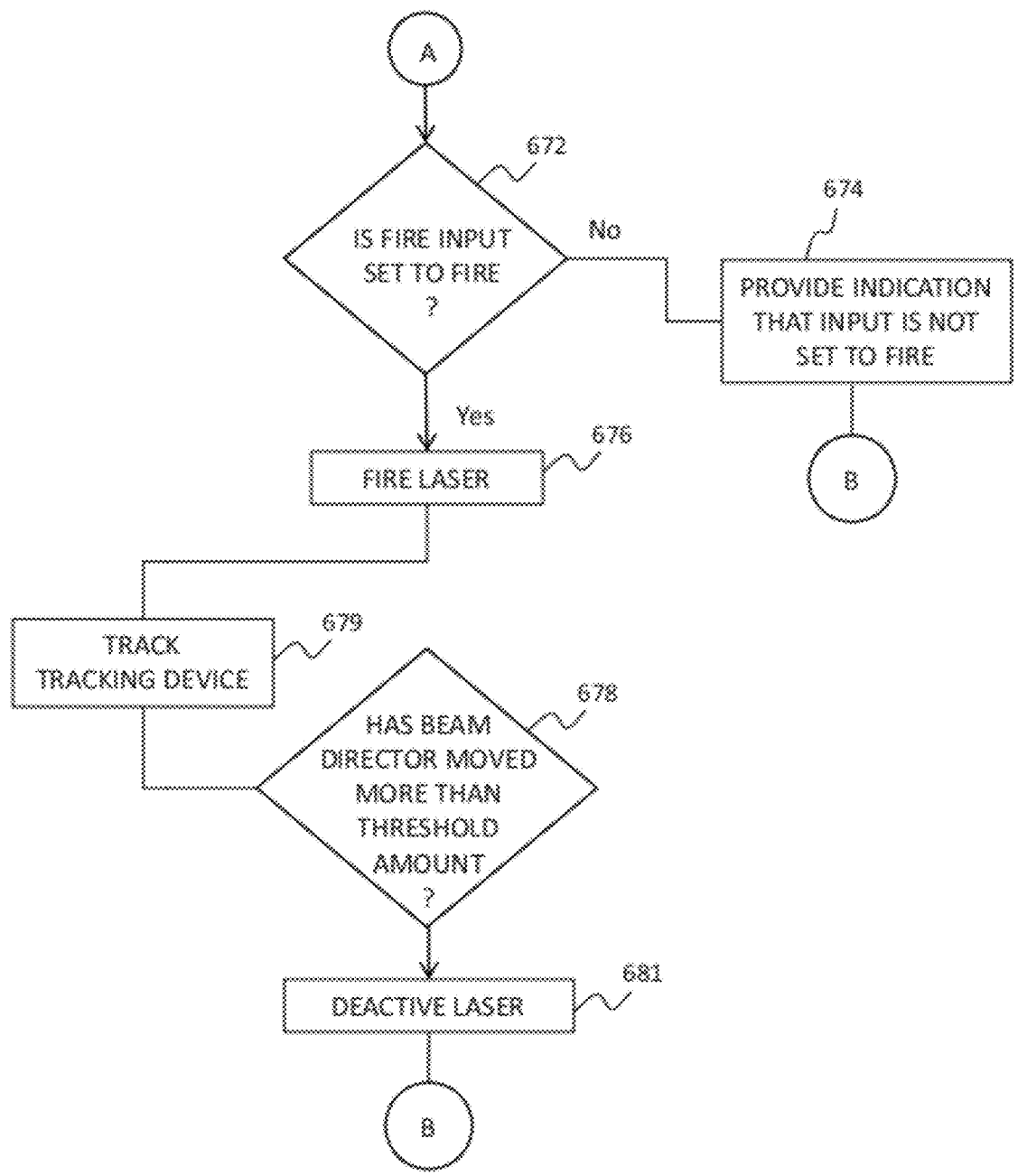

Referring to FIGS. 14A and 14B, an operation of modulation device 400 is illustrated. Referring to FIG. 14A, a check is made by a controller 432 of asset 402 whether warning/cuing system 430 is active, as represented by block 660. Further, warning/cuing system 430 is set to survey mode, as represented by block 662. In survey mode, warning/cuing system 430 monitors the environment around asset 402 to determine if a mobile tracking device 410 is approaching asset 402, as represented by block 664. If a mobile tracking device 410 is detected by warning/cuing system 430, then the controller 432 of asset 402 determines the coordinates of mobile tracking device 410, as represented by block 665. Warning/cuing system 430 may also sound an alarm or provide another indication of mobile tracking device 410 to the operator of asset 402. Exemplary coordinates for the case when the asset is airplane 402 are the azimuth and elevation angles of mobile tracking device 410 relative to airplane 402.

The controller 432 of asset 402 passes the coordinates of mobile tracking device 410 to modulation device 400, as represented by block 668. Modulation device 400 moves rotatable head 484 to the specified angular position and FLIR system 512 is directed at the specified coordinates. FLIR system 512 may be gimbaled to move independently within housing 480. The controller 432 of asset 402 determines if mobile tracking device 410 has acquired mobile tracking device 410 with tracking module 510, as represented by block 670. If modulation device 400 has not acquired mobile tracking device 410, new coordinates of mobile tracking device 410 are determined and passed again to modulation device 400. As such, modulation device 400 remains slaved to controller 432. If modulation device 400 has acquired mobile tracking device 410 then the initial coordinates corresponding to the lock on location of mobile tracking device 410 are saved by system controller 454, as represented by block 671.

Next, system controller 454 of modulation device 400 checks to see if modulation device 400 is authorized to fire continuous wave laser 466, as represented by block 672. Continuous wave laser 466 is authorized to fire when fire input 445 is set to fire. If continuous wave laser 466 is not authorized to fire, then an indication of this is provided to the operator of modulation device 400, as represented by block 674. Exemplary indications include visual alarms, audio alarms, tactile alarms, and combinations thereof. If continuous wave laser 466 is authorized to fire, then continuous wave laser 466 is fired at mobile tracking device 410. Beam control module 462 has already adjusted the output direction of collimated beam 476 to coincide with the direction to modulation device 400.

After modulation device 400 has acquired mobile tracking device 410, beam pointing system 510 tracks the location of mobile tracking device 410 and updates the coordinates for mobile tracking device 410, as represented by block 679. Beam control module 462 rotates and reflector 479 tilts, as necessary, to maintain collimated beam 476 on mobile tracking device 410.

The position of beam control module 462 is monitored to determine when it has moved a threshold amount, as represented by block 678. Once mobile tracking device 410 has changed direction by a threshold amount, it no longer is locked on asset 402 and the threat to asset 402 is neutralized. This change in direction of mobile tracking device 410 is indicated by the change in direction of beam control module 462 to keep collimated beam 476 on mobile tracking device 410. Once the threshold amount is reached, continuous wave laser 466 is deactivated as represented by block 681. Control is again passed back to warning/cuing system 430 to monitor for additional mobile tracking devices 410.

In one embodiment, the threshold amount is about 10 degrees in either the azimuth or elevation directions. In one embodiment, the threshold amount is about 5 degrees in either the azimuth or elevation directions. In one embodiment, the threshold amount is about 3 degrees in either the azimuth or elevation directions. In one embodiment, system controller 454 monitors the time since mobile tracking device 410 was acquired by modulation device 400 and deactivates continuous wave laser 466 once a threshold amount of time has passed.

In one embodiment, beam pointing system 510 has a narrower field of view than sensor modules 431 of warning/cuing system 430. As such, sensor modules 431 are able to survey the surrounding environment for mobile tracking device 410 approaching from various directions, while beam pointing system 510 is fixed on the narrow portion of the environment surrounding a detected mobile tracking device 410.

In one embodiment, warning/cuing system 430 is integrated into modulation device 400 and system controller 454 detects the launch of a mobile tracking device 410 based on the images captured by warning/cuing system 430. Although various tasks are discussed as being carried out by one of warning/cuing system 430, controller 432, and system controller 454, these may be carried out by a common controller.

As mentioned herein output beam 476 is produced by a continuous wave laser 466. Output beam 476 is able to defeat mobile tracking devices 410 which modulate the incoming electromagnetic radiation even though output beam 476 is not pulsed and contains no mobile tracking device specific codes. Output beam 476 is also effective against imaging detection systems of more advanced mobile tracking device 410. Exemplary mobile tracking device specific codes include jamming codes.

Figure 15:
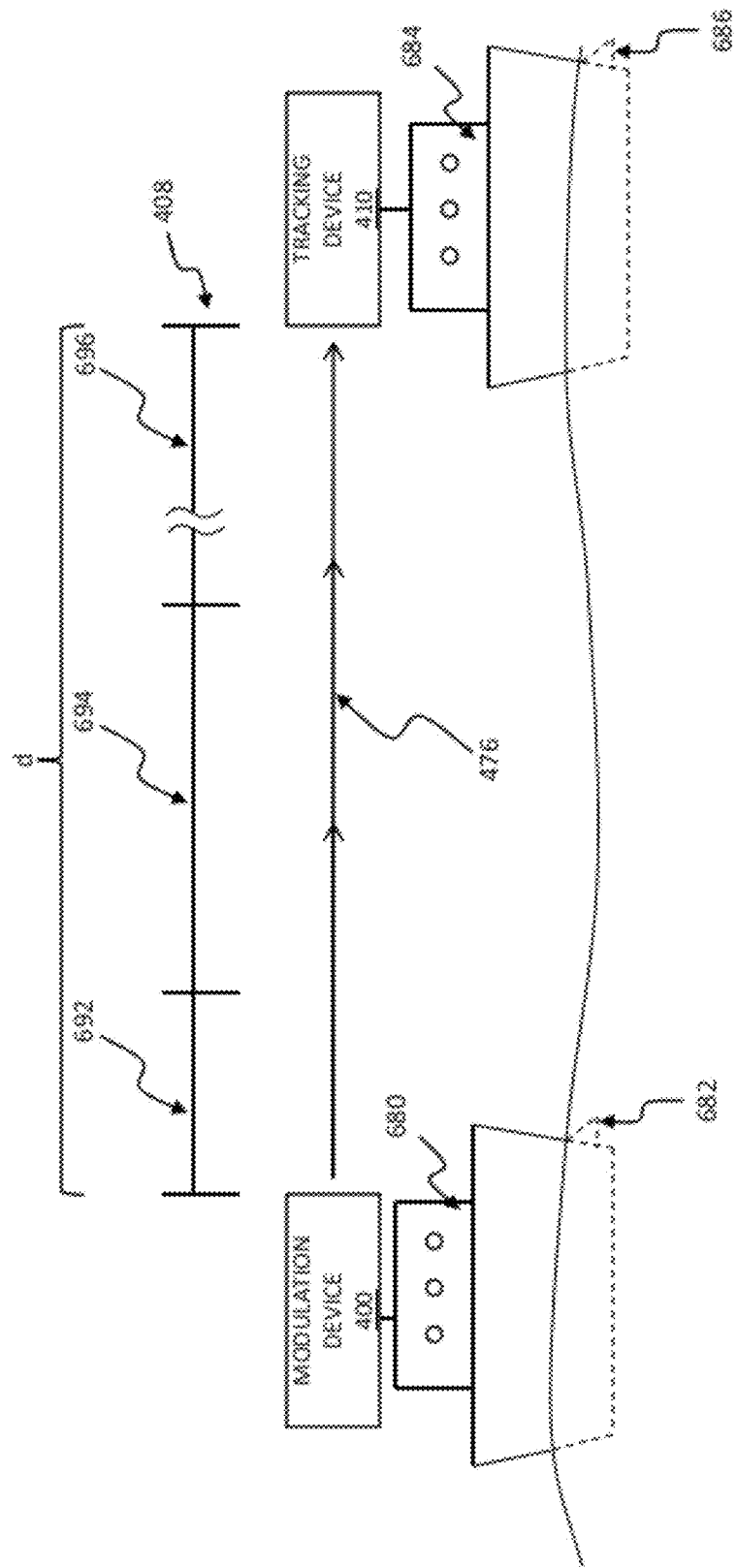
FIG. 15 illustrates a representative asset being tracked by a representative mobile tracking device.

Referring to FIG. 15, a ship 680 is shown having a rudder 682 and modulation device 400. Also shown is a second ship 684 having a rudder 686 which directs the direction of travel of second ship 684. Second ship 684 also incorporates a mobile tracking device 410. Second ship 684 is attempting to track first ship 680 and close the distance between first ship 680 and second ship 684. Mobile tracking device 410 generates course correction signals for second ship 684 so that second ship 684 continues to close on first ship 680. In this example, mobile tracking device 410 does not include a separate propulsion system 412 and guidance system 414. Rather, second ship 684 has its own propulsion system, such as an engine, and rudder 686 directs the travel path of second ship 684 based on input from controller 416.

As illustrated in FIG. 7, telescope 420 of mobile tracking device 410 attempts to collect a large amount of electromagnet radiation to extend the viewing range of the modulation device 400. The distance d indicated in FIG. 15, corresponds to a viewing distance of mobile tracking device 410 which is the distance at which mobile tracking device 410 is first able to detect first ship 680. At distances beyond distance d, mobile tracking device 410 is not able to see first ship 680. Of course, mobile tracking device 410 may be closer to first ship 680 than the distance d and in fact over time mobile tracking device 410 tracks first ship 680 so that second ship 684 closes the distance between second ship 684 and first ship 680.

Modulation device 400, upon locking on the position of mobile tracking device 410, fires continuous wave laser 466 such that output beam 476 is received by telescope 420 of mobile tracking device 410. Output beam 476 has different effects on mobile tracking device 410 depending on the separation of mobile tracking device 410 from modulation device 400. Distance d is illustratively divided into three bands, a near distance band 692, a mid distance band 694, and a far distance band 696. At distances in near distance band 692, the energy of output beam 476 explodes seeker head 415 and destroys mobile tracking device 410. At distances in mid distance band 694, the energy of output beam 476 destroys the functionality of detector 418. In one example, a modulation device 400 including a 3 kW Yterrbium continuous fiber laser as continuous wave laser 466 destroyed a focal plane array detector of a mobile tracking device 410 at a distance of about 3 kilometers.

At distances in far distance band 696, the energy of output beam 476 produces a plurality of internal localized sources within mobile tracking device 410. These internal localized sources are produced by the energy of output beam 476 being absorbed by the optical components of mobile tracking device 410 which then reradiate the absorbed energy in multiple wavelengths, similar to a blackbody source. Referring to FIG. 7, six internal localized sources 700 are illustrated. Sources 700A and 700B correspond to filter 425. Source 700C corresponds to optical window 428. Source 700D corresponds to secondary mirror 423. Source 700E corresponds to primary mirror 421. Source 700F corresponds to optics 424. The sources 700 may be produced based on the absorption characteristics of the material of each component or the presence of an imperfection in a component. For instance, optical window 428 may become scratched during travel resulting in an imperfection that produces source 700C. Although six sources 700 are illustrated, a single source 700 or other number of sources 700 may be produced at various times.

The source 700 produces infrared energy which is brighter than the infrared signature of asset 402 being tracked by mobile tracking device 410. As such, controller 416 of mobile tracking device 410 interprets the respective source 700 as asset 402 instead of asset 402 itself. If source 700 is off-axis, this will cause controller 416 to try to center source 700 resulting in error signal 429 being increased. Guidance system 414 will then turn mobile tracking device 410 in an attempt to center source 700. This results in mobile tracking device 410 turning away from the location of asset 402. Since source 700 is radiating from a portion of mobile tracking device 410, it cannot be centered. Output beam 476 does not require a mobile device specific code to defeat mobile tracking device 410. Therefore, no knowledge of the modulation scheme of mobile tracking device 410 is required to defeat mobile tracking device 410. In one embodiment, the power level of continuous wave laser 466 is about 3 kW exiting modulation device 400.

Source 700 do not explode mobile tracking device 410, such as what happens in near distance band 692, nor is detector 418 of mobile tracking device 410 destroyed, such as what happens in mid distance band 694. Rather, source 700 confuses controller 416 to believe that one or more (if multiple sources) additional objects are present in the field of view of mobile tracking device 410 with a higher intensity than asset 402. Controller 416 tracks the brightest object in its field of view and thus attempts to track one of sources 700, instead of asset 402.

In far distance band 696, mobile tracking device 410 is not destroyed, but rather sent off course. As mobile tracking device 410 approaches modulation device 400 the power level of output beam 476 increases exponentially resulting in detector 418 being destroyed in mid distance band 694 and/or mobile tracking device 410 exploding in near distance band 692. Of course, if mobile tracking device 410 is engaged in far distance band 696 mobile tracking device 410 likely will not enter mid distance band 694 because mobile tracking device 410 will be directed in a different direction due to output beam 476.

Figure 16:
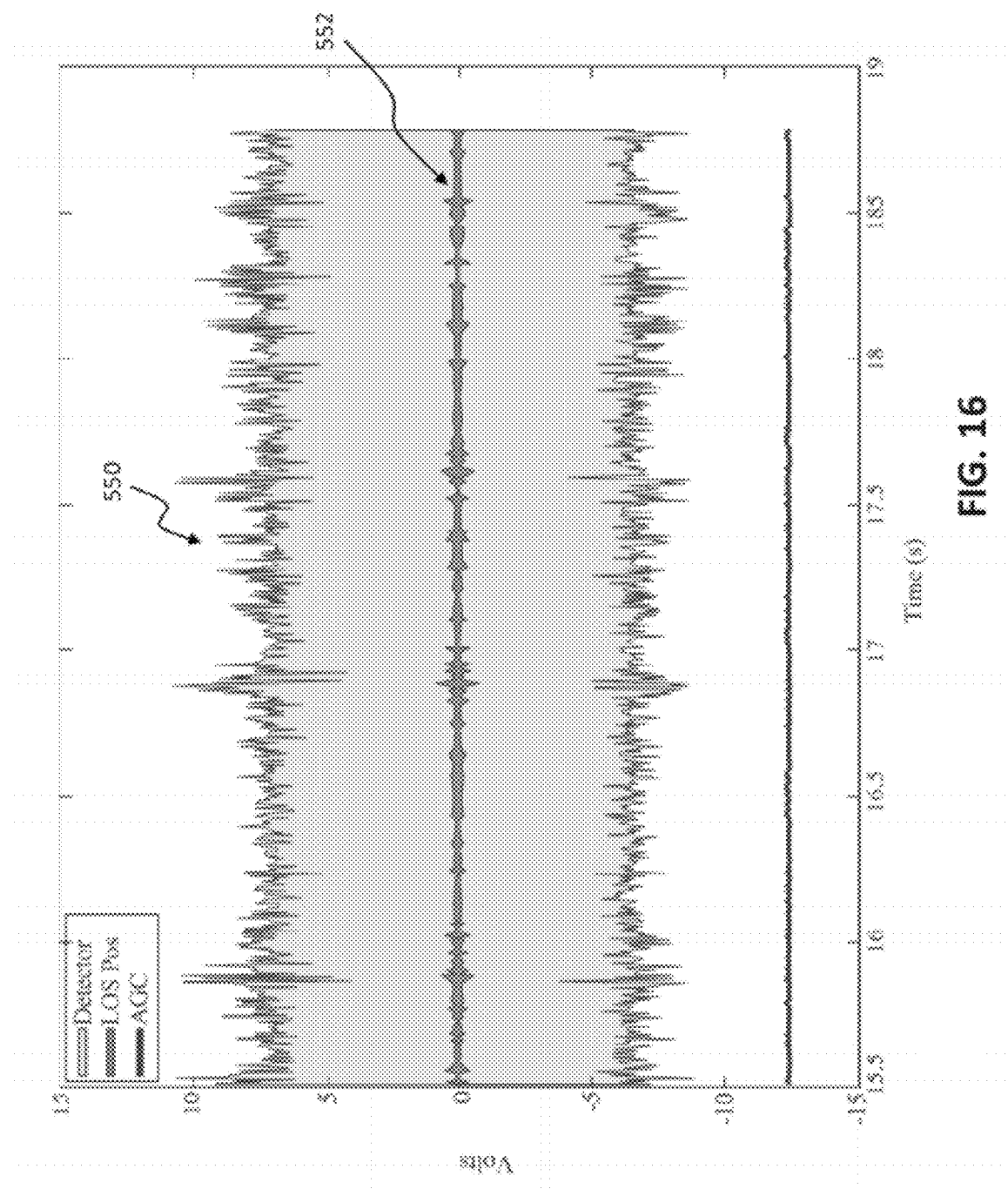
FIGS. 16 and 17 represent the response characteristics of a mobile tracking device following an asset.
Figure 17:
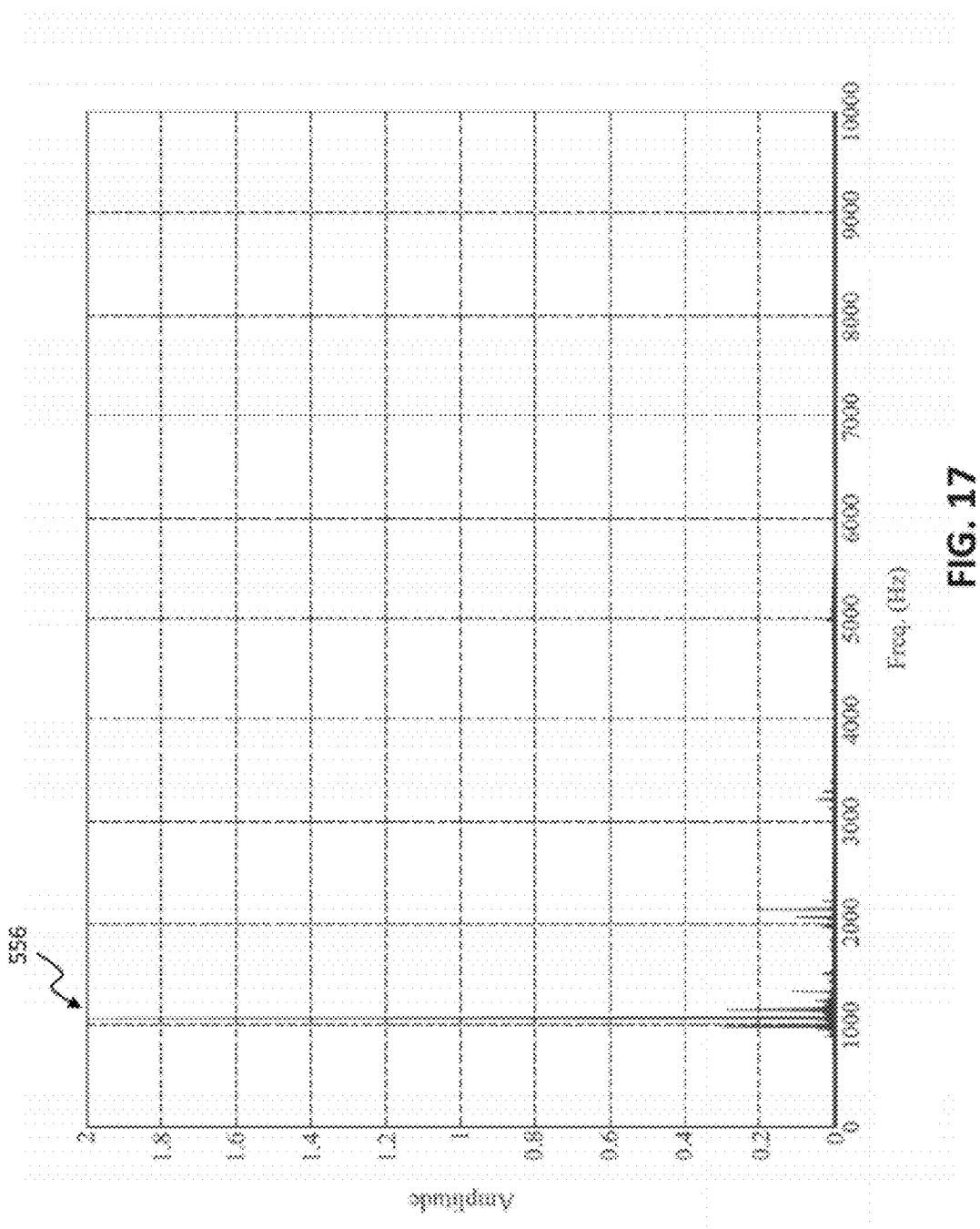
Figure 18:
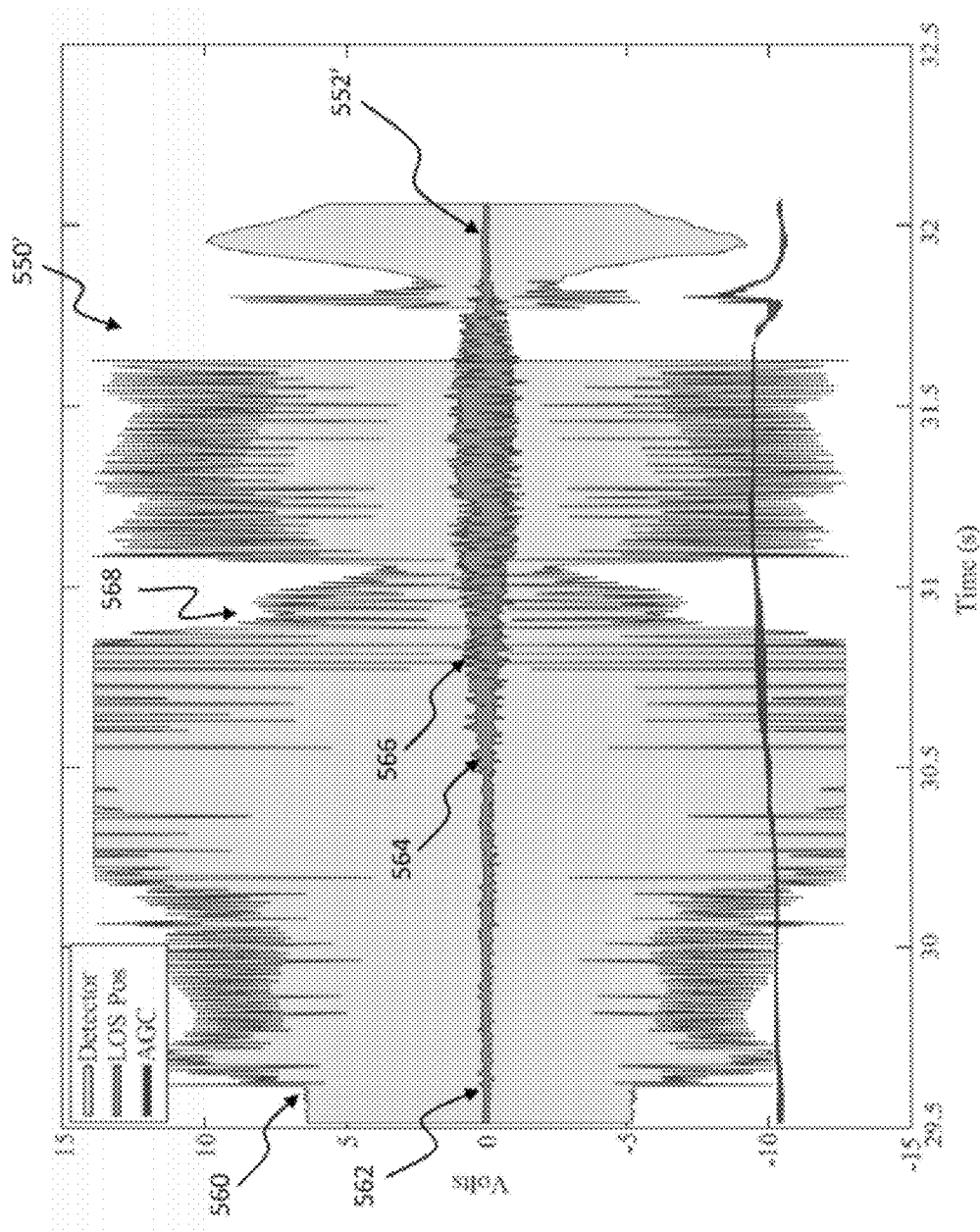
FIGS. 18 and 19 represent the response characteristics of a mobile tracking device following an asset and being subsequently illuminated by a modulation device.
Figure 19:
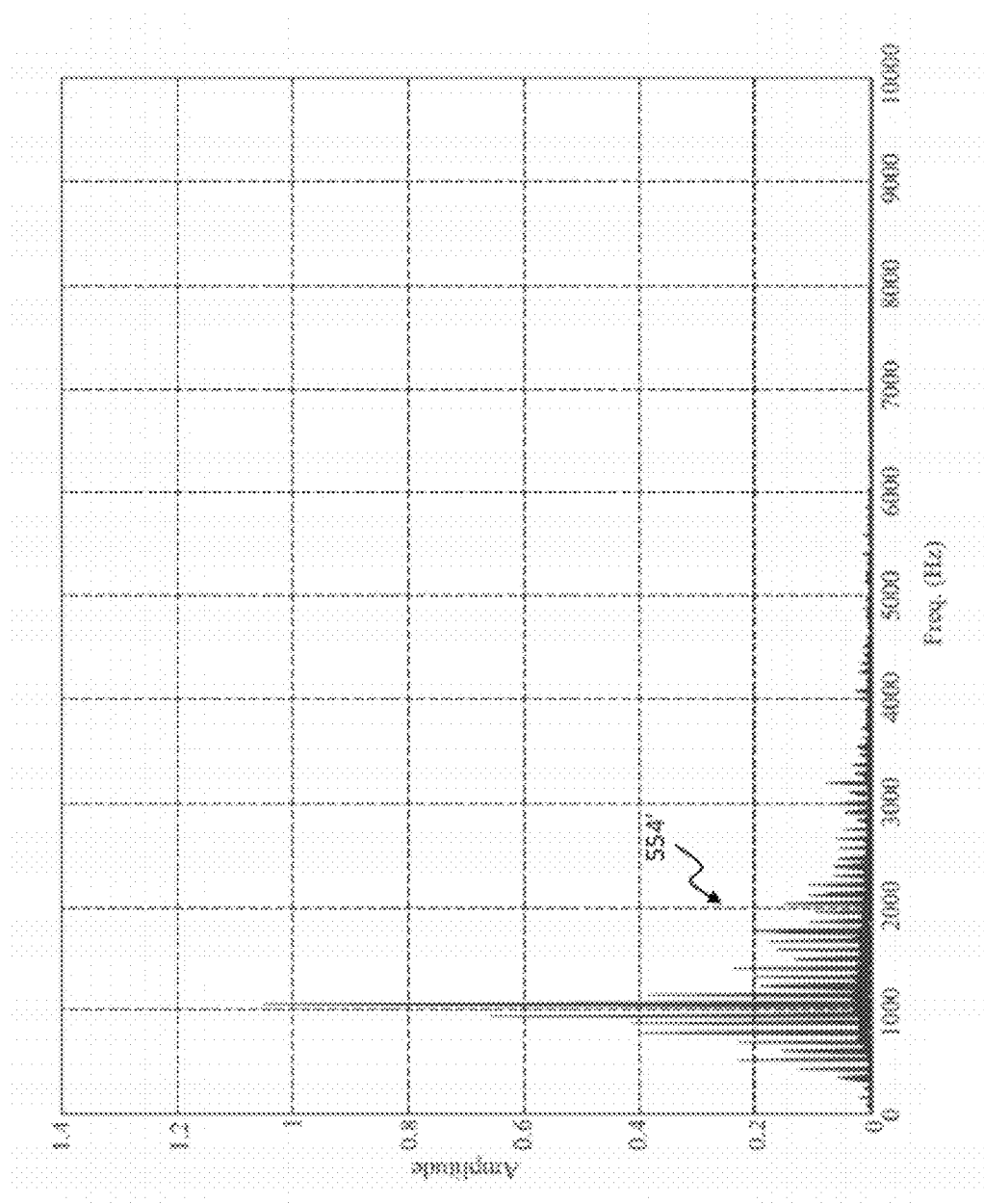

The effects of sources 700 are shown through a comparison of FIGS. 18 and 19 with FIGS. 16 and 17. Referring to FIG. 16, a typical response of a mobile tracking device 410 in far distance band 696 is shown. The degree of turn being carried out by a mobile tracking device 410 is proportional to a voltage associated with a gyroscope of the seeker head 415. In FIG. 16, a raw voltage of detector 418 is shown as curve 550. Also shown is the voltage associated with the gyroscope of the seeker head 415 as curve 552. The amplitude of curve 552 corresponds to error signal 429. The curve 552 shown in FIG. 16, represents a mobile tracking device 410 which has locked onto an asset 402 and is following directly behind the asset 402. The Fourier transform of curve 550 is shown in FIG. 17. As shown in FIG. 17, the spectrum 554 for curve 550 is generally tightly defined around 1000 Hz. This is generally consistent with the modulation scheme of the mobile tracking device 410 when it is inline with asset 402.

Referring to FIG. 18, a 3 kilowatt, continuous wave, infrared, Ytterbium single mode fiber laser with an $m^2$ of 1 was used as continuous wave laser 466 of modulation device 400 associated with an asset 402. In tests, a mobile tracking device 410 was fired at asset 402. Modulation device 400 directed a continuous beam of optical energy 476 at the optical window 428 of mobile tracking device 410. The continuous beam of optical energy causes the generation of sources 700 which are falsely recognized by mobile tracking device 410 as asset 402.

Referring to FIG. 18, the corresponding curves 550' and 552' for the above example are shown. A first portion 560 of curve 550' (and corresponding portion 562 of curve 552') are shown prior to activation of continuous wave laser 466. As shown by portion 562, the travel of mobile tracking device 410 is fairly straight. Continuous wave laser 466 is activated at point 564. This results in detector 418 being flooded with IR energy as represented by the increase in amplitude of curve 550' and the generation of sources 700. The generation of sources 700 appears to be later in time potentially indicating the need for the components of mobile tracking device 410 to heat up to cause sources 700. At portion 564 of curve 552' controller 416 is instructing guidance system 414 to turn mobile tracking device 410 more aggressively. This increase in turning of mobile tracking device 410 increases in portion 566 even as the intensity of curve 550' falls in portion 568. This fall in intensity is indicative of mobile tracking device 410 moving far off course so that not as much of collimated beam 476 enters optical window 428. As shown in FIG. 19, the spectrum 554' for curve 550' is considerably broadened compared to spectrum 554 of FIG. 16.

Figure 6A:
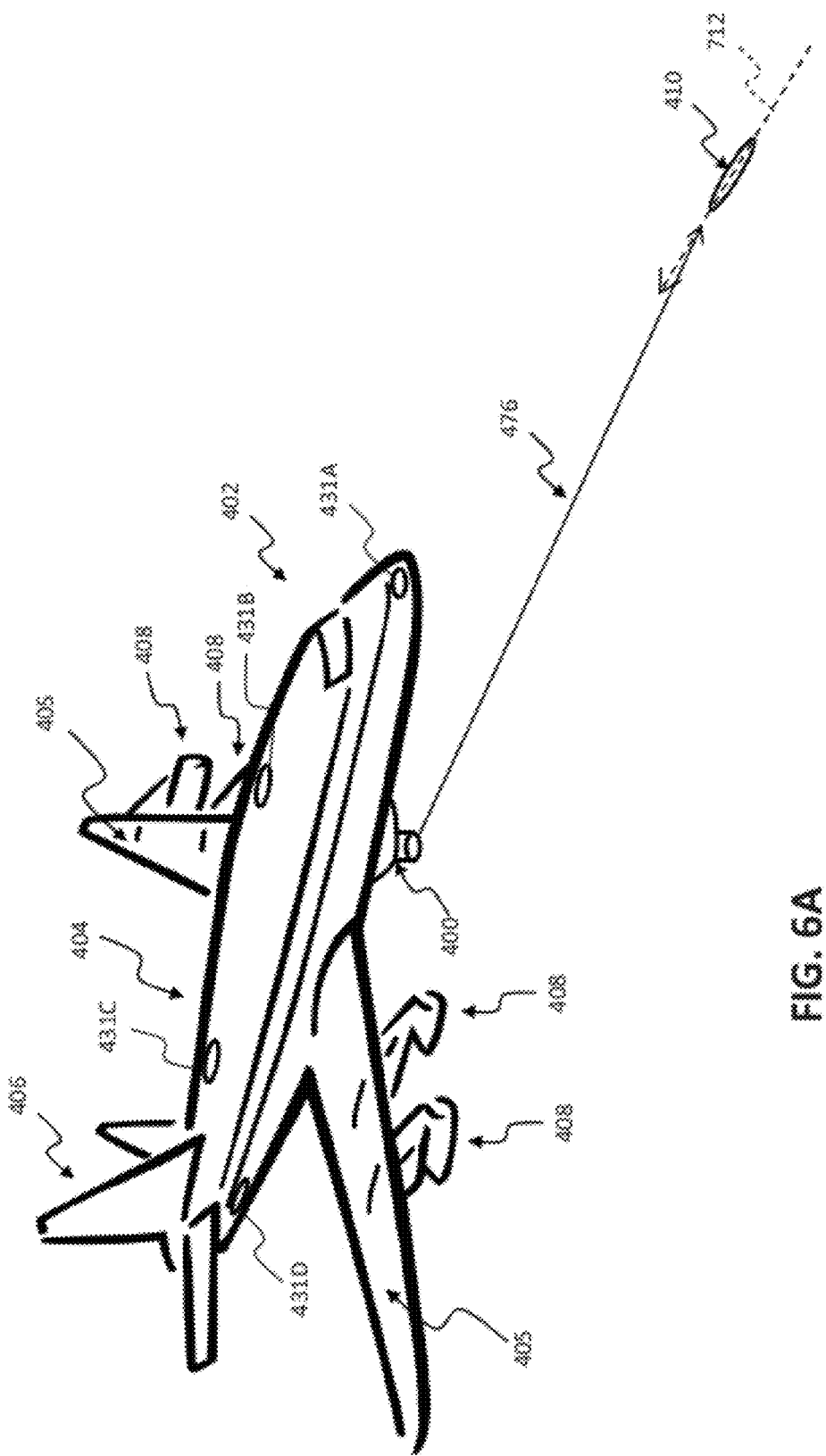
FIG. 6A illustrates the representative asset of FIG. 6 with a mobile tracking device approaching the representative asset along a first direction and optical energy from the modulation device being directed at the mobile tracking device.
Figure 6B:
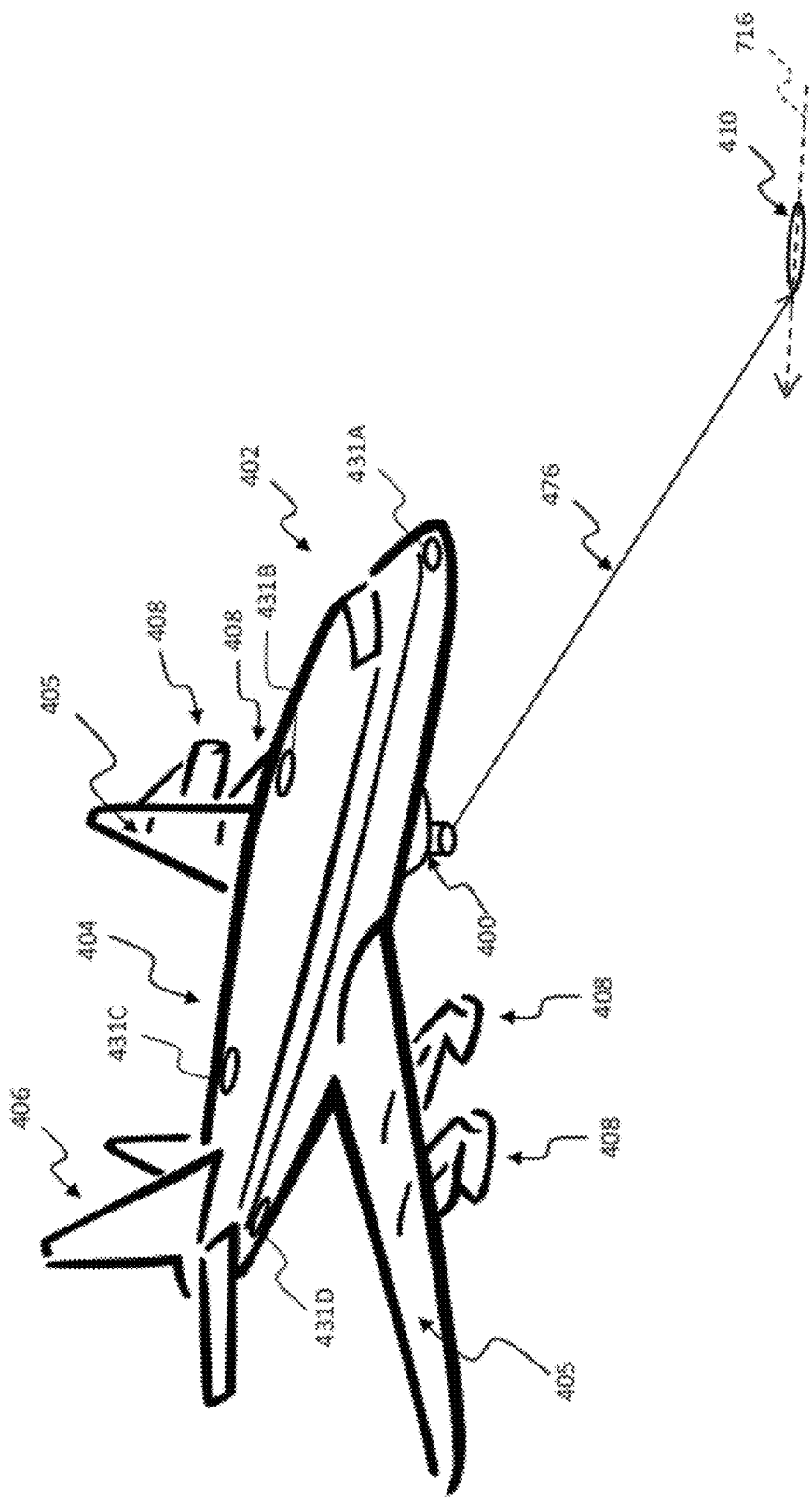
FIG. 6B illustrates the mobile tracking device changing its direction of travel to a second direction due to the optical energy directed from the modulation device at the mobile tracking device.
Figure 6C:
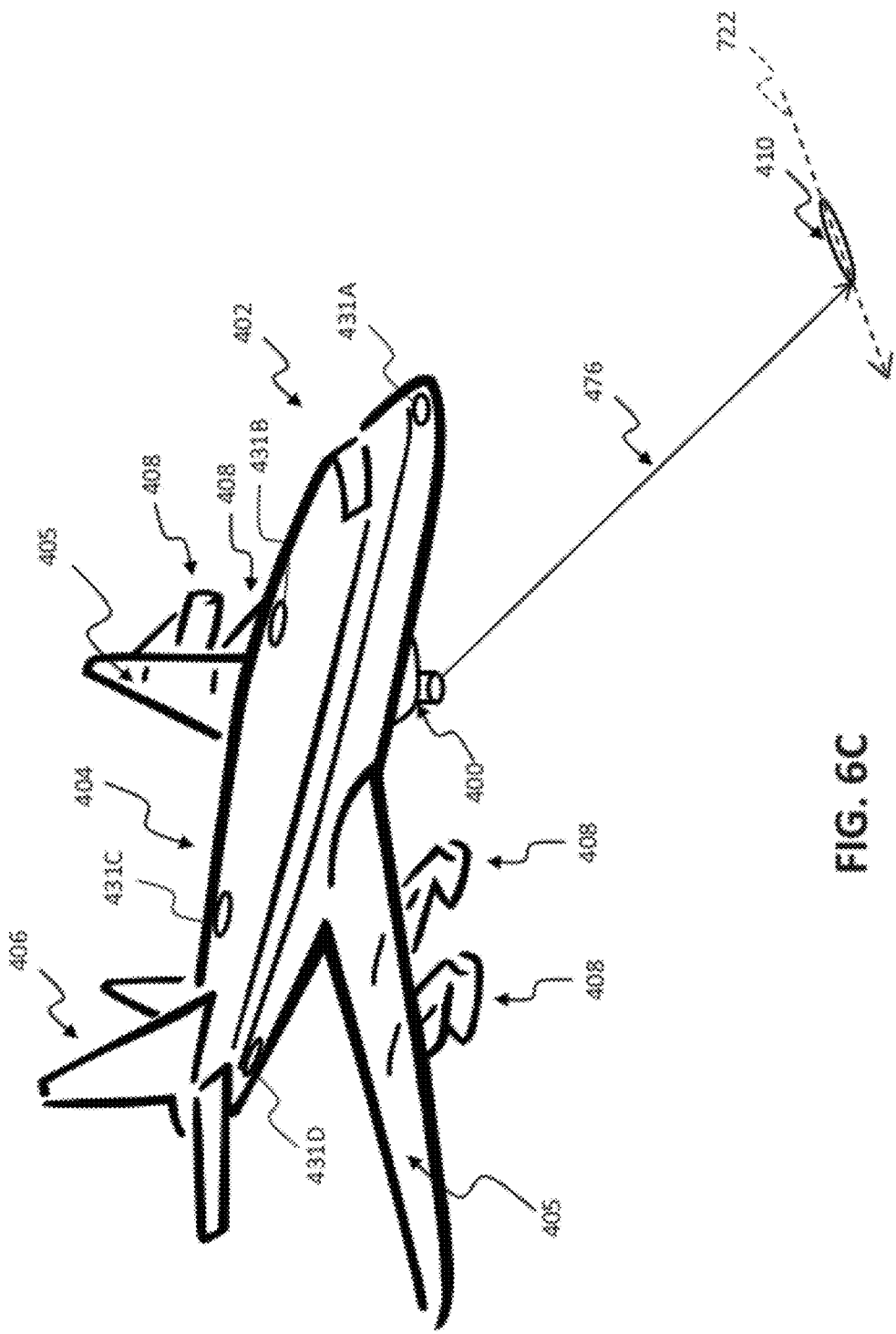
FIG. 6C illustrates the mobile tracking device changing its direction of travel to a third direction due to the optical energy directed from the modulation device at the mobile tracking device.
Figure 6D:
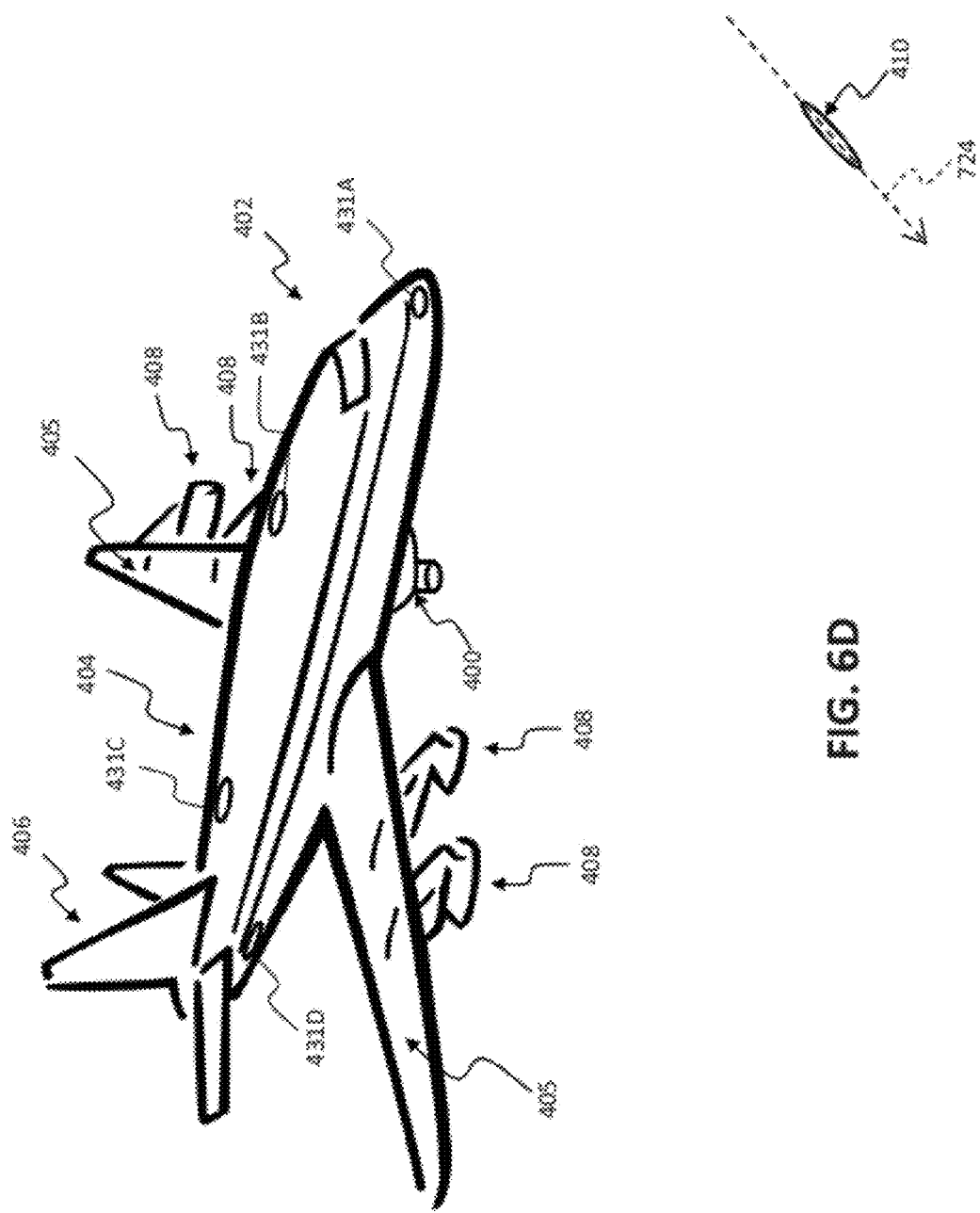
FIG. 6D illustrates the mobile tracking device changing its direction of travel to a fourth direction due to the optical energy directed from the modulation device at the mobile tracking device.
Figure 20:
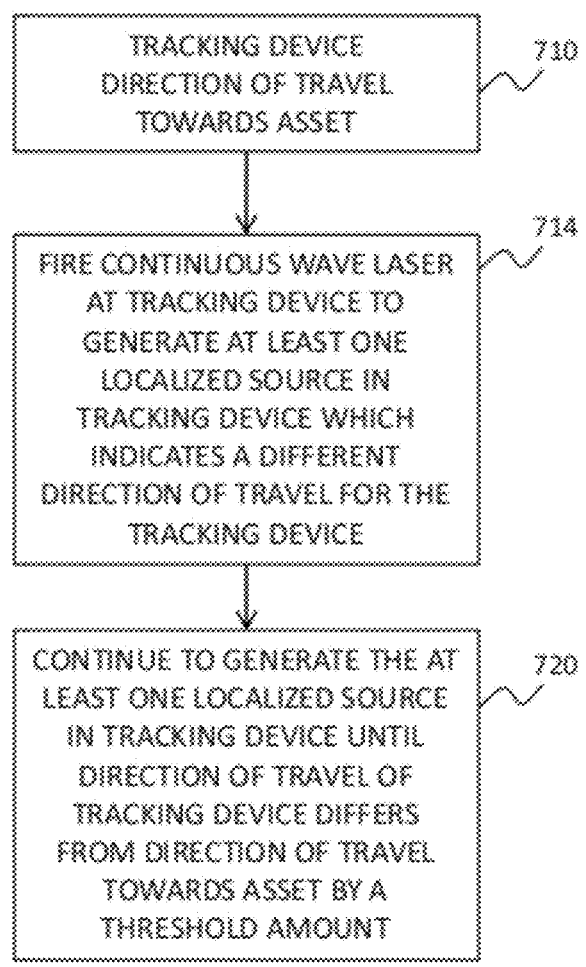
FIG. 20 illustrates a method of countering a mobile tracking device with a modulation device.

Referring to FIG. 20, mobile tracking device 410 is traveling in a direction towards asset 402, as represented by block 710. This is illustrated in FIG. 6A wherein an airborne mobile tracking device 410 is shown traveling in direction 712 towards asset 402. As explained herein, modulation device 400 fires continuous wave laser 466 to direct output beam 476 towards mobile tracking device 410. This causes the generation of at least one localized source 700 within mobile tracking device 410 which is within a field of view of mobile tracking device 410. These one or more localized sources 700 are brighter than the infrared energy radiated from asset 402 and are generated at locations which do not correspond with the current direction 712 of mobile tracking device 410, as represented by block 714 in FIG. 20. As such, controller 416 attempts to point mobile tracking device 410 at the brighter source 700 and in doing so changes the direction of mobile tracking device 410 to direction 716 as shown in FIG. 6B. Beam control module 462 alters the direction of output beam 476 to coincide with the new direction of mobile tracking device 410, as represented by block 720 in FIG. 20. This again causes the generation of the localized sources 700 within mobile tracking device 410 which are within a field of view of mobile tracking device 410. As such, controller 416 attempts to point mobile tracking device 410 at the brighter source 700 and in doing so changes the direction of mobile tracking device 410 to direction 722 as shown in FIG. 6C. Beam control module 462 alters the direction of output beam 476 to coincide with the new direction of mobile tracking device 410. Once again this causes the generation of the localized sources 700 within mobile tracking device 410 which are within a field of view of mobile tracking device 410. As such, controller 416 attempts to point mobile tracking device 410 at the brighter source 700 and in doing so changes the direction of mobile tracking device 410 to direction 724 as shown in FIG. 6D. In moving beam control module 462 to track mobile tracking device 410 along the direction 724, rotatable head 484 exceeds the threshold rotation amount and continuous wave laser 466 is deactivated, as shown in FIG. 6D.

Unlike prior art devices, modulation device 400 is not mobile tracking device 410 specific. Rather, modulation device 400 is effective against both imaging and non-imaging mobile tracking devices 410. Further, modulation device 400 does not require a mobile device specific code to be known in advance. Rather, modulation device 400 relies on the continuous provision of optical energy into mobile tracking device 410 to produce localized sources 700 within the field of view of mobile tracking device 410 such that detector 418 is confused as to the location of asset 402.

In another example of the use of modulation device 400, a 3 kW, continuous wave, infrared, Ytterbium single mode fiber laser was used as continuous wave laser 466 of modulation device 400 associated with an asset 402. In tests, a plurality of different mobile infrared mobile tracking devices 410 were fired at asset 402 while asset 402 was at ground level. Modulation device each time directed output beam 476 at the optical window of the respective mobile tracking device 410. The modulation device 400 was effective against all of the plurality of different mobile tracking device 410 at a range of up to about 1250 meters from modulation device 400. A computer model was made wherein asset 402 was at ground level, a wavelength of continuous wave laser 466 was set to 1.07 µm, and values for additional parameters modulation device 400 and mobile tracking device 410 were set. The computer model provided a predicted range of up to 1290 meters for a plurality of different mobile tracking device 410. This computer model demonstrated good agreement with the experimentally obtained range of up to 1250 meters.

In a further example of the use of modulation device 400, a 3 kilowatt, continuous wave, infrared, Ytterbium single mode fiber laser was used as continuous wave laser 466 of modulation device 400 associated with an asset 402. In tests, a specific mobile tracking device 410 was fired at asset 402 while asset 402 was at ground level. Modulation device 400 directed output beam 476 at the optical window of mobile tracking device 410. The modulation device 400 was effective against the specific mobile tracking device 410 at a range of up to about 2650 meters from modulation device 400. The above-mentioned computer model provided a predicted range of up to 2440 meters for the specific mobile tracking device 410. This demonstrates good agreement with the experimentally obtained range of up to 2650 meters.

Returning to FIG. 13, in one embodiment, beam pointing system 510 further includes a laser designator system 514. Laser designator system 514 includes a pulsed laser which is directed at mobile tracking device 410 and reflected therefrom. Based on the reflected signal, laser designator system 514 is able to determine a distance from modulation device 400 to mobile tracking device 410. In the case wherein modulation device 400 includes focusing optics 477 or wherein beam expander 472 may be focused, one of system controller 454 and beam pointing system 510 adjusts a focal length of focusing optics 477 to focus output beam 476 at the location of mobile tracking device 410. In one embodiment, output beam 476 is focused at a distance shorter than the determined range to mobile tracking device 410, the distance being chosen based on an estimated speed of mobile tracking device 410. In one embodiment, this distance corresponds to the expected position of mobile tracking device 410 based on assumptions regarding the relative difference in speed between asset 402 and mobile tracking device 410. In one embodiment, the estimated speed of mobile tracking device 410 is selected based on the type of mobile tracking device 410 which is identified based on a retro-reflection received from mobile tracking device 410.

Laser designator system 514, illustratively, has a separate optical window 515 through which the laser beam of laser designator system 514 is sent out of modulation device 400 and the reflection from mobile tracking device 410 is received to determine the distance to mobile tracking device 410. In one embodiment, laser designator system 514 uses the same optical window 490 as output beam 476 and is bore sighted to output beam 476.

Figure 32:
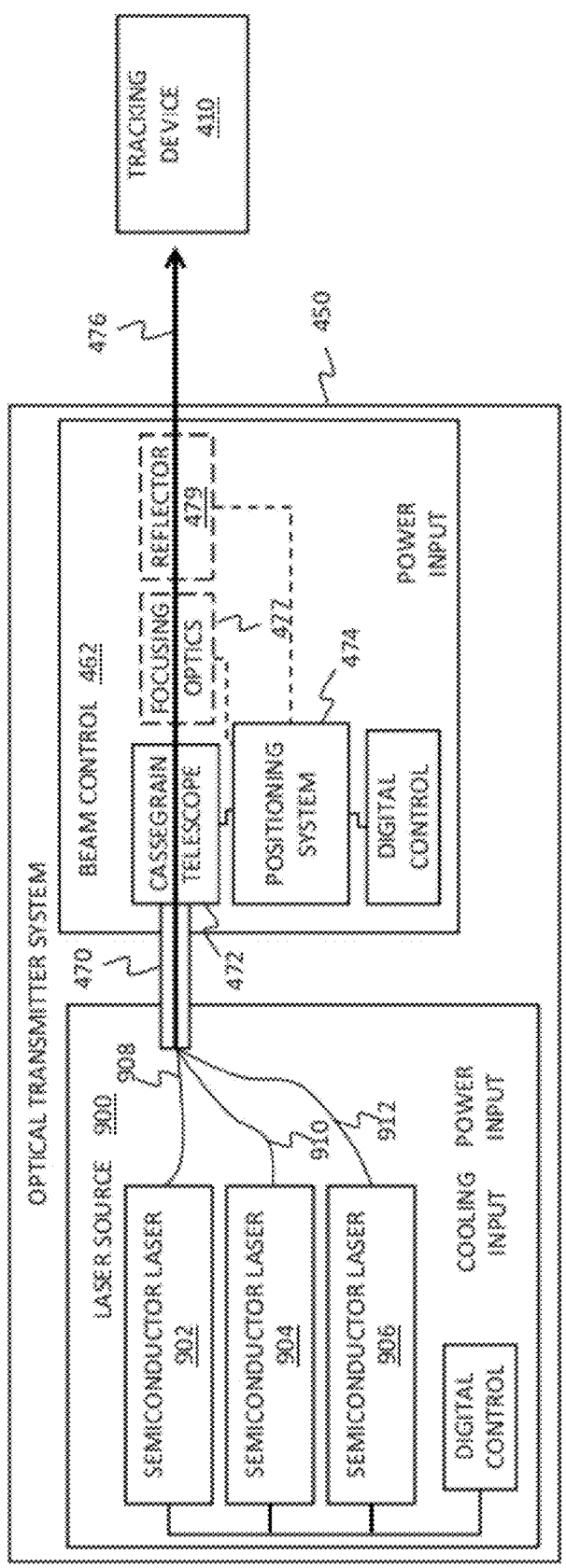
FIG. 32 illustrates a representative view of a modulation device and associated asset.

Referring to FIG. 32, in one embodiment, the optical transmitter system 450 of modulation device 400 includes a laser source 900. Laser source 900 includes a plurality of semiconductor lasers 902-906 which produce optical energy for modulation device 400. In one embodiment, the semiconductor lasers are continuous wave lasers. In one embodiment, lasers 902-906 are quantum cascade lasers. Exemplary quantum cascade lasers include External Cavity Quantum Cascade Lasers available from Daylight Solutions located at 13029 Danielson Street, Suite 130 in Poway, Calif. and Pranalytica located at 1101 Colorado Avenue in Santa Monica, Calif. In one embodiment, the semiconductor lasers have a wavelength of at least about 1 um. In one embodiment, the semiconductor lasers have a wavelength of at least about 2 um.

The output optical energy of each of lasers 902-906 is carried through respective optical conduits 908-912 to beam control module 462. The end of the respective optical conduits 908-912 are positioned generally at a focus of beam expander 472. Beam control unit 462 sends the optical energy produced by each of lasers 902-906 towards mobile tracking device 410. The optical energy of lasers 902-906 is generally incoherently combined to produce a beam with a power level sufficient to function in the same manner as continuous wave laser 466.

In one embodiment, lasers 902-906 combine to produce about 3 kW of power. In one embodiment, the power level of the combined lasers 902-906 is about 5 kW. In one embodiment, the power level of the combined lasers 902-906 is about 10 kW. In one embodiment, the power level of the combined lasers 902-906 is about 20 kW. In one embodiment, the power level of the combined lasers 902-906 is about 50 kW. In one embodiment, the power level of the combined lasers 902-906 is between about 3 kW and 20 kW. In one embodiment, the power level of the combined lasers 902-906 is at least 3 kW. In one embodiment, the power level of the combined lasers 902-906 is at least 3 kW for a duration of at least about 11 minutes. The combined lasers 902-606 may be used together to form the output beam of modulation device 400. In one embodiment, the output beam of modulation device 400 is at least about 60 kW. In one embodiment, the output beam of modulation device 400 is in the range of about 60 kW to about 100 kW.

By using multiple semiconductor lasers, as opposed to a single high power laser, the amount of heat management needed is greatly reduced because the individual semiconductor lasers collectively do not generate the same amount of heat as the high power laser 466.

Figure 21:
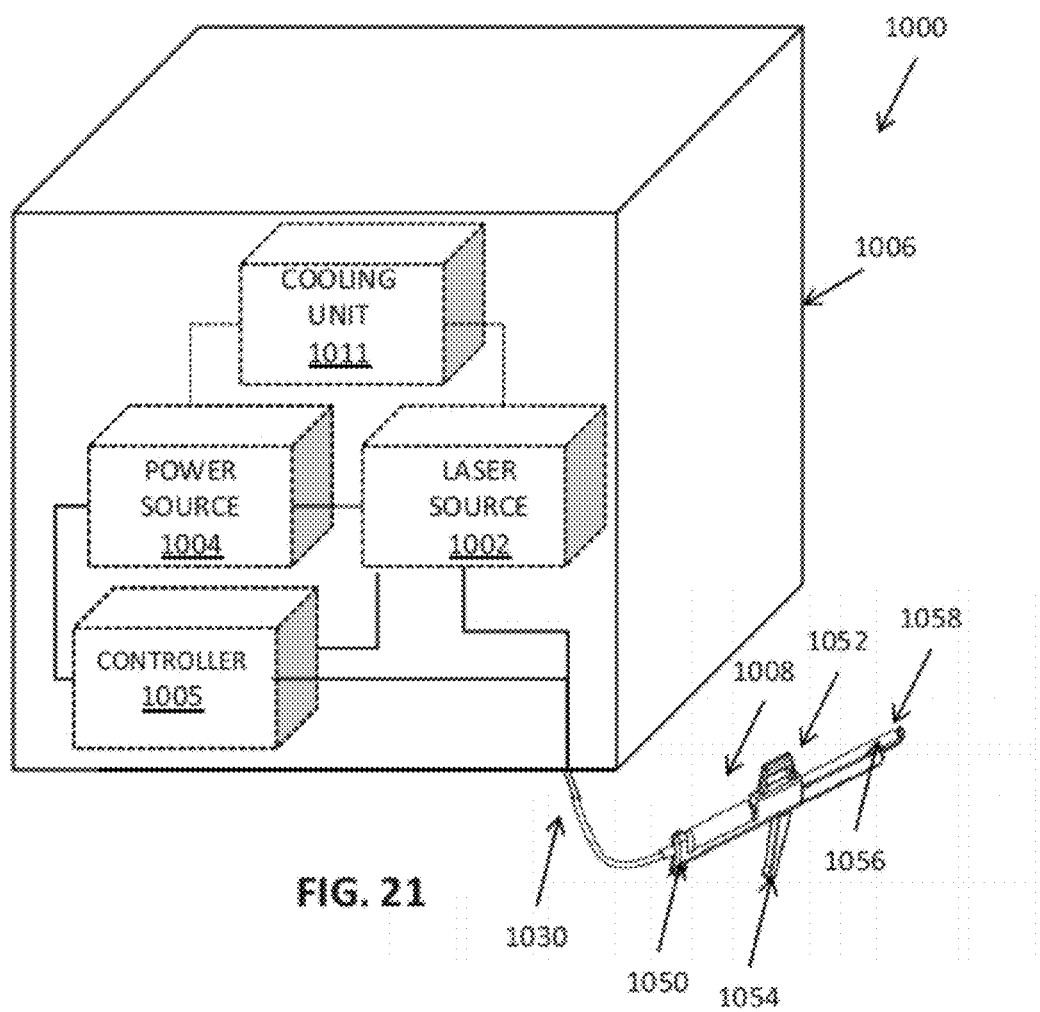
FIG. 21 is a representative view of a portable cutting device.

Referring to FIG. 21, a portable cutting device 1000 is shown. The privacy device may be incorporated into the portable cutting device to identify EO devices and then to use the high power capability of the cutting device to hamper the operation of the EO device or an asset associated with the EO device. The portable cutting device 1000 includes a laser source 1002, a power supply 1004, a storage container 1006, and a laser directing device 1008. Portable cutting device 1000 may be used in multiple applications for cutting through materials. Exemplary materials include wood, masonry, metal, and other materials. Portable cutting device 1000 does not require an internal combustion generator and therefore does not have the associated noise and exhaust issues.

A cooling unit 1011 may optionally be provided to actively cool one or both of laser source 1002 and power supply 1004. In one embodiment, cooling unit 1011 is an air-cooled chiller. In one embodiment, cooling unit 1011 is a thermo-electric cooling system. In one embodiment, cooling unit 1011 is an on-demand cooler which directs cooling air at the optical coupler which couples laser source 1002 to optical conduit 1030. The on-demand cooler may be manually activated or activated based on a monitored temperature sensor value. The cooling air of the on-demand cooler is a non-flammable gas.

Figure 22:
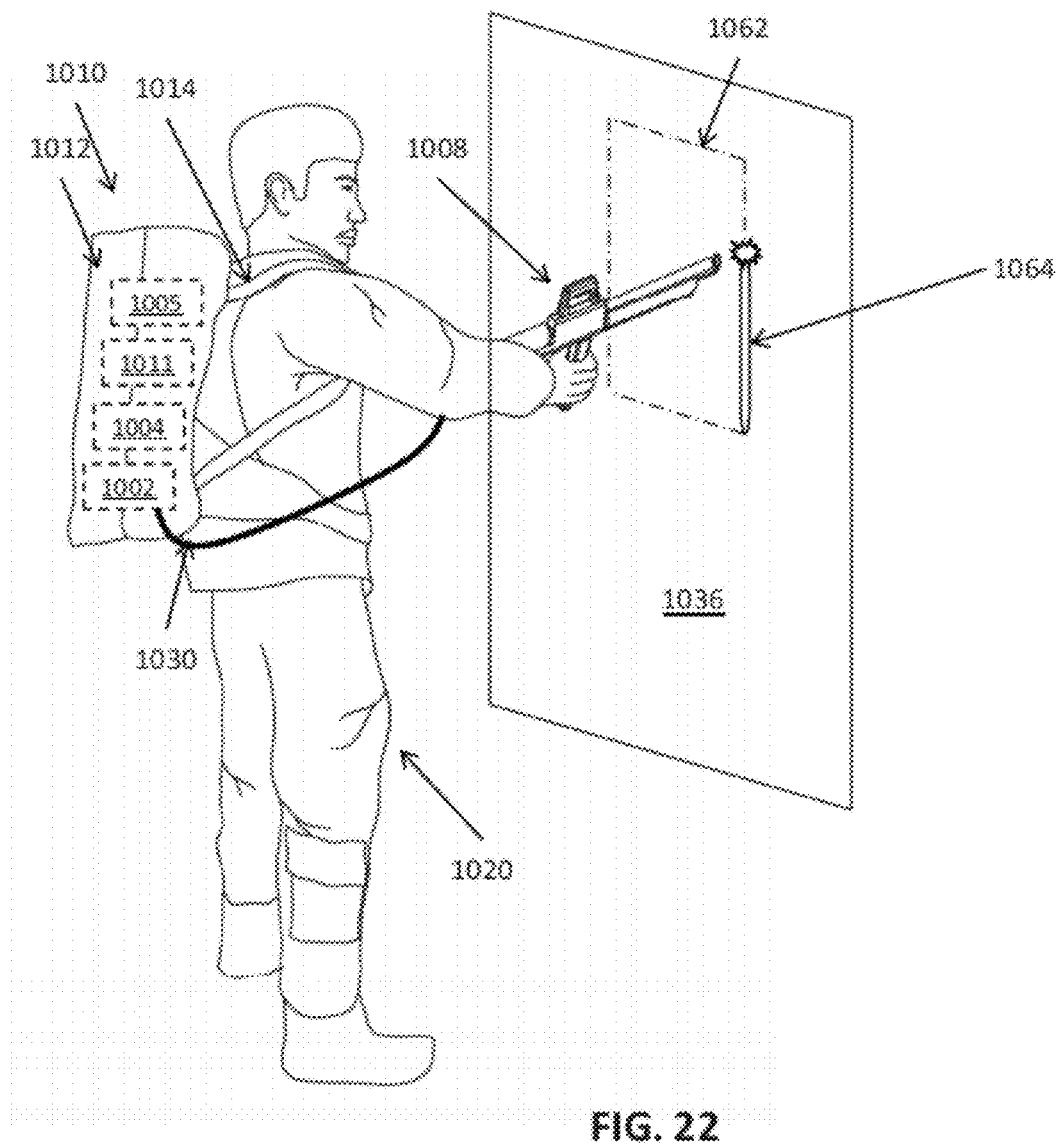
FIG. 22 shows the portable cutting device of FIG. 21 being used to breach a barrier.

In one embodiment, storage container 1006 is a backpack, such as backpack 1010 shown in FIG. 22. Backpack 1010 is worn by a human operator 1020. Backpack 1010 includes a cargo carrying portion 1012 and two straps 1014 which are positioned over the shoulders of the human operator 1020 and extend under the arms of the human operator 1020. Backpack 1010 is positioned on the back side of the human operator 1020. In one embodiment, storage container 1006 is positioned on a front side of the human operator 1020. In one embodiment, storage container 1006 is positioned to either a left side or a right side of the human operator 1020. In one embodiment, storage container 1006 is positioned on at least two of a back side, a left side, a front side, and a right side of the human operator 1020.

Figure 22A:
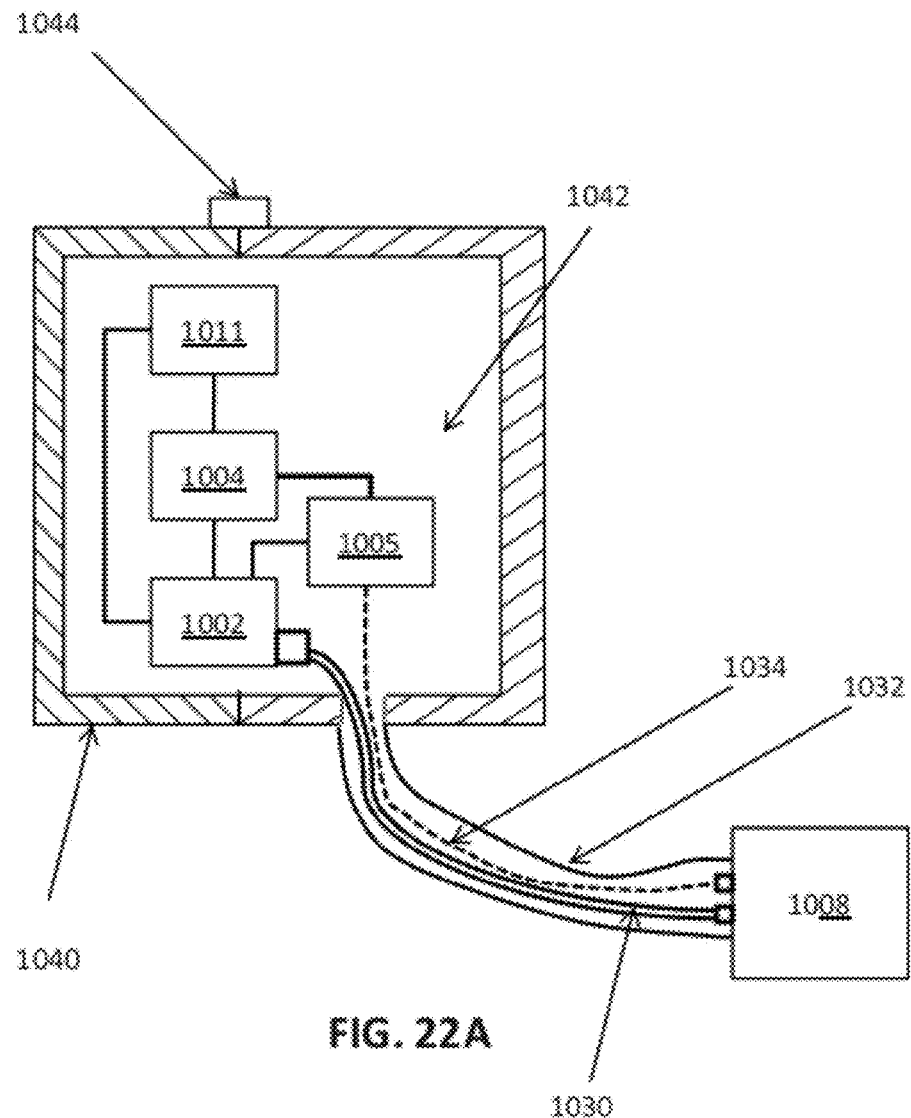
FIG. 22A is a representative view of the cargo carrying portion of the backpack shown in FIG. 22.

In one embodiment, laser source 1002, power supply 1004, and controller 1005 are positioned within cargo carrying portion 1012 of backpack 1010 for transport by human operator 1020. Referring to FIG. 22A, cargo carrying portion 1012 is represented. Cargo carrying portion 1012 includes a first portion 1040 and a second portion 1042 which cooperate to form an interior space of cargo carrying portion 1012. In one embodiment, cargo carrying portion 1012 is made of a flexible material and first portion 1040 and second portion 1042 are secured together with one or more suitable fasteners 1044. Exemplary fasteners include zippers, snaps, and other suitable fasteners. In one embodiment, first portion 1040 and second portion 1042 are integrally formed and are seperatable only along a portion, such as the left side, top side, and right side. In one embodiment, cargo carrying portion 1012 is a hard case and first portion 1040 and second portion 1042 are secured together with one or more suitable fasteners 1044. Exemplary fasteners include latches and other suitable fasteners. Regardless of the configuration, first portion 1040 and second portion 1042 cooperate to provide a closed space for carrying laser source 1002, power supply 1004, controller 1005, and, optionally, cooling unit 1011 during transport and the ability to open at least a portion of cargo carrying portion 1012 to access laser source 1002, power supply 1004, controller 1005, or cooling unit 1011, such as to replace the batteries of power supply 1004.

Laser directing device 1008 is held by the human operator 1020. Laser directing device 1008 includes a stock portion 1050 which may be positioned next to the shoulder of human operator 1020. Laser directing device 1008 also includes a handle 1052 whereby the hand of the operator may carry laser directing device 1008 and a grip 1054 which human operator 1020 may grasp during operation of portable cutting device 1000.

Laser directing device 1008 is coupled to laser source 1002 through an optical conduit 1030. Exemplary optical conduits include fiber optic cable. Laser directing device 1008 also includes an optical conduit 1056 which is coupled to optical conduit 1030. Optical energy generated by laser source 1002 travels through optical conduit 1030 and optical conduit 1056 and is discharged through an end 1058 of laser directing device 1008 towards a barrier 1036 (see FIG. 22). The energy discharged by laser directing device 1008 is of sufficient strength to cut the material of barrier 1036. Laser directing device 1008 includes an optical system 1110 which shapes the energy exiting optical conduit 1056 of laser directing device 1008 to focus it at a focus 1114. Focusing optics 1060 concentrate the energy onto a defined location on the barrier 1036.

Returning to FIG. 22A, optical conduit 1030 is coupled to laser source 1002 at a location in the interior of cargo carrying portion 1012. Optical conduit 1030 extends through a wall of cargo carrying portion 1012 and is coupled to laser directing device 1008 outside of storage container 1006 at optical connector 1106 (see FIG. 25). In one embodiment, optical conduit 1030 couples to laser directing device 1008 through grip 1054.

Optical conduit 1030 is provided in a protective sheath 1032. The protective sheath 1032 should have a high thermal conductivity and limit a bend radius of optical conduit 1030. In one embodiment, protective sheath 1032 is made of segmented pieces of metal coupled together. Also included with protective sheath 1032 is an electrical control and signal cable 1034 which couples controller 1005 with components of laser directing device 1008. In one embodiment, controller 1005 is coupled to a controller 1130 of laser directing device 1008. In one embodiment, controller 1005 is coupled to controller 1130 over through a standard RS-232 or RS-422 interface. In one embodiment, signal cable 1034 is an optical fiber and controller 1005 communicates with controller 1130 via any type of standard protocol, such as Internet protocol. As explained herein, controller 1130 interfaces with the operator 1020, the components of laser directing device 1008, and monitors sensors associated with laser directing device 1008. Controller 1130 then communicates this information to controller 1005 which controls the operation of laser source 1002.

Laser source 1002, in one embodiment, is a continuous wave laser. In one embodiment, laser source 1002 is a fiber laser. In one embodiment, laser source 1002 is a continuous wave Ytterbium single mode fiber laser. Exemplary continuous wave single mode fiber lasers are provided by IPG Laser GmBH located at 50 Old Webster Road in Oxford, Mass. 01540. Details regarding an exemplary laser source 1002 are provided in U.S. patent application Ser. No. 11/973,437, titled POWERFUL FIBER LASER SYSTEM, filed Oct. 9, 2007, now U.S. Pat. No. 7,593,435, assigned to IPG Photonics Corporation, the disclosure of which is expressly incorporated by reference herein. Details regarding an exemplary laser source 1002 are provided in U.S. patent application Ser. No. 11/611,247, titled FIBER LASER WITH LARGE MODE AREA FIBER, filed Dec. 15, 2006, now abandoned, assigned to IPG Photonics Corporation, the disclosure of which is expressly incorporated by reference herein. In one embodiment, laser source 1002 is a solid state laser.

Figure 31:
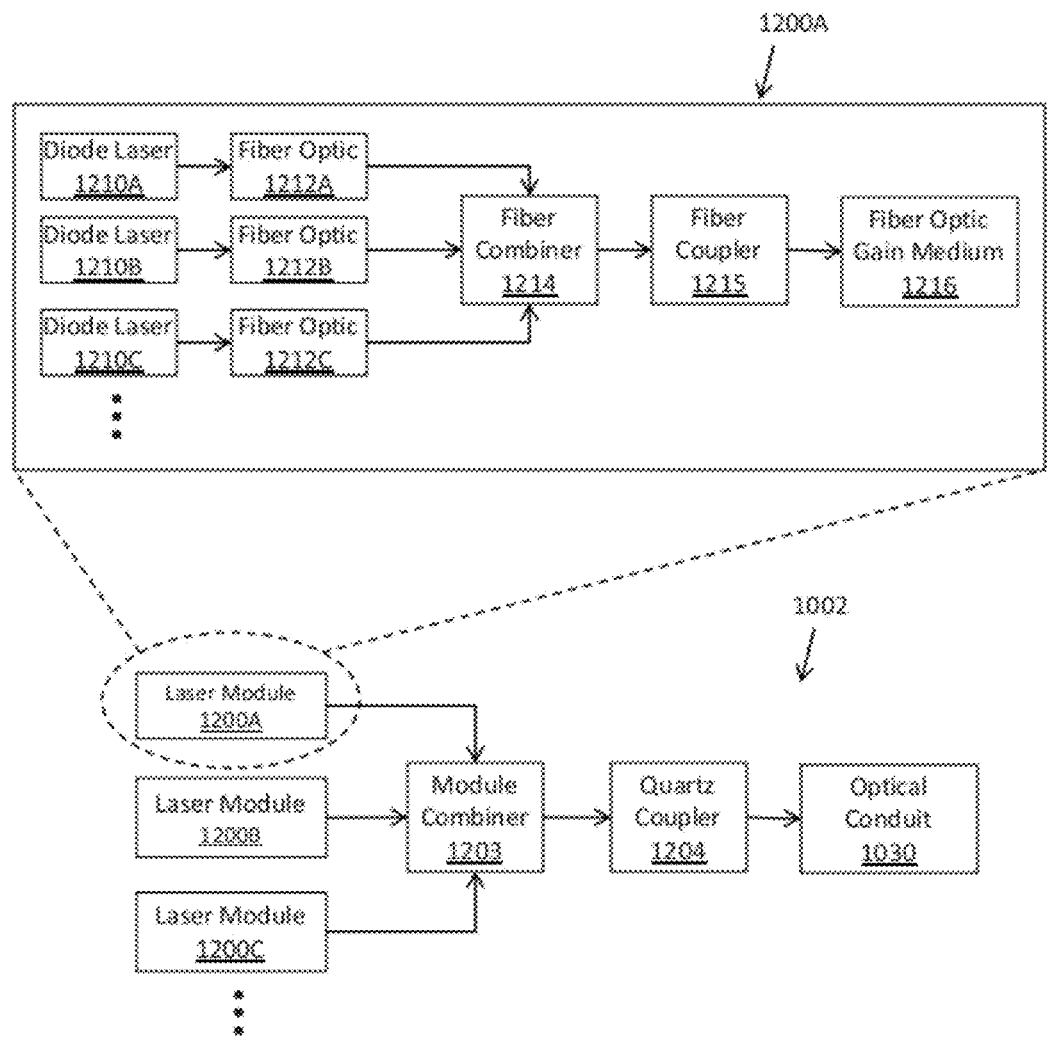
FIG. 31 illustrates an exemplary laser source.

Referring to FIG. 31, an exemplary configuration of laser source 1002 is shown. Laser source 1002 includes a plurality of individual modules 1200 each of which provide a single mode 1.07 micrometer output beam. The output of each of modules 1200 is combined together through a module combiner 1203 which brings the energy together in a single beam. This combined beam is coupled to optical conduit 1030 through a quartz coupler 1204. Although three laser modules 1200 are illustrated any number of laser modules 1200 may be included.

The components of a given laser module 1200 are also shown in FIG. 31. The laser module 1200 includes a plurality of diode lasers 1210 each of which are coupled into a respective Ytterbium fiber 1212. The output of the Ytterbium fibers 1212 are combined through a fiber combiner 1214 which brings the energy together. This energy is fed through a coupler 1215 into an Ytterbium fiber optic gain medium 1216 which produces there from a single mode 1.07 micrometer output beam. Although three diode laser sets 1210 are illustrated any number of diode laser sets 1210 may be included.

In one embodiment, the power of laser source 1002 is about 3 kilowatts. In one embodiment, the power level of laser source 1002 is about 5 kilowatts. In one embodiment, the power level of laser source 1002 is about 10 kilowatts. In one embodiment, the power level of laser source 1002 is about 20 kilowatts. In one embodiment, the power level of laser source 1002 is about 50 kilowatts. In one embodiment, the power level of laser source 1002 is between about 3 kilowatts and 20 kilowatts. In one embodiment, the power level of laser source 1002 is at least 3 kilowatts.

In one embodiment, power supply 1004 is a portable power supply. An exemplary portable power supply is one or more batteries, such as rechargeable batteries. Exemplary rechargeable batteries include lithium-ion batteries and lithium polymer batteries. Exemplary lithium-ion batteries include commercially available cells, such as those available from A123 Systems located in Watertown, Massachusetts. In one embodiment, the cells have a nominal amp-hour rating of 2.3 Ah and a nominal load voltage of 3.3 DCV/cell. Further exemplary lithium-ion batteries include commercially available cells available from SAFT America, Inc. located at 313 Crescent St Ne in Valdese, North Carolina in Watertown, Mass. In one embodiment, the cells have a nominal maximum current of 500 A, a specific power of 5.1 kW/kg, a specific energy of 430 kJ/kg, and a mass of 0.94 kg.

Figure 23:
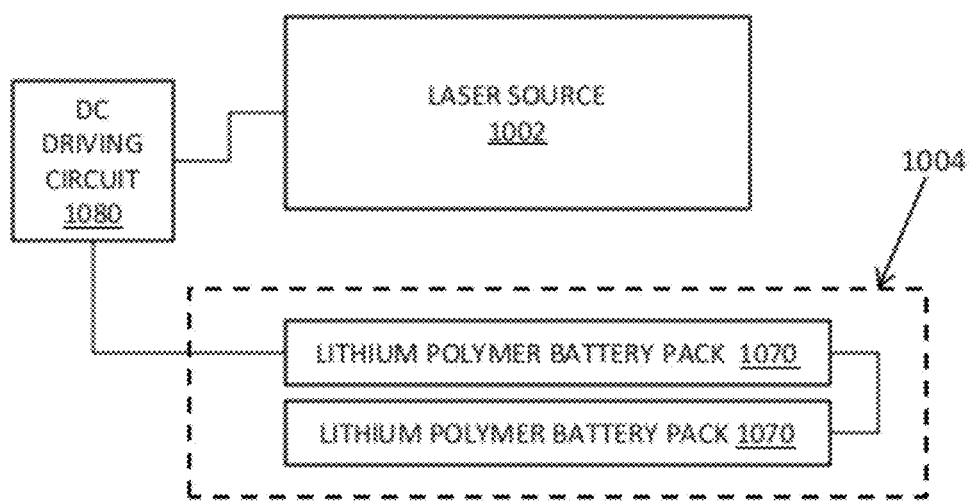
FIG. 23 is a representative view of an exemplary portable battery power supply.

Referring to FIG. 23, multiple lithium-ion battery packs 1070 are coupled together in series to produce power supply 1004. Each of lithium-ion battery pack 1070 delivers about 5 kilowatts of power for about six minutes. Since two units are shown coupled together in FIG. 23, the resultant power supply 1004 can deliver about 10 kilowatts of power. Each of lithium-ion battery pack 1070 includes multiple individual lithium-ion batteries. In one embodiment, lithium-ion battery pack 1070 commercially available cells available from A123 Systems located in Watertown, Mass. The two lithium-ion battery packs 1070 together weigh about 28 pounds (13.6 kg).

Figure 24:
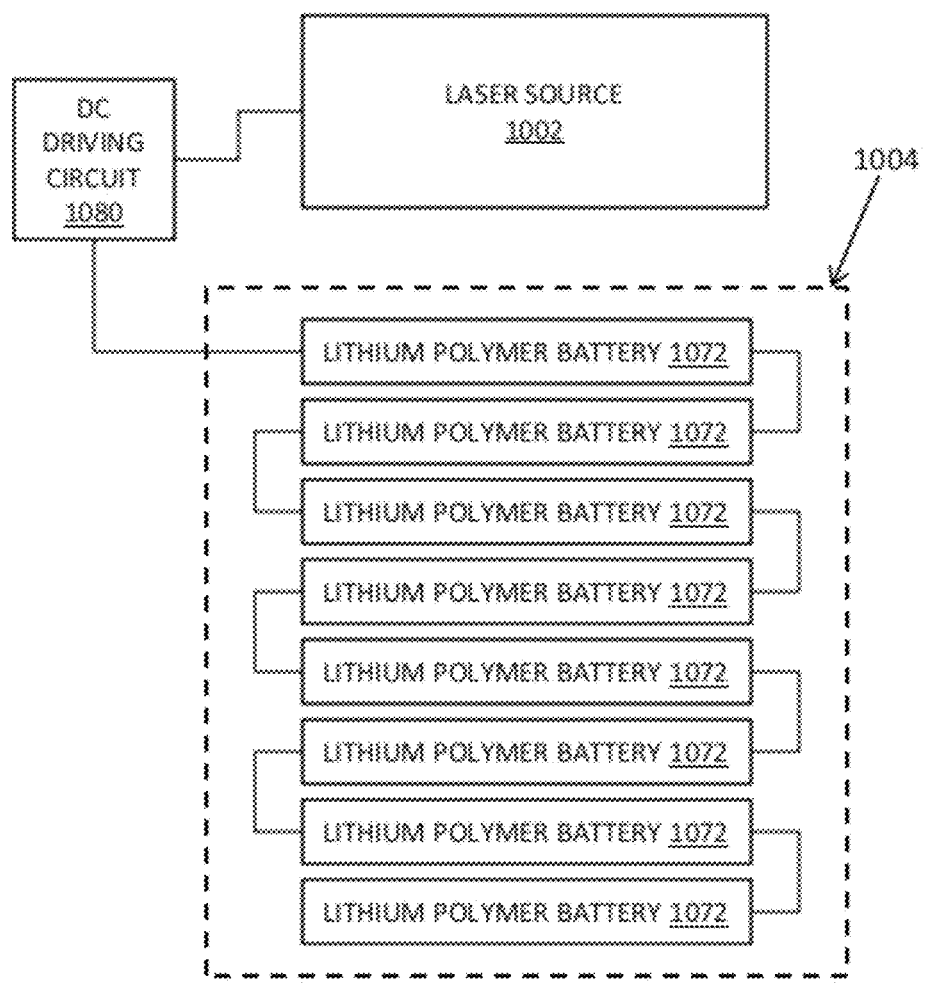
FIG. 24 is a representative view of an exemplary second portable battery power supply.

Referring to FIG. 24, multiple lithium polymer batteries 1072 are coupled together in series to produce power supply 1004. Each of lithium polymer batteries 1072 delivers about 4.5 kilowatts of power for about two minutes. Since eight units are shown coupled together in FIG. 24, the resultant power supply 1004 can deliver about 13 kilowatts of power for about six minutes. The eight lithium polymer batteries 1072 together weigh about 21 pounds (9.6 kg).

In one embodiment, laser source 1002 is a three kilowatt Yterrbium single mode fiber laser such as ones commercially available from IPG Photonics located at IPG Photonics Corporation, 50 Old Webster Road Oxford, Mass. 01540 USA and power supply 1004 is as shown in FIG. 24. This combination results in portable cutting device 1000 having a cutting speed of about fifty inches per minute for 0.5 inch thick steel. This combination may cut up to 900 inches of material on a single charge of power supply 1004, arranged as shown in FIG. 24. In general, commercial laser sources include an AC-to-DC converter to convert power from an AC source to DC power for laser source 1002. Since power supply 1004 already provides DC power, when a commercial laser source is being used the AC-to-DC converter is removed and replaced with DC driving circuit 1080. DC driving circuit 1080 provides power from power supply 1004 to laser source 1002 and regulates the power level provided. In a similar fashion, commercial laser sources often include cooling lines to cool the laser source and over-temperature sensors to monitor the temperature of the laser source. In one embodiment, when a commercial laser source is being used the cooling lines are removed and the over-temperature sensors of the commercial laser source are overridden. With this arrangement and using the laser directing device 1008 represented in FIG. 25, laser directing device 1008 was operated at 3 kW power for 1020 seconds without disabling the laser source 1002.

Figure 29:
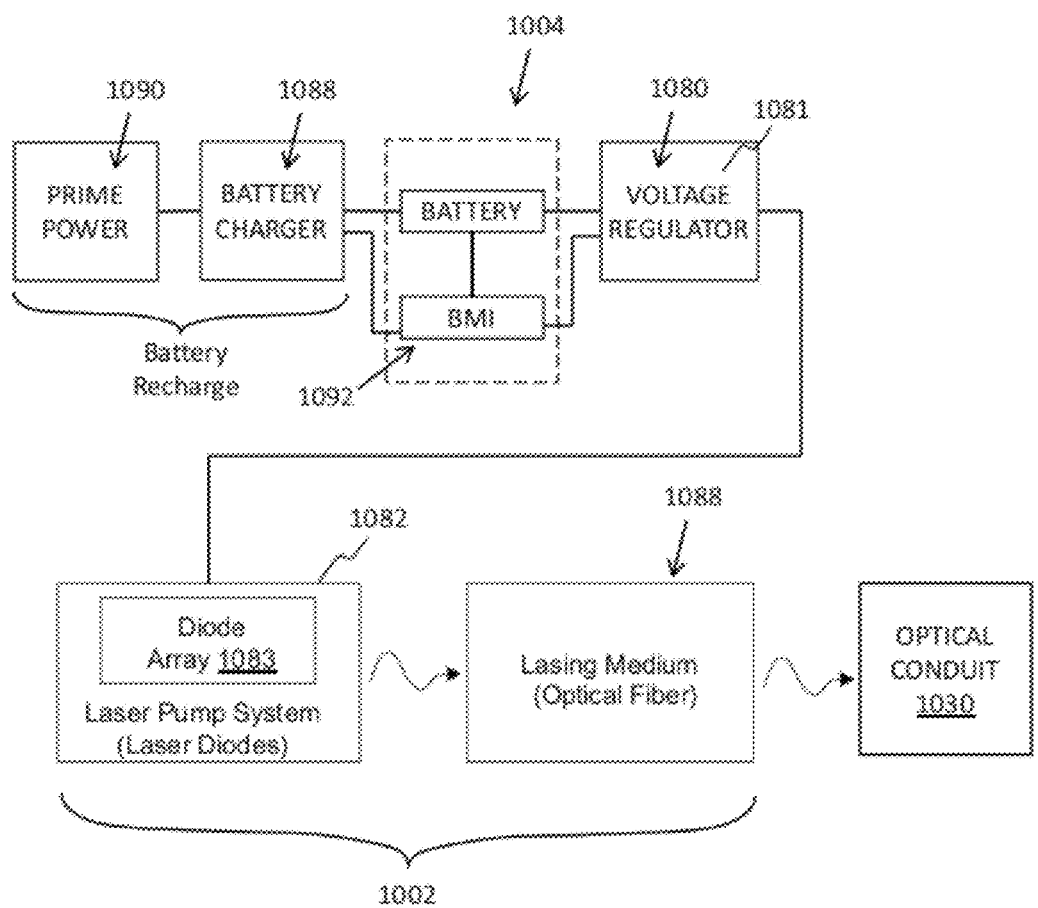
FIG. 29 illustrates a first arrangement of components of the portable cutting device.
Figure 30:
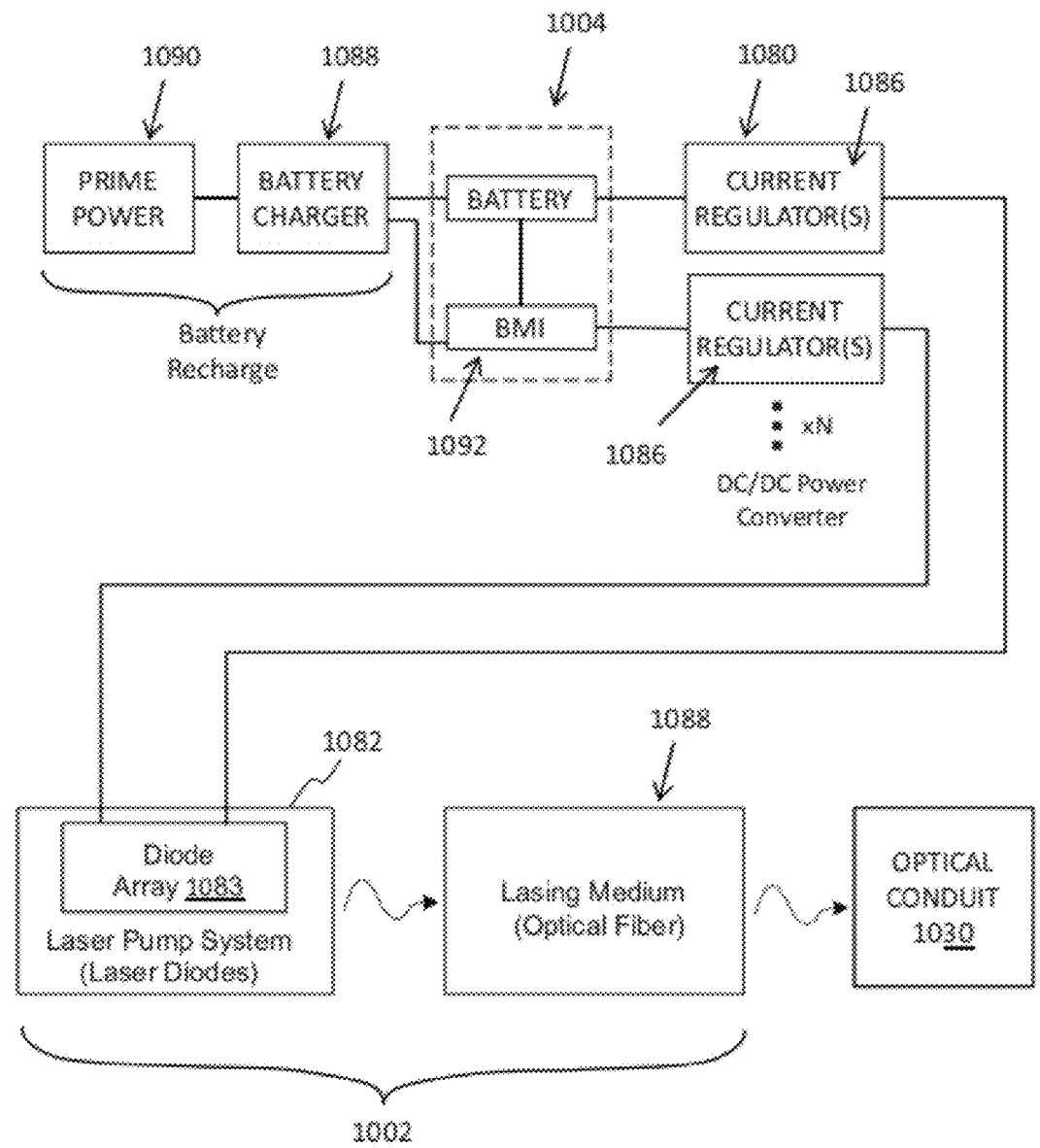
FIG. 30 illustrates a second arrangement of components of the portable cutting device.

Referring to either FIG. 29 or FIG. 30, laser source 1002 is represented. Laser source 1002 includes a laser pump system 1082 which includes a plurality of laser diodes 1083. Laser diodes 1083 provide the pump energy for the lasing medium 1084 of laser source 1002. The laser diodes 1083 are divided into a plurality of modules. In one embodiment, 42 diodes are provided in a single module and seven modules are provided. The lasing medium 1084 is provided as part of a fiber optical cable. The output of the lasing medium 1084 is provided to optical conduit 1030.

In FIG. 29, power supply 1004 is coupled to laser diodes 1083 through DC driving circuit 1080 which includes a single voltage regulator 1081 that powers laser diodes 1083. In FIG. 30, power supply 1004 is coupled to laser diodes 1083 through DC driving circuit 1080 which includes a plurality of current regulators 1086. Each current regulator 1086 provides the power to one of the modules to provide power to the diodes of that module.

Referring to either FIG. 29 or FIG. 30, power supply 1004 may be charged with a battery charger 1088 coupled to prime power source 1090. Exemplary prime power sources include a standard AC wall outlet or an alternator of a vehicle. Power supply 1004 includes a battery management interface 1092 which controls the recharging of the batteries with battery charger 1088.

Figure 25:
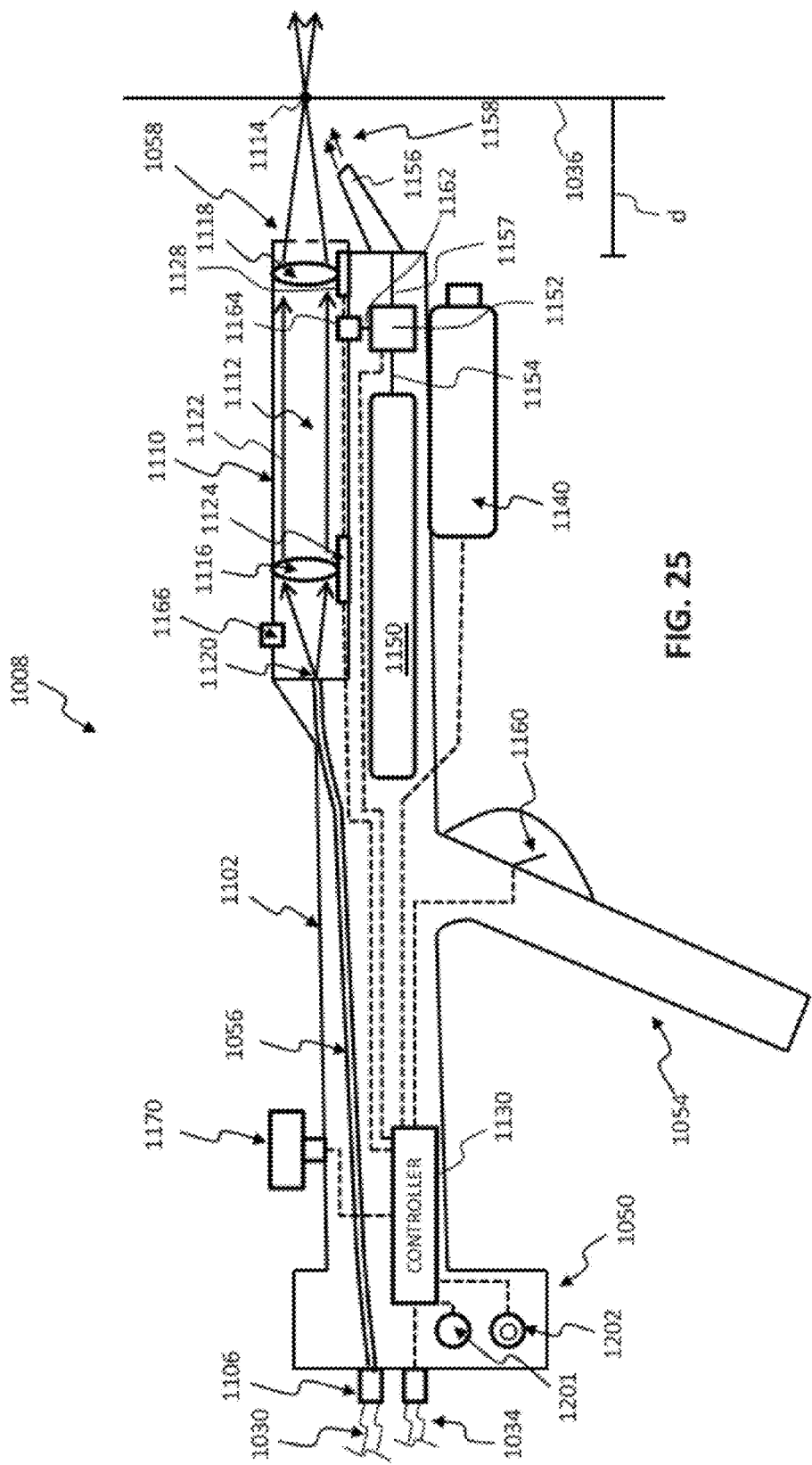
FIG. 25 is a representative view of a laser directing device of the portable cutting device of FIG. 22.

Referring to FIG. 25, an exemplary embodiment of laser directing device 1008 is shown. Laser directing device 1008 has a body 1102 with a downwardly extending handle 1104. Optical conduit 1030 is coupled to an optical connector 1106 which couples optical conduit 1030 to optical conduit 1108. Optical conduit 1108 is coupled to a collimating chamber 1110.

Collimating chamber 1110 includes an optical system 1112 which focuses light carried by optical conduit 1108 at a focus 1114 generally corresponding to the location of barrier 1036. In one embodiment, the focal range of laser directing device 1008 is from about six inches from end 1058 to about sixty feet from end 1058. In one embodiment, the focal range of laser directing device 1008 is from about six inches from end 1058 to about three kilometers from end 1058.

In the illustrated embodiment, optical system 1112 includes a first lens 1116 and a second lens 1118. First lens 1116 receives the light from optical conduit 1108 which acts like a point source. In the illustrated embodiment, first lens 1116 is positioned such that an end 1120 of optical conduit 1108 is located at a focus of first lens 1116 which results in a generally collimated beam 1122 being produced inside of collimating chamber 1110. Second lens 1118 focuses collimated beam 1122 at barrier 1036. Although a two lens system is shown, other lens systems may be used to focus the light at focus 1114.

The position of one or both of first lens 1116 and second lens 1118 may be altered relative to the position of end 1120 of optical conduit 1108 or the other of first lens 1116 and second lens 1118 to change the location of focus 1114. In one embodiment, a portion of collimating chamber 1110 is moveable relative to the remainder of collimating chamber 1110 to allow an operator to manually adjust the relative spacing of first lens 1116 and second lens 1118 similar to a scope on a rifle. In one embodiment, first lens 1116 is positioned on a moveable stand 1124 and second lens 1118 is positioned on a moveable stand 1126. Both of moveable stand 1124 and moveable stand 1126 are controlled through respective motors to adjust the position of the respective first lens 1116 and second lens 1118.

The motors are controlled by a controller 1130 of laser directing device 1008. In one embodiment, controller 1130 receives an input from an operator control (not shown) through which the operator specifies the desired position of focus 1114. In one embodiment, controller 1130 receives an input from a laser rangefinder 1140 which determines the distance d from laser directing device 1008 to barrier 1036. Based on the determined distance d, controller 1130 moves one or both of first lens 1116 and second lens 1118 to place focus 1114 at distance d. In one embodiment, other locating devices may be used, such as GPS systems.

In one embodiment, instead of or in addition to a laser range finder device 1140 includes a visible guide laser which provides a visible marker for the operator of where laser directing device 1008 is going to cut. The visible guide laser should be collinear with an axis of collimating chamber 1110. In one example, the visible guide laser is a HeNe laser. In one embodiment, laser source 1002 acts as a guide laser. The operator wears goggles which can detect and provide a visible image of the barrier and the laser source at the barrier. In this embodiment, the laser source can be set to a low power setting to align with barrier and then set to a high power setting to cut barrier.

Laser directing device 1008 also includes a compressed gas container 1150 which provides air to a regulator valve 1152 through a conduit 1154. Regulator valve 1152 provides gas to a nozzle 1156 through a conduit 1157. Nozzle 1156 directs gas 1158 at focus 1114. In one embodiment, the position of nozzle 1156 is adjustable. The gas blows molten material produced during cutting away from laser directing device 1008, the operator, and away from barrier 1036. Controller 1130 controls regulator valve 1152 to place conduit 1157 in fluid communication with conduit 1154 when a trigger 1160 of laser directing device 1008 is pulled by the operator. In one embodiment, the gas stored in compressed gas container 1150 is a non-flammable gas. Exemplary gases include freon, nitrogen, argon, and other non-flammable gases.

Controller 1130 also controls regulator valve 1152 to place conduit 1154 in fluid communication with a fluid conduit 1162. Fluid conduit 1162 terminates at a fluid inlet 1164 to collimating chamber 1110. The gas presented to collimating chamber 1110 cools first lens 1116 and second lens 1118 from the heat generated by the light from optical conduit 1108. Warmer gas in collimating chamber 1110 is exhausted through a fluid outlet 1166 of collimating chamber 1110. In one embodiment, controller 1130 controls regulator valve 1152 to provide gas to fluid conduit 1162 whenever trigger 1160 is pulled. In one embodiment, controller 1130 controls regulator valve 1152 to provide gas to fluid conduit 1162 when a temperature sensor monitoring collimating chamber 1110 detects an elevated temperature.

Laser directing device 1008 further includes a sensor 1170 which monitors for light having generally the same wavelength provided by laser directing device 1008 at focus 1114. Sensor 1170 monitors the intensity of the light reflected from barrier 1036. Referring to FIG. 26A, when laser directing device 1008 is generally normal to barrier 1036, the light (represented by arrow 1172) focused by laser directing device 1008 strikes barrier 1036 generally normal to barrier 1036. A portion of the light (represented by arrow 1174) is reflected by barrier 1036. Often the reflected portion is small compared to the portion which interacts with barrier 1036 to cut barrier 1036 and as such does not pose a threat to the operator. However, when barrier 1036 is more reflective the strength of the reflected portion increases. When a 1.07 micrometer wavelength beam is used, irradiance levels of about 5 milliwatts per square centimeter (mW/cm$^2$) pose a threat to the operator at any range less than 77 km, such as damage to the retina of the eye. At wavelengths less than 1.55 micrometer, light is transmitted into the eye which can damage the retina. In one embodiment, a laser source 1002 having a wavelength of at least 1.55 micrometer is used. In one embodiment, a laser source 1002 having a wavelength of about 2.0 micrometer is used. At wavelengths of 1.55 micrometer and greater, damage to the cornea of the eye is the concern. Since the cornea heals quite easily and the retina is generally permanently damaged, wavelengths which are absorbed by the cornea and not transmitted are considered to be "eye safe".

By monitoring the irradiance levels of the reflected portion with sensor 1170, controller 1130 may make a determination of actions to take. In one embodiment, if the irradiance levels of the reflected portion are above a first threshold, controller 1130 sends an instruction to controller 1005 to shut down laser source 1002. In one embodiment, the first threshold is about 2.5 mW/cm$^2$.

In one embodiment, if the irradiance levels of the reflected portion are above a first threshold, controller 1130 sounds an alarm which provides an indication to the operator that the irradiance levels of the reflected portion are elevated, but not at a threatening level. The operator may then move to the arrangement shown in FIG. 26B, wherein the light represented by arrow 1172 is not normal to barrier 1036; thereby causing the reflected light represented by arrow 1174 to not be returned to sensor 1170. However, if the irradiance levels are above a second threshold, controller 1130 sends an instruction to controller 1005 to shut laser source 1002 down. In one embodiment, the first threshold is about 2.0 mW/cm$^2$ and second threshold is about 2.5 mW/cm$^2$.

This control sequence is represented in FIG. 27. The irradiance level of the reflected portion is monitored with sensor 1170, as represented by block 1180. The irradiance level is compared to a first threshold, as represented by block 1182. If the irradiance level is below the first threshold, no action is taken and the irradiance level of the reflected portion is continued to be monitored with sensor 1170. If the irradiance level is at or above the first threshold, then the irradiance level is compared to a second threshold, as represented by block 1184. If the irradiance level is not at or above the second threshold, then an alarm is sounded, as represented by block 1186. This informs the operator that irradiance levels are elevated and that action should be taken, such as changing the angle of incidence relative to barrier 1036. Exemplary alarms include audio alarms (such as speakers), visual alarms (such as lights), tactile alarms (such as vibrating members), or combinations thereof. If the irradiance level is at or above the second threshold, then laser source 1002 is deactivated, as represented by block 1188.

Returning to FIG. 25, laser directing device 1008 further includes a safety switch 1201 and a laser power setting switch 1202. Safety switch 1201 provides a safety in case the operator inadvertently pulls trigger 1160. Safety switch 1201 may be a toggle switch, a dial, or any other suitable input device. Laser power setting switch 1202 provides an indication of the desired power level of laser source 1002. By running laser source 1002 at lower power levels for applications not requiring high power settings, the charge life of power supply 1004 may be extended. Laser power setting switch 1202 may be any type of input devices which provides multiple settings, each corresponding to a particular power level. An exemplary input device is a dial. In one embodiment, the power level of laser source 1002 may be adjusted from 0% to 700%.

Figure 28:
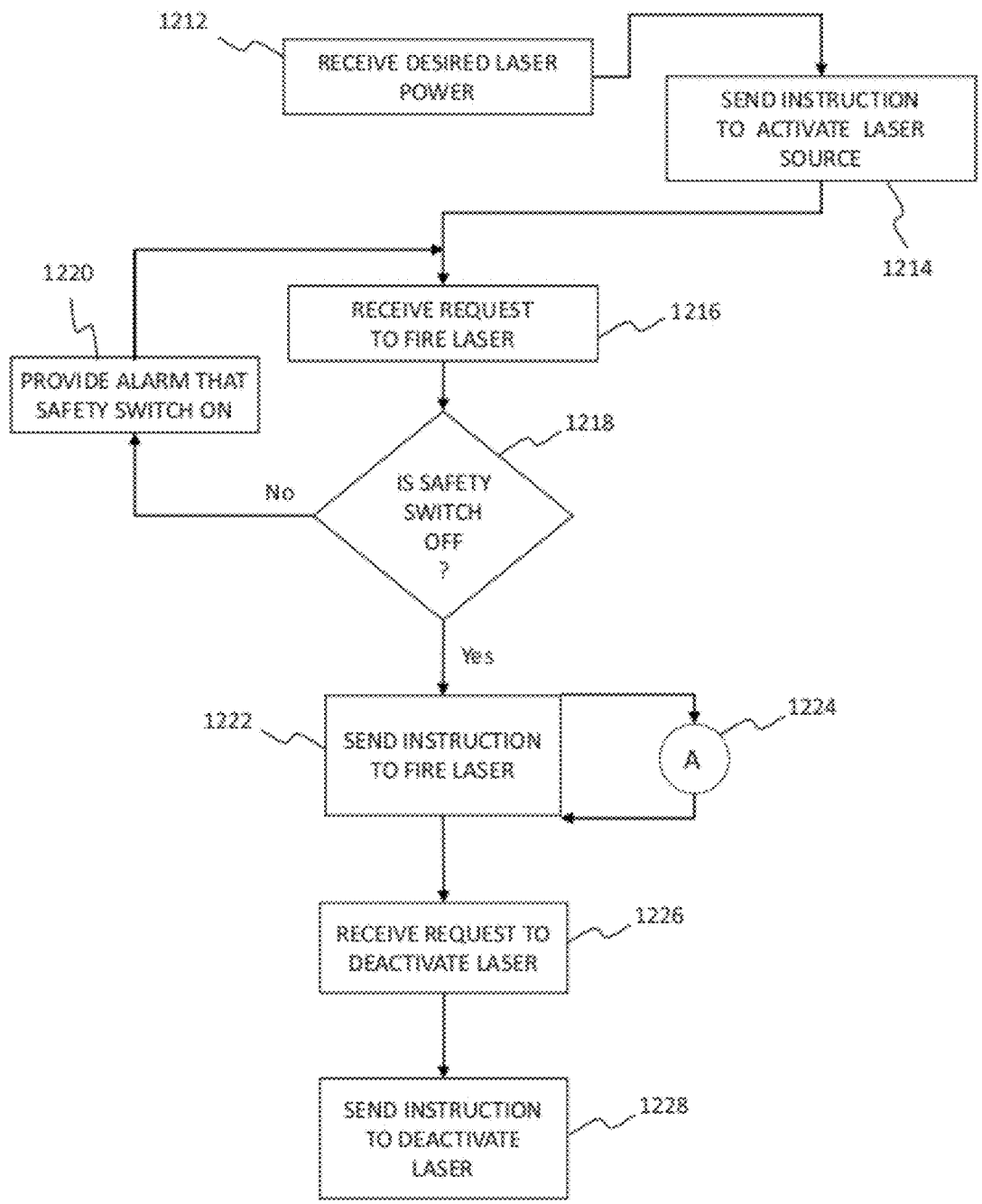
FIG. 28 illustrates another processing sequence of the controller of the portable cutting device.

Referring to FIG. 28, an exemplary operation sequence for laser directing device 1008 is provided. A request is received by controller 1130 to set the desired power level of laser source 1002, as represented by block 1212. For laser directing device 1008, the request to set the desired power level of laser source 1002 is the setting of laser power setting switch 1202. Controller 1130 sends an instruction to controller 1005 to activate laser source 1002 at the desired power level, as represented by block 1214.

Controller 1130 receives a request to fire laser source 1002, as represented by block 1216. For laser directing device 1008, the request to fire laser source 1002 is the pulling of trigger 1160 which is monitored by controller 1130. Controller 1130 checks to see if the safety switch 1201 is off, as represented by block 1218. For laser directing device 1008, the state of safety switch 1201 is checked. If the safety switch is on, an alarm is provided to alert the operator that the safety is on, as represented by block 1220. Exemplary alarms include audio alarms (such as speakers), visual alarms (such as lights), tactile alarms (such as vibrating members), or combinations thereof. If the safety switch is off, then controller 1130 sends an instruction to controller 1005 to fire laser source 1002, as represented by block 1222.

While laser source 1002 is being fired, the monitoring sequence of FIG. 27 is carried out, as represented by block 1224. Controller 1130 receives a request to deactivate laser source 1002, as represented by block 1226. For laser directing device 1008, the request to deactivate laser source 1002 is the release of trigger 1160 which is monitored by controller 1130. Controller 1130 sends an instruction to controller 1005 to deactivate laser source 1002, as represented by block 1228.

With trigger 1160 pulled, operator 1020 moves laser directing device 1008 with his/her arms to define the cutting path of laser directing device 1008. As such, laser directing device 1008 may be moved by human operator 1020 without the need to also move laser source 1002. This flexibility is provided in part by the flexibility of optical conduit 1030. As represented in FIG. 22, a planned cutting path 1062 is shown including a first portion 1064 which has already been cut. Once cutting is complete, portable cutting device 1000 may be powered off, by letting trigger 1160 released. In between cutting operations, power supply 1004 may be recharged or replaced.

Figure 33:
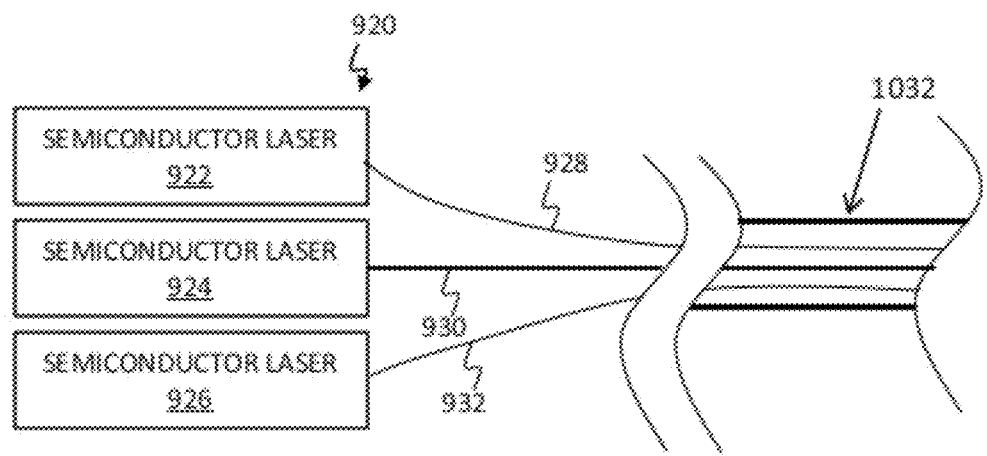
FIG. 33 a representative view of a portion of a portable cutting device.

Referring to FIG. 33, in one embodiment, the laser source 1002 of portable cutting device 1000 includes a laser source 920. Laser source 920 includes a plurality of semiconductor lasers 922-626 which produce optical energy for portable cutting device 1000. In one embodiment, the semiconductor lasers are continuous wave lasers. In one embodiment, lasers 922-626 are quantum cascade lasers. Exemplary quantum cascade lasers include External Cavity Quantum Cascade Lasers available from Daylight Solutions located at 13029 Danielson Street, Suite 130 in Poway, Calif. and Pranalytica located at 1101 Colorado Avenue in Santa Monica, Calif. In one embodiment, the semiconductor lasers have a wavelength of at least about 1 um. In one embodiment, the semiconductor lasers have a wavelength of at least about 2 um.

The output optical energy of each of lasers 922-626 is carried through respective optical conduits 928-632. In one embodiment, the output of each of optical conduits 928-632 is combined and passes through optical conduit 1030 to laser directing device 1008. In the illustrated embodiment, each of optical conduits 928-632 pass through optical conduit 1030. In this example, the end of each of optical conduits 928-632 generally coincide with optical connector 1106. Optical conduit 1056 then propagates the optical energy to optical system 1112 which outputs the optical energy from laser directing device 1008. The optical energy of lasers 902-606 is generally incoherently combined to produce a beam with a power level sufficient to function in the same manner as laser source 1002. In one embodiment, the power of the combined lasers 902-606 is about 3 kilowatts. In one embodiment, the power level of combined lasers 902-606 is about 5 kilowatts. In one embodiment, the power level of combined lasers 902-606 is about 10 kilowatts. In one embodiment, the power level of combined lasers 902-606 is about 20 kilowatts. In one embodiment, the power level of combined lasers 902-606 is about 50 kilowatts. In one embodiment, the power level of combined lasers 902-606 is between about 3 kilowatts and 20 kilowatts. In one embodiment, the power level of combined lasers 902-606 is at least 3 kilowatts.

In one embodiment, portable cutting device 1000 is mounted to a moveable platform so that portable cutting device 1000 is positionable relative to various objects to be cut or removed without having to be held by an operator. The portable cutting device may be fired at an object having a first hardness. Subsequent to firing, the hardness of the object is reduced it is believed due to the interaction of the optical energy produced by portable cutting device 1000 and the object. Once the hardness of the object has been reduced a mechanical tool may be used to remove at least portions of the object. In one example, the portable cutting device 1000 is lowered into a well shaft and fired at rock in the well shaft to reduce the hardness of the rock. Subsequent thereto, a mechanical drill is used to further breakup and remove the rock from the well shaft.

Although the disclosed systems have included laser systems with wavelengths in the infrared spectrum, the teaching presented herein may also be used with laser systems with wavelengths in the visible spectrum or ultraviolet spectrum.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method of hampering unauthorized electro-optic devices, the method comprising the steps of:
    interrogating an area with optical energy from at least one optical source;
    receiving a reflection from a first electro-optic device;
    storing data representative of optically detectable characteristics for a plurality of authorized electro-optic devices;
    comparing an optically detectable characteristic of the received reflection of the first electro-optic device to the stored data representative of optically detectable characteristics of authorized electro-optic devices to determine if the first electro-optic device is one of said authorized devices; and
    if the first electro-optic device is not one of said authorized devices, hampering the operation of the first electro-optic device.

2. The method of claim 1, wherein the at least one optical source is at least one continuous wave laser source having a wavelength of at least 1.5 microns.

3. The method of claim 1, wherein the comparing step of includes the steps of:
    determining a Fourier transform of the received reflection from the first electro-optic device; and
    comparing at least a portion of the Fourier transform to the stored optically detectable characteristics to determine if the portion of the Fourier transform matches the stored optically detectable characteristics.

4. The method of claim 1, wherein the first electro-optic device is an unauthorized electro-optic device, the step of hampering the operation of the first electro-optic device includes the steps of:
    increasing a power level of the optical energy from the at least one optical source;
    directing the optical energy with the increased power at the first electro-optic device.

5. The method of claim 4, wherein the first electro-optic device is an infrared tracking device having a seeker head traveling in a first direction towards the at least one optical source, the optical energy with the increased power level being directed into the seeker head of the infrared tracking device to generate at least one localized source within the mobile tracking device and within a field of view of the infrared tracking device which indicates a second direction of travel for the infrared tracking device.

6. The method of claim 5, further comprising the steps of:
    altering the direction of the optical energy with the increased power level such that the optical energy with the increased power level continues to be directed at the seeker head of the infrared tracking device which is traveling in the second direction and continues to generate at least one localized source within the infrared tracking device and within the field of view of the infrared tracking device which indicates a third direction of travel for the infrared tracking device.

7. The method of claim 1, wherein the step of hampering the operation of the first electro-optic device includes the step of blinding the first electro-optic device with optical energy.

8. The method of claim 1, wherein the step of hampering the operation of the first electro-optic device includes the step of jamming an operation of the first electro-optic device with optical energy.

9. The method of claim 1, wherein the step of hampering the operation of the first electro-optic device includes the step of permanently disabling an operation of the first electro-optic device with optical energy.

10. The method of claim 1, wherein the step of hampering the operation of the first electro-optic device includes the step of destroying the first electro-optic device with optical energy.

11. The method of claim 1, wherein the step of hampering the operation of the first electro-optic device includes the step of sending out high power optical energy in a direction towards the first electro-optic device and the method further comprising the steps of:

prior to sending out high power optical energy in a direction towards the first electro-optic device, broadcasting a signal which when received by an authorized electro-optic device causes the authorized electro-optic device to protect its sensors from the high power optical energy.

12. The method of claim 11, wherein the authorized electro-optic device shields its sensors from the high power optical energy.

13. An apparatus for interacting with an electro-optic device, the apparatus comprising:

a body;

at least one propulsion device supported by the body;

a privacy device which monitors the environment surrounding the body for an unauthorized electro-optic device;

a controller operatively connected to the privacy device, the controller determining a presence of the unauthorized electro-optic device in the environment surrounding the body based on information collected by the privacy device and a current location of the unauthorized electro-optic device; and a modulation system which receives the current location of the unauthorized electro-optic device from the controller, orients a tracking system of the modulation system based on the current location of the unauthorized electro-optic device, detects the unauthorized electro-optic device, updates the location of the unauthorized electro-optic device, and directs a continuous beam of optical energy at the unauthorized electro-optic device.

14. The apparatus of claim 13, wherein the continuous beam of optical energy being produced by a plurality of semiconductor lasers whose output are combined.

15. The apparatus of claim 13, wherein the plurality of semiconductor lasers are quantum cascade lasers.

16. The apparatus of claim 13, wherein the output of each of the plurality of semiconductor lasers are incoherently combined to produce the continuous beam of optical energy.

17. The apparatus of claim 13, wherein the controller continues to update the current location of the unauthorized electro-optic device until the modulation system detects the unauthorized electro-optic device, the modulation system using the updated current location to orient the tracking system.

* * * * *